US012684298B2

(12) United States Patent
Choi et al.

(10) Patent No.: US 12,684,298 B2
(45) Date of Patent: Jul. 14, 2026

(54) ACOUSTIC APPARATUS AND VEHICULAR APPARATUS COMPRISING THE SAME

(71) Applicant: LG Display Co., Ltd., Seoul (KR)

(72) Inventors: YeongRak Choi, Paju-si (KR);
Kwangho Kim, Paju-si (KR);
Taehyung Kim, Paju-si (KR);
Seonwook Lee, Paju-si (KR)

(73) Assignee: LG DISPLAY CO., LTD., Seoul (KR)

(*) Notice: Subject to any disclaimer, the term of this patent is extended or adjusted under 35 U.S.C. 154(b) by 118 days.

(21) Appl. No.: 18/782,809

(22) Filed: Jul. 24, 2024

(65) Prior Publication Data
US 2025/0048037 A1      Feb. 6, 2025

(30) Foreign Application Priority Data

Jul. 31, 2023      (KR) ........................ 10-2023-0099819

(51) Int. Cl.
*H04R 17/00*      (2006.01)
*B60Q 5/00*      (2006.01)
*H04R 1/02*      (2006.01)

(52) U.S. Cl.
CPC ........... *H04R 17/005* (2013.01); *B60Q 5/008* (2013.01); *H04R 1/021* (2013.01); *H04R 1/026* (2013.01); *H04R 2499/13* (2013.01)

(58) Field of Classification Search
CPC .................................................... H04R 17/005
See application file for complete search history.

(56) References Cited

U.S. PATENT DOCUMENTS

| | | | | |
|---|---|---|---|---|
| 8,184,847 B2 * | 5/2012 | Bertoli | .................... | H04R 1/025 |
| | | | | 296/187.11 |
| 10,471,892 B2 * | 11/2019 | Kang | ........................ | G10K 9/20 |
| 2020/0204924 A1 * | 6/2020 | Kim | ........................ | H04R 1/028 |
| 2021/0026590 A1 * | 1/2021 | Nam | ........................ | B60K 35/26 |
| 2021/0058690 A1 * | 2/2021 | Lee | ........................ | G06F 1/1643 |
| 2021/0352390 A1 * | 11/2021 | Lee | ........................ | H04R 9/066 |
| 2022/0182744 A1 * | 6/2022 | Han | ........................ | H04R 17/00 |
| 2022/0227308 A1 * | 7/2022 | Wheeler | ............. | B60R 11/0247 |

* cited by examiner

*Primary Examiner* — Paul W Huber

(74) *Attorney, Agent, or Firm* — Birch, Stewart, Kolasch & Birch, LLP

(57)      ABSTRACT

An acoustic apparatus can include a vibration member, a supporting member disposed at a first surface of the vibration member, a first vibration apparatus configured to vibrate the vibration member, and a driving circuit part electrically connected to the first vibration apparatus and configured to drive the first vibration apparatus. In addition, the driving circuit part can be disposed at an internal space between the vibration member and the supporting member.

34 Claims, 20 Drawing Sheets

III-III'

153: 153a, 153b, 153d

520: 520A, 520B, 520C
530B: 530B2, 530B3

530: 530A, 530B, 530D, 530F, 530J
530D: 530D1 ~ 530D4

540: 540C
□: 510

WS

520: 520A, 520B, 520C

530: 530A~530D, 530F~530J

530B: 530B1, 530B2, 530B3

530D: 530D2, 530D4

540: 540B2, 540B4

◉: WS    ☐: 510

1

ACOUSTIC APPARATUS AND VEHICULAR APPARATUS COMPRISING THE SAME

CROSS-REFERENCE TO RELATED APPLICATION

This application claims priority to Korean Patent Application No. 10-2023-0099819 filed in the Republic of Korea on Jul. 31, 2023, the entire contents of which is hereby expressly incorporated by reference into the present application.

BACKGROUND

1. Technical Field

The present disclosure relates to an acoustic apparatus and a vehicular apparatus including the same.

2. Description of the Related Art

The speaker applied to an apparatus can be, for example, an actuator that includes a magnet and a coil. When the actuator is applied to the apparatus, a problem occurs in that the apparatus is thick. In this respect, a piezoelectric device that enables thinness to be implemented is attracting attention.

SUMMARY OF THE DISCLOSURE

Acoustic apparatuses including a piezoelectric device are lightweight and have low power consumption, and thus, is used for various purposes. In a piezoelectric device, a lowest resonance frequency increases due to high stiffness, and due to this, a sound pressure level of a low-pitched sound band is easily insufficient. Therefore, acoustic apparatuses using a piezoelectric device have a technical problem where a sound pressure level of the low-pitched sound band is not sufficient.

Therefore, the inventors of the present disclosure have recognized problems described above and have performed extensive research and experiments for enhancing a sound characteristic and/or a sound pressure level characteristic of a low-pitched sound band of an acoustic apparatus. Accordingly, the present disclosure relates to an apparatus for enhancing a sound characteristic and/or a sound pressure level characteristic of the low-pitched sound band of the acoustic apparatus.

One or more aspects of the present disclosure is directed to providing an acoustic apparatus and a vehicular apparatus including the same, which can enhance a sound characteristic and/or a sound pressure level characteristic of a low-pitched sound band.

One or more aspects of the present disclosure is directed to providing an acoustic apparatus and a vehicular apparatus including the same, which is capable of outputting a sound or a virtual engine sound with a sound pressure level of 60 dB or more in a sound band of 300 Hz or more.

Additional features, advantages, and aspects of the present disclosure are set forth in part in the present disclosure and will also be apparent from the present disclosure or can be learned by practice of the inventive concepts provided herein. Other features, advantages, and aspects of the present disclosure can be realized and attained by the descriptions provided in the present disclosure, or derivable therefrom, and claims hereof as well as the appended drawings.

To achieve these and other advantages and aspects of the present disclosure, as embodied and broadly described herein, in one or more aspects, an acoustic apparatus includes a vibration member, a supporting member at a first surface of the vibration member, a first vibration apparatus configured to vibrate the vibration member, and a driving circuit part electrically connected to the first vibration apparatus and configured to drive the first vibration apparatus. The driving circuit part can be disposed at an internal space between the vibration member and the supporting member.

In one or more aspects, a vehicular apparatus can include an exterior material, an interior material covering the exterior material, and one or more sound generating apparatuses configured at one or more of the exterior material, the interior material, and between the exterior material and the interior material to output a sound. The one or more sound generating apparatuses can include an acoustic apparatus. The acoustic apparatus can include a vibration member, a supporting member at a first surface of the vibration member, a vibration apparatus configured to vibrate the vibration member, and a driving circuit part electrically connected to the first vibration apparatus and configured to drive the first vibration apparatus. The driving circuit part can be disposed at an internal space between the vibration member and the supporting member.

In one or more aspects, a vehicular apparatus can include a vehicle body bottom frame, and one or more virtual engine sound apparatuses mounted to the vehicle body bottom frame. The one or more virtual engine sound apparatuses can include an acoustic apparatus. The acoustic apparatus can include a vibration member, a supporting member at a first surface of the vibration member, a vibration apparatus configured to vibrate the vibration member, and a driving circuit part electrically connected to the first vibration apparatus and configured to drive the first vibration apparatus. The driving circuit part can be disposed at an internal space between the vibration member and the supporting member.

According to one or more embodiments of the present disclosure, an acoustic apparatus and a vehicular apparatus including the same, where a sound characteristic and/or a sound pressure level characteristic of a low-pitched sound band can be enhanced, can be provided.

According to one or more embodiments of the present disclosure, an acoustic apparatus and a vehicular apparatus including the same, which can output a virtual engine sound or a sound having a sound pressure level of 60 dB or more in a pitched sound band of 300 Hz or more, can be provided.

According to one or more embodiments of the present disclosure, an acoustic apparatus which can be lightweight and can have a thin thickness and a vehicular apparatus including the acoustic apparatus, which can output a virtual engine sound or a sound having a wide directivity angle or a non-directivity angle, can be provided.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing description and the following description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure, and incorporated in and constitute a part of this disclosure, illustrate aspects and embodiments of the disclosure and together with the description serve to explain principles of the disclosure.

Figure 1:
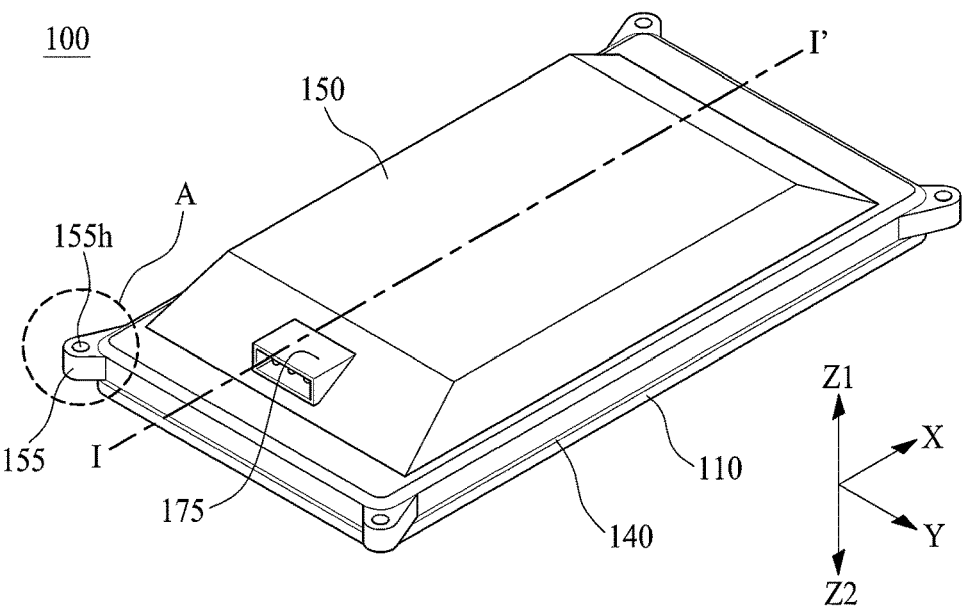
FIG. 1 is a perspective view illustrating an acoustic apparatus according to an embodiment of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTION OF THE DISCLOSURE

Reference is now made in detail to aspects of the present disclosure, examples of which can be illustrated in the accompanying drawings. Further, repetitive descriptions can be omitted for brevity. The progression of processing steps and/or operations described is a non-limiting example.

The sequence of steps and/or operations is not limited to that set forth herein and can be changed to occur in an order that is different from an order described herein, with the exception of steps and/or operations necessarily occurring in a particular order. In one or more examples, two operations in succession can be performed substantially concurrently, or the two operations can be performed in a reverse order or in a different order depending on a function or operation involved.

Unless stated otherwise, like reference numerals can refer to like elements throughout even when they are shown in different drawings. Unless stated otherwise, the same reference numerals can be used to refer to the same or substantially the same elements throughout the specification and the drawings. In one or more aspects, identical elements (or elements with identical names) in different drawings can have the same or substantially the same functions and properties unless stated otherwise. Names of the respective elements used in the following explanations are selected only for convenience and can be thus different from those used in actual products.

Advantages and features of the present disclosure, and implementation methods thereof, are clarified through the aspects described with reference to the accompanying drawings. The present disclosure can, however, be embodied in different forms and should not be construed as limited to the example aspects set forth herein. Rather, these example aspects are examples and are provided so that this disclosure can be thorough and complete to assist those skilled in the art to understand the inventive concepts without limiting the protected scope of the present disclosure.

Shapes, dimensions (e.g., sizes, lengths, widths, heights, thicknesses, locations, radii, diameters, and areas), proportions, ratios, angles, numbers, the number of elements, and the like disclosed herein, including those illustrated in the drawings, are merely examples, and thus, the present disclosure is not limited to the illustrated details. It is, however, noted that the relative dimensions of the components illustrated in the drawings are part of the present disclosure.

Where a term like "comprise," "have," "include," "contain," "constitute," "made of," "formed of," "composed of," or the like is used with respect to one or more elements (e.g., layers, films, regions, components, sections, members, parts, regions, areas, portions, steps, operations, and/or the like), one or more other elements can be added unless a term such as "only" or the like is used. The terms used in the present disclosure are merely used in order to describe particular example aspects, and are not intended to limit the scope of the present disclosure. The terms of a singular form can include plural forms unless the context clearly indicates otherwise.

The word "exemplary" is used to mean serving as an example or illustration, unless otherwise specified. Embodiments are example embodiments. Aspects are example aspects. Here, in one or more implementations, "embodiments," "aspects," "examples," and the like should not be construed to be preferred or advantageous over other implementations. An aspect, an example, an example aspect, or the like can refer to one or more aspects, one or more examples, one or more example aspects, or the like, unless stated otherwise. Further, the term "can" encompasses all the meanings and coverages of the term "may."

In one or more aspects, unless explicitly stated otherwise, an element, feature, or corresponding information (e.g., a level, range, dimension, size, or the like) is construed to include an error or tolerance range even where no explicit description of such an error or tolerance range is provided. An error or tolerance range can be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more other parts can be located between the two parts unless a more limiting term, such as "immediate(ly)," "direct(ly)," or "close(ly)," is used. For example, where a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as, for example, "after," "subsequent," "next," "before," "preceding," "prior to," or the like, a case that is not consecutive or not sequential can be included and thus one or more other events can occur therebetween, unless a more limiting term, such as "just," "immediate(ly)," or "direct(ly)," is used.

The terms, such as "below," "lower," "above," "upper" and the like, can be used herein to describe a relationship between element(s) as illustrated in the drawings. It will be understood that the terms are spatially relative and based on the orientation depicted in the drawings.

It is understood that, although the terms "first," "second," or the like can be used herein to describe various elements (e.g., layers, films, regions, components, sections, members, parts, regions, areas, portions, steps, operations, and/or the like), these elements should not be limited by these terms, for example, to any particular order, sequence, precedence, or number of elements. These terms are used only to distinguish one element from another. For example, a first element can denote a second element, and, similarly, a second element can denote a first element, without departing from the scope of the present disclosure. Furthermore, the first element, the second element, and the like can be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element can include one or more first elements. Similarly, a second element or the like can include one or more second elements or the like.

In describing elements of the present disclosure, the terms "first," "second," "A," "B," "(a)," "(b)," or the like can be used. These terms are intended to identify the corresponding element(s) from the other element(s), and these are not used to define the essence, basis, sequence, order, or number of the elements.

For the expression that an element (e.g., layer, film, region, component, section, or the like) is described as "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phrase that an element (e.g., layer, film, region, component, section, or the like) is "provided," "disposed," "connected," "coupled," or the like in, on, with or to another element can be understood, for example, as that at least a portion of the element is provided, disposed, connected, coupled, or the like in, on, with or to at least a portion of another element, or that the entirety of the element is provided, disposed, connected, coupled, or the like in, on, with or to another element. The phrase that an element (e.g., layer, film, region, component, section, or the like) "contacts," "overlaps," or the like with another element can be understood, for example, as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other. Such terms can mean a wider range of lines or directions within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and can be meant as directions having wider directivities within the range within which the components of the present disclosure can operate functionally.

The term "at least one" should be understood as including any and all combinations of one or more of the associated listed items. For example, each of the phrases "at least one of a first item, a second item, or a third item" and "at least one of a first item, a second item, and a third item", can represent (i) a combination of items provided by one or more of the first item, the second item, and the third item or (ii) only one of the first item, the second item, and the third item.

The expression of a first element, a second elements, "and/or" a third element should be understood to encompass one of the first, second, and third elements, as well as any and all combinations of the first, second and third elements. By way of example, A, B and/or C encompass only A; only B; only C; any of A, B, and C (e.g., A, B, or C); some combinations of A, B, and C (e.g., A and B; A and C; or B and C); and all of A, B, and C. Furthermore, an expression "A/B" can be understood as A and/or B. For example, an expression "A/B" can refer to only A; only B; A or B; or A and B.

In one or more aspects, the terms "between" and "among" can be used interchangeably simply for convenience unless stated otherwise. For example, an expression "between a plurality of elements" can be understood as among a plurality of elements. In another example, an expression "among a plurality of elements" can be understood as between a plurality of elements. In one or more examples, the number of elements can be two. In one or more examples, the number of elements can be more than two. Furthermore, when an element (e.g., layer, film, region, component, sections, or the like) is referred to as being "between" at least two elements, the element can be the only element between the at least two elements, or one or more intervening elements can also be present between the at least two elements.

In one or more aspects, the phrases "each other" and "one another" can be used interchangeably simply for convenience unless stated otherwise. For example, an expression "different from each other" can be understood as different from one another. In another example, an expression "different from one another" can be understood as different from each other. In one or more examples, the number of elements involved in the foregoing expression can be two. In one or more examples, the number of elements involved in the foregoing expression can be more than two.

In one or more aspects, the phrases "one or more among" and "one or more of" can be used interchangeably simply for convenience unless stated otherwise.

The term "or" means "inclusive or" rather than "exclusive or." For example, unless otherwise stated or clear from the context, the expression that "x uses a or b" means any one of natural inclusive permutations. For example, "a or b" can mean "a," "b," or "a and b." For example, "a, b or c" can mean "a," "b," "c," "a and b," "b and c," "a and c," or "a, b and c."

Features of various aspects of the present disclosure can be partially or entirely coupled to or combined with each other, can be technically associated with each other, and can be operated, linked, or driven together in various ways. Aspects of the present disclosure can be implemented or carried out independently from each other, or can be implemented or carried out together in a co-dependent or related relationship. In one or more aspects, the components of each apparatus according to various aspects of the present disclosure can be operatively coupled and configured.

Unless otherwise defined, the terms (including technical and scientific terms) used herein have the same meaning as commonly understood by one of ordinary skill in the art to which example aspects belong. It should be further understood that terms, such as those defined in commonly used dictionaries, should be interpreted as having a meaning that is, for example, consistent with their meaning in the context of the relevant art and should not be interpreted in an idealized or overly formal sense, unless expressly defined otherwise herein.

The terms used herein have been selected as being general in the related technical field; however, there can be other terms depending on the development and/or change of technology, convention, preference of technicians, and so on. Therefore, the terms used herein should not be understood as limiting technical ideas, but should be understood as examples of the terms for describing example aspects.

Further, in a specific case, a term can be arbitrarily selected by an applicant, and in this case, the detailed meaning thereof is described herein. Therefore, the terms used herein should be understood based on not only the name of the terms, but also the meaning of the terms and the content hereof.

Furthermore, "X-axis direction," "Y-axis direction," and "Z-axis direction," should not be construed by a geometric relation only of a mutual vertical relation and can have broader directionality within the range that elements of the present disclosure can act functionally.

In the following description, various example aspects of the present disclosure are described in detail with reference to the accompanying drawings. With respect to reference numerals to elements of each of the drawings, the same elements can be illustrated in other drawings, and like reference numerals can refer to like elements unless stated otherwise. The same or similar elements can be denoted by the same reference numerals even though they are depicted in different drawings.

In addition, for convenience of description, a scale, dimension, size, and thickness of each of the elements illustrated in the accompanying drawings can be different from an actual scale, dimension, size, and thickness, and thus, aspects of the present disclosure are not limited to a scale, dimension, size, and thickness illustrated in the drawings.

Figure 2:
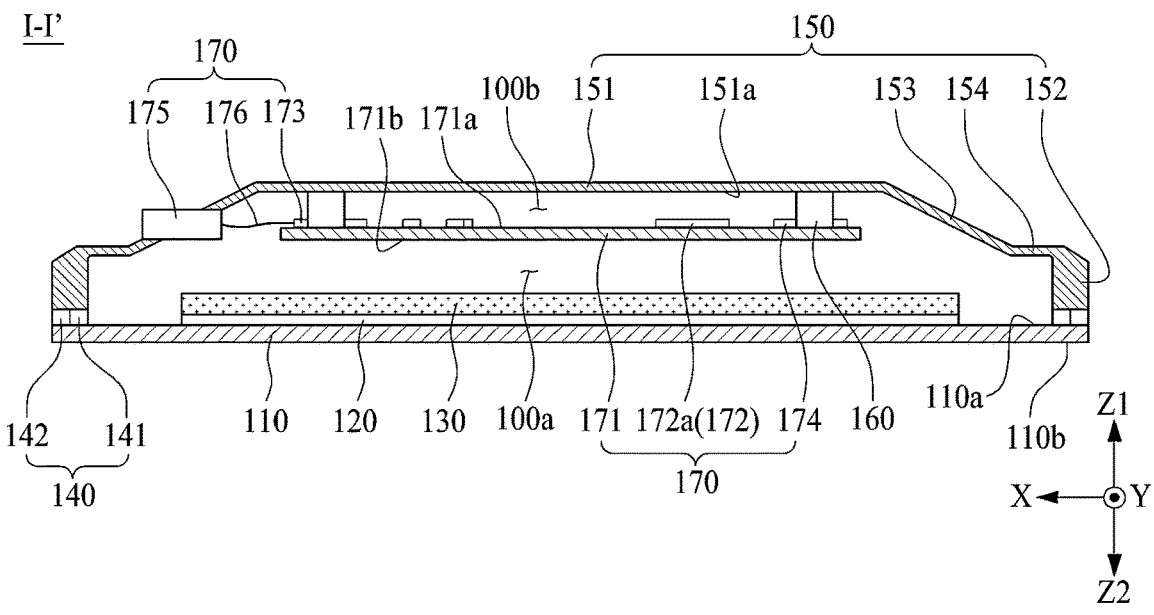
FIG. 2 is a cross-sectional view taken along line I-I' illustrated in FIG. 1 according to an embodiment of the present disclosure.
Figure 3:
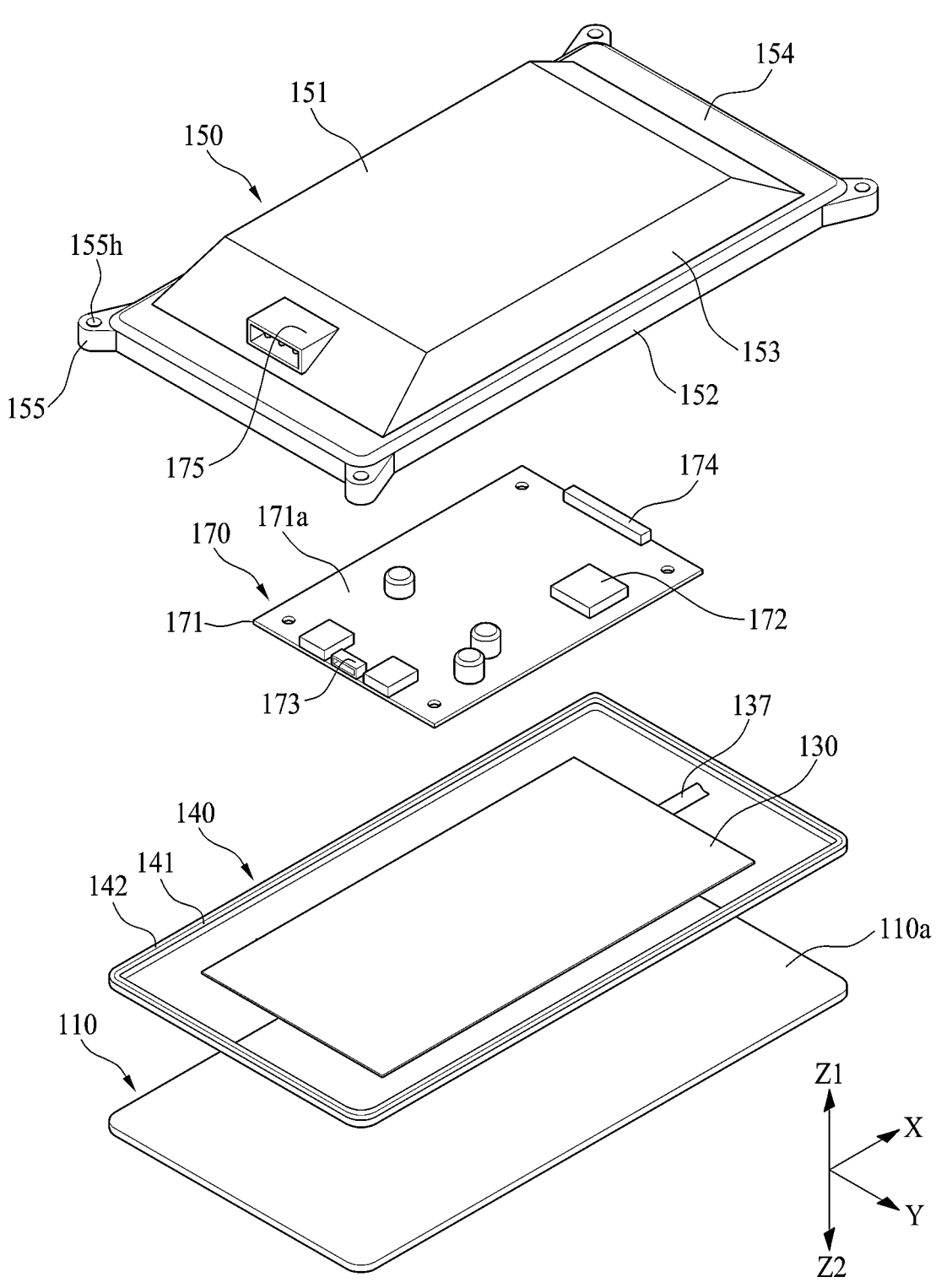
FIG. 3 is an exploded perspective view illustrating an acoustic apparatus according to an embodiment of the present disclosure.

FIG. 1 is a perspective view illustrating an acoustic apparatus according to an embodiment of the present disclosure, FIG. 2 is a cross-sectional view taken along line I-I' illustrated in FIG. 1 according to an embodiment of the present disclosure, and FIG. 3 is an exploded perspective view illustrating an acoustic apparatus according to an embodiment of the present disclosure.

With reference to FIGS. 1 to 3, an acoustic apparatus (or sound apparatus) 100 according to an embodiment of the present disclosure can implement or realize a sound apparatus, a sound output apparatus, a vibration apparatus, a vibration generating apparatus, a sound bar, a sound system, a sound apparatus for electronic apparatuses, a sound apparatus for displays, a sound apparatus for vehicular apparatuses, or a sound bar for vehicular apparatuses, or the like. For example, a vehicular apparatus (or transporting apparatus) can include a vehicle, an automobile, a train, a ship, or an aircraft, but embodiments of the present disclosure are not limited thereto, and can represent any element to which the acoustic apparatus of the present disclosure can be applied. The vehicle or the vehicular apparatus can be any other entity or element in which the acoustic apparatus of the present application can be applied or used. The acoustic apparatus 100 according to an embodiment of the present disclosure can be configured to be transparent, semitransparent, or opaque.

As shown, the acoustic apparatus 100 according to an embodiment of the present disclosure can include a vibration member 110, a vibration apparatus 130, a supporting member 150, and a driving circuit part 170.

The vibration member 110 can generate a vibration or can output a sound (or a sound wave), based on a displacement (or driving) of the vibration apparatus 130. The vibration member 110 can be a vibration object, a passive vibration plate, a vibration panel, a sound plate, a sound panel, a passive vibration panel, a sound output plate, or a sound vibration plate, or the like, but embodiments of the present disclosure are not limited thereto.

The vibration member 110 can include a polygonal shape including a rectangular shape or a square shape, but embodiments of the present disclosure are not limited thereto. For example, in another embodiment, the vibration member 110 can include a triangular shape, or a shape with at least 5 sides. The vibration member 110 can include a widthwise length parallel to a first direction X and a lengthwise length parallel to a second direction Y. For example, with respect to the same plane, the first direction X can be a first horizontal direction or a first horizontal length direction of the vibration member 110, and the second direction Y can be a second horizontal direction or a second horizontal length direction of the vibration member 110 which is orthogonal to the first direction X.

The vibration member 110 according to an embodiment of the present disclosure can include a structure having totally a same thickness, but embodiments of the present disclosure are not limited thereto. For example, the vibration member 110 can include a plate structure having totally a same thickness, but embodiments of the present disclosure are not limited thereto. For example, the vibration member 110 can include a non-planar structure having a convex portion and/or a concave portion.

According to an embodiment of the present disclosure, the vibration member 110 can include a first surface 110a and a second surface 110b opposite to the first surface 110a. For example, in the vibration member 110, the first surface 110a can be a surface in a direction (or a first vertical direction Z1) facing the supporting member 150, and the second surface 110b can be a surface in a direction (or a second vertical direction Z2) facing opposite of the first surface 110a.

In addition, the vibration member 110 according to an embodiment of the present disclosure can be configured to be transparent, semitransparent, or opaque. The vibration member 110 can include a material (or substance) having a material characteristic suitable for outputting a sound based on a vibration. For example, the vibration member 110 can include one or more materials (or substances) of metal, plastic, fiber reinforced plastic, carbon, and wood, but embodiments of the present disclosure are not limited thereto.

According to an embodiment of the present disclosure, the metal material of the vibration member 110 can include any one or more materials of stainless steel, aluminum (Al), an Al alloy, a magnesium (Mg), a Mg alloy, and a magnesium-lithium (Mg—Li) alloy, but embodiments of the present disclosure are not limited thereto.

According to an embodiment of the present disclosure, the plastic material of the vibration member 110 can include polycarbonate, polyethylene terephthalate, polyarylate, polyethylene naphthalate, polysulfone, polyethersulfone, or cyclo-olefin copolymer, or the like, but embodiments of the present disclosure are not limited thereto. For example, the plastic material of the vibration member 110 can include a styrene material. For example, the styrene material can be an ABS material. The ABS material can be acrylonitrile, butadiene, and styrene. However, embodiments of the present disclosure are not limited thereto.

According to an embodiment of the present disclosure, the fiber reinforced plastic of the vibration member 110 can be carbon fiber reinforced plastic (CFRP), but embodiments of the present disclosure are not limited thereto.

The vibration member 110 according to another embodiment of the present disclosure can be configured in a porous material. For example, the vibration member 110 can include a micro cellular plastic material. In another example, the vibration member 110 can be configured as a Micro Cellular polyethylene terephthalate (MCPET) material. The vibration member 110 configured in the MCPET can have capability to reproduce a high original sound because having a low density and an excellent elastic force, thereby enhancing the quality of a sound. For example, the vibration member 110 configured in a porous material can have the relatively large amount of displacement (or bending force) with respect to a vibration (or displacement) of the vibration apparatus 130, based on the porosity, and thus, a sound characteristic and/or a sound pressure level characteristic of a low-pitched sound band generated by a vibration of the vibration member 110 can be improved. Therefore, in the vibration member 110 configured in a porous material, a dip phenomenon and a peak phenomenon in a sound of the low-pitched sound band caused by a vibration can be decreased and a sound pressure level of the low-pitched sound band can be increased. Additionally, in a sound of 1 kHz or less generated by a vibration of the vibration member 110, the number of dip portions and peak portions of a sound pressure level can be decreased.

The vibration apparatus 130 can be configured to vibrate the vibration member 110. The vibration apparatus 130 can be disposed or configured at the vibration member 110. The vibration apparatus 130 can be configured to vibrate (or displace or drive) based on a driving signal (or an electrical signal or a voice signal) applied thereto to vibrate (or displace) the vibration member 110. For example, the vibration apparatus 130 can be an active vibration member, a vibration generator, a vibration structure, a vibrator, a vibration generating device, a sound generator, a sound device, a sound generating structure, or a sound generating device, but embodiments of the present disclosure are not limited thereto.

The vibration apparatus 130 according to an embodiment of the present disclosure can include a piezoelectric material or an electroactive material which have a piezoelectric characteristic. The vibration apparatus 130 can autonomously vibrate (or displace) by a vibration (or displacement) of the piezoelectric material based on a driving signal applied to the piezoelectric material, or can vibrate (or displace) the vibration member 110. For example, the vibration apparatus 130 can alternately repeat contraction and/or expansion based on a piezoelectric effect (or a piezoelectric characteristic) to vibrate (or displace or drive). In addition, the vibration apparatus 130 can vibrate (or displace or drive) in a vertical direction (or a thickness direction) Z1 and Z2 as contraction and/or expansion are alternately repeated by an inverse piezoelectric effect. Further, as discussed above, the vibration apparatus 130 can include a piezoelectric device.

The vibration apparatus 130 according to an embodiment of the present disclosure can include a tetragonal shape or a rectangular shape which has a first length parallel to the first direction X and a second length parallel to the second direction Y. For example, the vibration apparatus 130 can be configured to have a size which is smaller than that of the vibration member 110. The vibration apparatus 130 can be used as a sound generating member or a sound output member for outputting a sound.

The acoustic apparatus 100 according to an embodiment of the present disclosure can further include a connection member 120. The connection member 120 can be disposed or connected between the vibration apparatus 130 and the vibration member 110. The connection member 120 can be disposed between the vibration apparatus 130 and the vibration member 110, and can connect or couple the vibration apparatus 130 to the vibration member 110. For example, the vibration apparatus 130 can be connected or coupled to the vibration member 110 by the connection member 120. For example, the vibration apparatus 130 can be connected to or supported by the first surface 110a of the vibration member 110 by the connection member 120, but embodiments of the present disclosure are not limited thereto. For example, the connection member 120 can be a first connection member, an adhesive member, or a first adhesive member, but embodiments of the present disclosure are not limited thereto. In one embodiment of the present disclosure, the connection member 120 can be directly coupled to the vibration apparatus 130 and the vibration member 110. However, in another embodiment, the connection member 120 can be connected to the vibration apparatus 130 and the vibration member 110 via adhesive layers.

The connection member 120 according to an embodiment of the present disclosure can include an adhesive layer which is good in attaching force or adhesive force. For example, the connection member 120 can be configured as a material including an adhesive layer which is good in attaching force or adhesive force, with respect to each of the vibration apparatus 130 and the first surface 110a of the vibration member 110. For example, the connection member 120 can include a foam pad, a double-sided tape, a double-sided foam pad, a double-sided foam tape, an adhesive, a double-sided adhesive, a double-sided adhesive tape, a double-sided adhesive foam pad, or an adhesive sheet, or the like, but embodiments of the present disclosure are not limited thereto. For example, when the connection member 120 includes the adhesive sheet (or an adhesive layer), the connection member 120 can include only an adhesive layer or a tacky layer without a base member such as a plastic material or the like.

An adhesive layer of the connection member 120 according to an embodiment of the present disclosure can include an adhesive material such as a pressure sensitive adhesive (PSA), an optically cleared adhesive (OCA), or an optically cleared resin (OCR), epoxy resin, acrylic resin, silicone resin, or urethane resin, or the like, but embodiments of the present disclosure are not limited thereto. In another embodiment of the present disclosure, the adhesive layer of the connection member 120 can include an acrylic-based substance (or material) having a characteristic where an adhesive force is relatively better and hardness is higher. Accordingly, a transmission efficiency of the vibration force (or displacement force) transmitted from the vibration apparatus 130 to the vibration member 110 can be increased.

The supporting member 150 can be configured or disposed at the first surface 110a of the vibration member 110. The supporting member 150 can be configured or disposed to cover the first surface 110a of the vibration member 110. The supporting member 150 can be configured to support a periphery portion of the vibration member 110. The supporting member 150 can be configured to support a periphery portion of the first surface 110a of the vibration member 110. Additionally, the supporting member 150 can be configured to cover the vibration apparatus 130 and the first surface 110a of the vibration member 110.

The supporting member 150 according to an embodiment of the present disclosure can include an internal space 100a which surrounds the first surface 110a of the vibration member 110. For example, the supporting member 150 can be configured to include an internal space 100a and can be connected (or coupled) to the first surface 110a of the vibration member 110. Additionally, the acoustic apparatus 100 according to one or more embodiments of the present disclosure can further include an internal space 100a provided at a region between the vibration member 110 and the supporting member 150. For example, the acoustic apparatus 100 according to one or more embodiments of the present disclosure can further include an internal space 100a provided at a region between the first surface 110a of the vibration member 110 and the supporting member 150. Further, the supporting member 150 can include a box shape with one side (or an upper side) opened in order to provide the internal space 100a. Additionally, the supporting member 150 can be a case, an outer case, a case member, a housing, a housing member, a cabinet, an enclosure, a sealing member, a sealing cap, a sealing box, or a sound box, or the like, but embodiments of the present disclosure are not limited thereto. In addition, the internal space 100a of the acoustic apparatus 100 or the supporting member 150 can be an accommodation space, a receiving space, a gap space, an air space, a vibration space, a sound space, a sound box, or a sealing space, or the like, but embodiments of the present disclosure are not limited thereto.

The supporting member 150 according to an embodiment of the present disclosure can be configured to be transparent, semitransparent, or opaque. Additionally, the supporting member 150 can include one or more of a metal material and a nonmetal material (or a composite nonmetal material), but embodiments of the present disclosure are not limited thereto. Further, the supporting member 150 can include one or more materials of a metal material, plastic, and wood, but embodiments of the present disclosure are not limited thereto. The supporting member 150 can include a material with heat dissipation characteristic to dissipate a heat generated from the vibration apparatus 130 and/or the driving circuit part 170.

The supporting member 150 according to an embodiment of the present disclosure can include a first supporting part 151 and a second supporting part 152.

The first supporting part 151 can be configured (or disposed) in parallel with the vibration member 110. The first supporting part 151 can be configured (or disposed) in parallel with the vibration member 110 with the vibration apparatus 130 therebetween. The first supporting part 151 can be disposed to face the first surface 110a of the vibration member 110. The first supporting part 151 can be disposed to cover the first surface 110a of the vibration member 110. The first supporting part 151 can be spaced apart from the first surface 110a of the vibration member 110. For example, the first supporting part 151 can be spaced apart from the first surface 110a of the vibration member 110 with the internal space 100a therebetween. For example, the first supporting part 151 can be a bottom part, a floor part, a bottom plate, a floor plate, a ceiling part, a ceiling plate, a supporting plate, a housing plate, a housing bottom part, a housing floor part, an enclosure plate, or an enclosure bottom part (or an enclosure ceiling part), or the like, but embodiments of the present disclosure are not limited thereto. However, in another embodiment, the first supporting part 151 can not be parallel to the vibration member 110. Further, a thickness of the first supporting part 151 can be the same throughout the first supporting part 151.

The second supporting part 152 can be configured or disposed at a periphery portion of the vibration member 110. The second supporting part 152 can be connected to a periphery portion of the first supporting part 151. For example, the second supporting part 152 can include a structure bent from the periphery portion of the first supporting part 151. For example, the second supporting part 152 can be inclined from vertical directions Z1 and Z2 perpendicular to the ground. For example, the supporting member 150 can include four second supporting parts 152 which are connected to each other. For example, the second supporting part 152 can be a lateral part, a sidewall, a supporting sidewall, a housing lateral surface, a housing sidewall, an enclosure lateral surface, or an enclosure sidewall, or the like, but embodiments of the present disclosure are not limited thereto. Further, a thickness of the second supporting part 152 can be greater than a thickness of the first supporting part 151.

The second supporting part 152 can be integrated into the first supporting part 151. For example, the first supporting part 151 and the second supporting part 152 can be integrated (or configured) as one body (a single body), and thus, the internal space 100a surrounded by the second supporting part 152 can be provided over the first supporting part 151. Accordingly, the supporting member 150 can include a box shape where one side (or an upper side or an upper portion) is opened by the first supporting part 151 and the second supporting part 152.

The supporting member 150 according to an embodiment of the present disclosure can include an inclined part (or a slope part or a slanted par) 153 configured between the first supporting part 151 and the second supporting part 152. The inclined part 153 can be configured to decrease a size of the first supporting part 151 of the supporting member 150. The inclined part 153 can be configured to be inclined at a certain angle between the first support part 151 and the second support part 152. For example, the inclined part 153 can be a chamfer part having a certain angle between the first supporting part 151 and the second supporting part 152. Therefore, the supporting member 150 can include the first supporting part 151 and the inclined part 153 which protrudes from the first supporting part 151. Additionally, the internal space 100a can further include a protrusion space 100b. In addition, the supporting member 150 can include the internal space (or a first space) 100a surrounded by the second supporting part 152 and the protrusion space (or a second space) 100b surrounded by the inclined part 153. For example, the protrusion space 100b can be a circuit arrangement space or a circuit accommodation space, but embodiments of the present disclosure are not limited thereto.

The supporting member 150 according to an embodiment of the present disclosure can further include an edge flat part (or an edge planar part) 154 between the second supporting part 152 and the inclined part 153. The edge flat part 154 can be configured parallel to the first supporting part 151. The second supporting part 152 can be connected to a periphery portion of the edge flat part 154 or include a structure bent from the periphery portion of the edge flat part 154. For example, the edge flat part 154 can be omitted.

The supporting member 150 can be connected or coupled to the vibration member 110 by a coupling member 140. The supporting member 150 can be connected or coupled to the first surface 110a of the vibration member 110 by the coupling member 140. For example, the supporting member 150 can be connected or coupled to a periphery portion of the first surface 110a of the vibration member 110 by the coupling member 140.

The coupling member 140 can be configured to minimize or prevent the transfer of a vibration of the vibration member 110 to the supporting member 150. The coupling member 140 can include a material characteristic suitable for blocking a vibration. For example, the coupling member 140 can include a material having elasticity (or Young's modulus). For example, the coupling member 140 can include a material having elasticity for vibration absorption (or impact absorption). The coupling member 140 according to an embodiment of the present disclosure can be configured as polyurethane materials or polyolefin materials, but embodiments of the present disclosure are not limited thereto. Additionally, the coupling member 140 can include one or more of a double-sided adhesive member, a double-sided tape, a double-sided foam tape, a double-sided foam pad, and a double-sided cushion tape, but embodiments of the present disclosure are not limited thereto.

The coupling member 140 according to an embodiment of the present disclosure can include a waterproof structure or a waterproof member to prevent the penetration of water into the internal space 100*a*. For example, the coupling member 140 can include one or more of a waterproof tape or a waterproof pad, but embodiments of the present disclosure are not limited thereto.

The coupling member 140 according to an embodiment of the present disclosure can prevent a physical contact (or friction) between the vibration member 110 and the second supporting part 152 of the supporting member 150, and thus, can prevent the occurrence of noise (or a noise sound) caused by the physical contact (or friction) between the vibration member 110 and the supporting member 150. For example, the coupling member 140 can be a buffer member, an elastic member, a damping member, a vibration absorption member, a vibration prevention member, or a vibration blocking member, but embodiments of the present disclosure are not limited thereto.

The coupling member 140 according to another embodiment of the present disclosure can be configured to minimize or prevent the transfer of a vibration of the vibration member 110 to the supporting member 150 and to decrease the reflection of a sound wave which is generated and input based on a vibration of the vibration member 110 from reaching the second supporting part 152. Accordingly, the second supporting part 152 does not receive vibrations generated by the vibration member 110.

The coupling member 140 according to another embodiment of the present disclosure can include a first coupling member 141 and a second coupling member 142.

The first coupling member 141 can be disposed at a region between the vibration member 110 and the supporting member 150. Additionally, the first coupling member 141 can be disposed at a region between the vibration member 110 and the second supporting part 152 of the supporting member 150. The first coupling member 141 can be disposed or coupled between a rear periphery portion of the vibration member 110 and a second supporting part 152 of the supporting member 150. Further, the first coupling member 141 can be disposed inward (or an inner portion) of the second coupling member 142. The first coupling member 141 can be configured to have hardness (for example, a modulus or a Young's modulus) which is smaller than that of the second coupling member 142. In addition, the first coupling member 141 can include a double-sided polyurethane tape, a double-sided polyurethane foam tape, or a double-sided sponge tape, or the like, but embodiments of the present disclosure are not limited thereto.

The second coupling member 142 can be disposed at a region between the vibration member 110 and the supporting member 150. For example, the second coupling member 142 can be disposed at a region between the vibration member 110 and the supporting member 150 to surround the first coupling member 141. For example, the second coupling member 142 can be disposed or coupled between a periphery portion of the first surface 110*a* of the vibration member 110 and the second supporting part 152 of the supporting member 150 to surround the first coupling member 141. Further, the second coupling member 142 can be disposed outward (or an outer portion) from the first coupling member 141. The second coupling member 142 can be configured to have hardness (for example, a modulus or a Young's modulus) which is greater than that of the first coupling member 141. Additionally, the second coupling member 142 can include a double-sided polyolefin tape, a double-sided polyolefin foam tape, a double-sided acrylic tape, or a double-sided acrylic foam tape, or the like, but embodiments of the present disclosure are not limited thereto.

Further, in another embodiment, more than two coupling members can be provided. For example, in an embodiment, at least three coupling members may be provided. The first coupling member 141 can be disposed outermost of all of the coupling members. Further, the first coupling member 141 can also have the highest hardness of all of the coupling members. Additionally, each coupling member may have a lower hardness the closer the coupling member is disposed towards the internal space 100*a*.

The coupling member 140 according to another embodiment of the present disclosure can absorb a sound which is generated and input based on a vibration of the vibration member 110 by the first coupling member 141 which is relatively soft and is disposed inward from the second coupling member 142 which is relatively stiff (or harder), and thus, a reflected sound (or a reflected wave) generated by being reflected from the coupling member 140 can be minimized. Accordingly, each of a highest sound pressure level and a lowest sound pressure level generated in a reproduction frequency band of a sound generated based on a vibration of the vibration member 110 can be reduced, and thus, flatness of a sound pressure level can be reduced. For example, the flatness of the sound pressure level can be the magnitude of the deviation between the highest sound pressure level and the lowest sound pressure level.

In the coupling member 140 according to another embodiment of the present disclosure, the second coupling member 142 which is relatively stiff can be disposed inward from the first coupling member 141 which is relatively soft. Accordingly, a sound pressure level in a specific-pitched sound band of a sound can be reduced. For example, a sound pressure level in a-pitched sound band of 2 kHz to 5 kHz and 7 kHz to 12 kHz can be reduced due to a reflected sound (or a reflected wave) generated by being reflected from the second coupling member 142 which is relatively stiff. Therefore, when a reduction in a sound pressure level in a-pitched sound band of 2 kHz to 5 kHz and 7 kHz to 12 kHz is needed based on a shape and a size of the vibration member 110, the second coupling member 142 which is relatively stiff can be disposed inward from the first coupling member 141 which is relatively soft, and thus, flatness of a sound pressure level can be improved based on a reduction in a sound pressure level in a-pitched sound band of 2 kHz to 5 kHz and 7 kHz to 12 kHz generated by the second coupling member 142.

The coupling member 140 according to an embodiment of the present disclosure can include one or more protrusion portions. One or more protrusion portions can be configured at an inner side of the coupling member 140 adjacent to the internal space 100*a*. For example, the one or more protrusion portions can have a triangular shape or a saw-toothed shape, but embodiments of the present disclosure are not limited thereto.

The one or more protrusion portions can absorb or trap a reflected wave generated by reflection from the coupling member 140, and thus, can prevent or minimize a reduction in sound pressure level characteristic caused by a standing wave generated by interference of a reflected wave and a progressive wave. For example, a reflected wave reflected from the coupling member 140 based on a vibration of the vibration member 110 can be dispersed or reflected by the one or more protrusion portions, and thus, an overlap and interference phenomenon between a reflected wave and a progressive wave can be prevented or minimized, thereby preventing or minimizing the occurrence of a standing wave.

In the coupling member 140 according to another embodiment of the present disclosure, one or more of the first coupling member 141 and the second coupling member 142 can include a waterproof structure or a waterproof member to prevent the penetration of water into the internal space 100*a*. For example, one or more of the first coupling member 141 and the second coupling member 142 can include one or more of a waterproof tape or a waterproof pad, but embodiments of the present disclosure are not limited thereto. For example, the first coupling member 141 can be a first waterproof tape, and the second coupling member 142 can be a second waterproof tape. Accordingly, water can be prevented from entering the internal space 100*a*.

According to another embodiment of the present disclosure, the supporting member 150 can be connected or coupled to the vibration member 110 by an ultrasonic fusion process without a separate coupling member 140. For example, the supporting member 150 can be connected or coupled to first surface 110*a* of the vibration member 110 by an ultrasonic fusion process without a separate coupling member 140. For example, the supporting member 150 can be connected or coupled to a periphery portion of the first surface 110*a* of the vibration member 110 by an ultrasonic fusion process without a separate coupling member 140.

The driving circuit part 170 can be accommodated into the acoustic apparatus 100. The driving circuit part 170 can be disposed (or accommodated) in the internal space 100*a* of the supporting member 150 of the acoustic apparatus 100 and can be connected to electrically connected to the vibration apparatus 130. For example, the driving circuit part 170 can be disposed (or accommodated) at the protrusion space 100*b* of the supporting member 150 or the acoustic apparatus 100. For example, the driving circuit part 170 can be disposed (or accommodated) at the protrusion space 100*b* of the supporting member 150 to be spaced apart from the vibration apparatus 130. Accordingly, the acoustic apparatus 100 according to one or more embodiments of the present disclosure can be an acoustic apparatus with a driving circuit integrated therein or an acoustic apparatus with a driving circuit embedded therein.

The driving circuit unit 170 according to an embodiment of the present disclosure can include a printed circuit board (PCB) 171.

The PCB 171 can be disposed (or accommodated) at the protrusion space 100*b* of the supporting member 150 or the acoustic apparatus 100. For example, the PCB 171 can be disposed (or accommodated) at the protrusion space 100*b* of the supporting member 150 to be spaced apart from the vibration apparatus 130. The PCB 171 can be disposed at or fixed to the supporting member 150 by a fixing member 160.

The fixing member 160 can be configured between the supporting member 150 and the PCB 171. The fixing member 160 can be configured between the first supporting part 151 of the supporting member 150 and the PCB 171. The fixing member 160 can be configured to have a certain height from the first supporting part 151 to separate the PCB 171 from the first supporting part 151 by a certain distance. Accordingly, the occurrence of sound noise (or noise) caused by a physical contact (or friction) between the PCB 171 and the first supporting part 151 can be prevented.

As an embodiment of the present disclosure, the fixing member 160 can include a plurality of projections (or boss) which protrude from the first supporting part 151 of the supporting member 150. For example, the plurality of projections can be configured to respectively support corner portions of the PCB 171, but embodiments of the present disclosure are not limited thereto. For example, the plurality of projections can protrude to have a certain height from an inner surface 151*a* of the first supporting part 151 corresponding to each corner portion of the PCB 171. For example, the PCB 171 can be fixed to the fixing member 160 by a plurality of screws or bolts fastened to the plurality of projections. For example, the PCB 171 can be spaced apart from the first supporting part 151 by a certain distance, based on a height of each of the plurality of projections. Additionally, the fixing member 160 can be disposed anywhere on the PCB 171. More specifically, the fixing member 160 can be disposed between an upper surface of the PCB 171 and the inner surface 151*a* of the first supporting part 151.

As another embodiment of the present disclosure, the fixing member 160 can include a plurality of adhesive members (or one or more adhesive members) disposed between the first supporting part 151 and the PCB 171. The plurality of adhesive members can be adhered between a periphery portion or each corner portion of the PCB 171 and the inner surface 151*a* of the first supporting part 151. For example, the PCB 171 can be fixed to the first supporting part 151 by the plurality of adhesive members. For example, the PCB 171 can be spaced apart from the first supporting part 151 by a certain distance, based on a height of each of the plurality of adhesive members.

Each of the plurality of adhesive members can include a material having an adhesive force and elasticity in order to prevent vibration transfer between the supporting member 150 and the PCB 171. For example, each of the plurality of adhesive members can include one or more of a double-sided tape, a double-sided foam tape, a double-sided foam pad, and a double-sided cushion tape, but embodiments of the present disclosure are not limited thereto.

The driving circuit part 170 or the PCB 171 according to an embodiment of the present disclosure can include a driving signal generating circuit 172, a first connector terminal 173, and a second connector terminal 174.

The driving signal generating circuit 172 can be configured at the PCB 171. For example, the driving signal generating circuit 172 can be configured at a first surface 171*a* of the PCB 171. Additionally, the driving signal generating circuit 172 can be configured at the first surface 171*a* of the PCB 171 facing or directly facing the first supporting part 151 of the supporting member 150. Further, a second surface 171*b*, which is opposite to the first surface 171*a*, of the PCB 171 can face or directly face the vibration apparatus 130. For example, when the first surface 171*a* of the PCB 171 including the driving signal generating circuit 172 is disposed to face or directly face the vibration apparatus 130, sound quality can be degraded by the reflection of a sound wave by the driving signal generating circuit 172. Therefore, when the second surface 171*b* of the PCB 171 where the driving signal generating circuit 172 is not provided is disposed to face or directly face the vibration apparatus 130, a degradation in sound quality caused by the reflection of a sound wave by the driving signal generating circuit 172 can be minimized or prevented.

The driving signal generating circuit 172 can generate a driving signal (or a sound signal or a vibration signal) DS for vibrating (or displacing or driving) the vibration apparatus 130 based on sound data (or a sound signal) input from a host apparatus (or a host driving circuit) and supply to the vibration apparatus 130.

The driving signal generating circuit 172 according to an embodiment of the present disclosure can include an amplifier circuit 172*a*.

The amplifier circuit 172*a* can be configured to generate a driving signal (or a sound source signal or a vibration signal) DS based on a sound source data (or a sound source signal) input from a host apparatus (or a host driving circuit) and supply the driving signal to the vibration apparatus 130.

The amplifier circuit 172a according to an embodiment of the present disclosure can include a pre-amplifier and a main amplifier. The pre-amplifier can primarily amplify the sound source signal (or the sound source data) to generate an amplification signal. The main amplifier can amplify an amplification signal supplied from the pre-amplifier to generate a driving signal and can output the generated driving signal to the vibration apparatus 130. For example, the driving signal can include a positive driving signal (or a first driving signal) and a negative driving signal (or a second driving signal). Accordingly, the vibration apparatus 130 can vibrate (or displace or drive) by the first and second driving signals of the driving signal to vibrate the vibration member 110, thereby generating or outputting a sound (or a vibration sound).

The driving signal generating circuit 172 according to an embodiment of the present disclosure can further include various passive elements and semiconductor integrated circuits configured to generate the driving signal.

The first connector terminal 173 can be disposed (or mounted) at one side (or one portion) of the PCB 171. For example, the first connector terminal 173 can include a plurality of signal input terminals.

The second connector terminal 174 can be disposed (or mounted) at the other side of the PCB 171 and can be electrically connected to the vibration apparatus 130 through a signal supply member 137. For example, the second connector terminal 174 can be disposed (or mounted) at the other side of the PCB 171 adjacent to the vibration apparatus 130. For example, the second connector terminal 174 can include a plurality of signal output terminals. Accordingly, the driving signal output from the driving signal generating circuit 172 can be supplied to the vibration apparatus 130 through the second connector terminal 174 and the signal supply member 137, and the vibration apparatus 130 can vibrate (or displace or drive) based on the driving signal supplied from the driving signal generating circuit 172 through the second connector terminal 174 and the signal supply member 137 to vibrate the vibration member 110, thereby generating or outputting a sound (or a vibration sound).

The driving circuit part 170 according to an embodiment of the present disclosure can further include a connection connector 175.

The connection connector 175 can configured to be electrically connected to the PCB 171. A portion of the connection connector 175 can pass through a lateral surface of the supporting member 150 and can be accommodated into the internal space 100a. For example, the connection connector 175 can be inserted (or accommodated) into a portion of the second supporting part 152 or the inclined part 153 of the supporting member 150. For example, a portion (or an inner portion) of the connection connector 175 can pass through a portion of the inclined part 153 of the supporting member 150 in a horizontal direction X and can be disposed (or accommodated) at the internal space 100a. For example, the supporting member 150 can further include a connector inserting hole (or a connector accommodating hole) which is provided at the second supporting part 152 or the inclined part 153 so that the portion (or the inner portion) of the connection connector 175 is inserted (or accommodated) therein. For example, a waterproof member (or waterproof adhesive or waterproof tape) can be disposed or interposed between the connector inserting hole and the connection connector 175.

The connection connector 175 can be configured to be electrically connected to the first connector terminal 173 disposed (or mounted) on the PCB 171. For example, the connection connector 175 can be configured to be electrically connected to the first connector terminal 173 through a connection line 176 which is at the internal space 100a. The connection connector 175 can be configured to be electrically connected to a signal input cable connected to the host apparatus (or a host driving circuit) and can be electrically connected to the first connector terminal 173 through the connection line 176. Accordingly, the host apparatus (or the host driving circuit) can supply a sound data (or a sound signal) to the first connector terminal 173 through the signal input cable, the connection connector 175, and the connection line 176.

The connection connector 175 according to an embodiment of the present disclosure can include a waterproof structure or a waterproof member to prevent the penetration of water into the internal space 100a. For example, the connection connector 175 can be a waterproof connector, but embodiments of the present disclosure are not limited thereto. In addition, the acoustic apparatus 100 according to an embodiment of the present disclosure can have a waterproof structure, based on the connection connector 175 configured at the supporting member 150 and a connection between the vibration member 110 and the supporting member 150 by the coupling member 140.

The acoustic apparatus 100 or the supporting member 150 according to an embodiment of the present disclosure can include a plurality of coupling parts 155. For example, the second supporting part 152 of the supporting member 150 can include a plurality of coupling parts 155.

The plurality of coupling parts 155 can be configured at each corner portion of the supporting member 150. The plurality of coupling parts 155 can be configured to have a certain length at each corner portion of the second supporting part 152 of the supporting member 150. Each of the plurality of coupling parts 155 can protrude to have a certain length from each corner portion of the second supporting part 152. Additionally, each of the plurality of coupling parts 155 can be a fixing part, a protrusion part, a protrusion piece, a coupling piece, or a coupling bracket, but embodiments of the present disclosure are not limited thereto.

Although an embodiment includes that the plurality of coupling parts 155 can be configured at each corner portion of the supporting member 150, the present disclosure is not limited thereto. According to another embodiment, the plurality of coupling parts 155 can be disposed at any portion of the second supporting part 152 of the supporting member 150.

Each of the plurality of coupling parts 155 can include a through hole (or a hole or a first hole) 155h. The through hole 155h of each of the plurality of coupling parts 155 can be formed to pass through a portion of a fastening means (or a screw thread) such as a screw or a bolt.

Each of the plurality of coupling parts 155 can be coupled to a mount object by a fastening means such as a screw or a bolt. For example, the fastening means can pass through the through hole 155h of each of the plurality of coupling parts 155 and can be fastened to the mount object, and thus, can couple each of the plurality of coupling parts 155 to the mount object. Therefore, the acoustic apparatus 100 or the supporting member 150 can be coupled to or equipped at the mount object and can generate or output a sound, based on a vibration of the vibration member 110 based on a vibration of the vibration apparatus 130. For example, the mount object can be a structure material which supports the acoustic apparatus 100 so that a sound is output from the acoustic apparatus 100. Further, the mount object can be a structure of a vehicular apparatus, a wall of a building, or a structure of a display apparatus, or the like, but embodiments of the present disclosure are not limited thereto. In addition, the structure of the vehicular apparatus can be an exterior material, an interior material, a ceiling material, a vehicle body floor, or a vehicle body bottom frame, but embodiments of the present disclosure are not limited thereto.

The acoustic apparatus 100 according to an embodiment of the present disclosure can generate (or output) a sound, based on a vibration of the vibration member 110, which in turn is based on a vibration of the vibration apparatus 130. The acoustic apparatus 100 according to an embodiment of the present disclosure can generate (or output) a sound based on the vibration of the vibration member 110 having a size which is greater than that of the vibration apparatus 130, thereby enhancing a sound characteristic and/or a sound pressure level characteristic of a low-pitched sound band. The acoustic apparatus 100 according to an embodiment of the present disclosure can output a sound having a sound pressure level of 60 dB or more in a pitched sound band of 300 Hz or more.

The acoustic apparatus 100 according to an embodiment of the present disclosure can include the vibration apparatus 130 configured with a piezoelectric device, and thus, can be lightweight and can have a thin thickness and can output a virtual engine sound or a sound having a wide directivity angle or a non-directivity angle, based on a non-directivity characteristic of the vibration apparatus 130 configured with the piezoelectric device. However, the present disclosure is not limited thereto. The acoustic apparatus 100 according to an embodiment of the present disclosure can have a sound having a wide directivity angle compared to a sound generated based on a vibration of an actuator including a magnet and a coil. For example, when the vibration apparatus 130 configured with the piezoelectric device is configured to output a virtual engine sound, the vibration apparatus 130 can output a uniform virtual engine sound in each of a forward direction, a rearward direction, a left direction, and a right direction with respect to the vibration apparatus 130. The acoustic apparatus 100 according to an embodiment of the present disclosure can output a sound or a virtual engine sound having a sound pressure level of 60 dB or more in a pitched sound band of 300 Hz or more.

Figure 4:
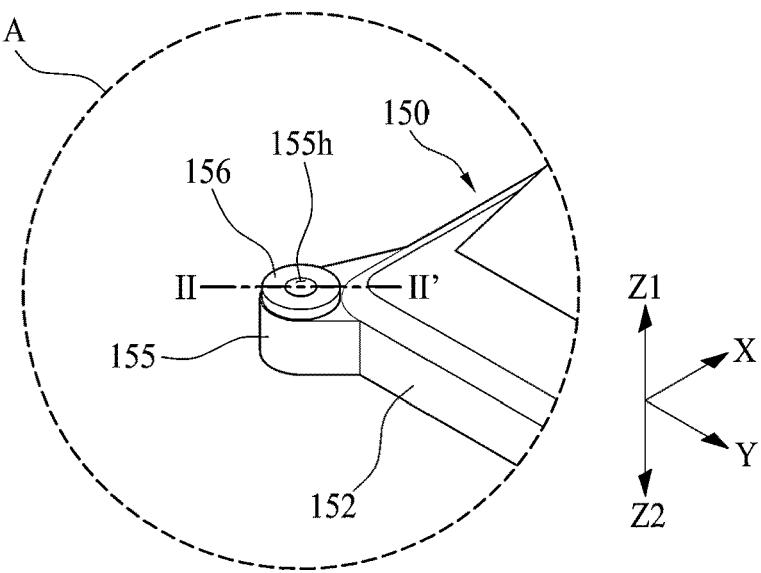
FIG. 4 is an enlarged view of a portion 'A' illustrated in FIG. 1 according to an embodiment of the present disclosure.
Figure 5:
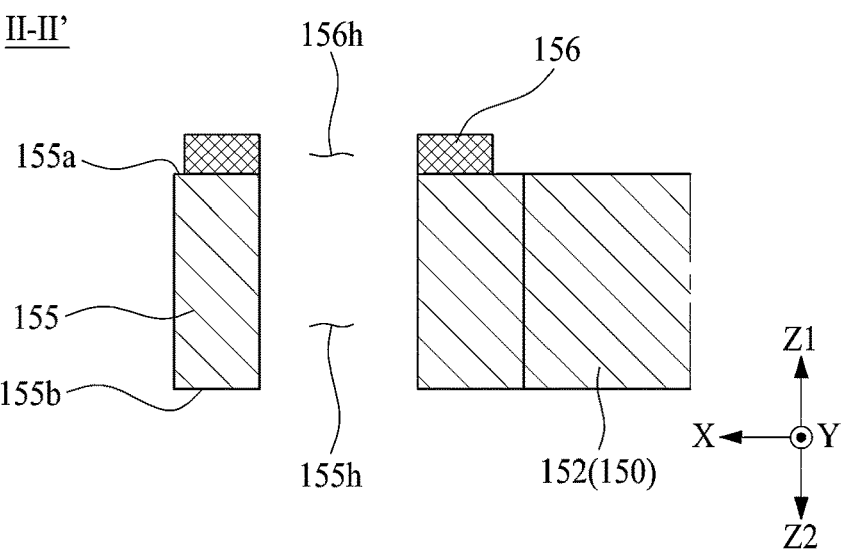
FIG. 5 is a cross-sectional view taken along line II-II' illustrated in FIG. 4 according to an embodiment of the present disclosure.

FIG. 4 illustrates an enlarged view of a portion 'A' illustrated in FIG. 1 according to an embodiment of the present disclosure. FIG. 5 is a cross-sectional view taken along line II-II' illustrated in FIG. 4 according to an embodiment of the present disclosure. FIGS. 4 and 5 illustrate an embodiment where a pad member is further configured at the acoustic apparatus according to an embodiment of the present disclosure described above with reference to FIGS. 1 to 3. In the following description, the other elements except a pad member and relevant elements are referred to like reference numerals and repeated descriptions thereof can be omitted.

With reference to FIGS. 1, 4, and 5, the acoustic apparatus 100 according to an embodiment of the present disclosure can further include a pad member 156.

The pad member 156 can be configured at the supporting member 150 to prevent a vibration of the acoustic apparatus 100 or the supporting member 150 from being transferred to the mount object or prevent a vibration of the mount object from being transferred to the acoustic apparatus 100 or the supporting member 150. The pad member 156 can include a material characteristic suitable for blocking a vibration.

For example, the pad member 156 can include a material having elasticity. For example, the pad member 156 can include a material having elasticity for vibration absorption (or impact absorption). Additionally, the pad member 156 can include a ductile material having elasticity. The pad member 156 according to an embodiment of the present disclosure can be configured as polyurethane materials, polyolefin materials, silicone material, rubber material, or porous material, but embodiments of the present disclosure are not limited thereto. Further, the pad member 156 can be a buffer member, an elastic member, a damping member, a vibration absorption member, a vibration prevention member, or a vibration blocking member, but embodiments of the present disclosure are not limited thereto.

The pad member 156 can be configured at each of the plurality of coupling parts 155 which are configured at the acoustic apparatus 100 or the supporting member 150. For example, the pad member 156 can be coupled to a first surface (or an upper surface) 155a of each of the plurality of coupling parts 155. Additionally, the pad member 156 can be coupled to the first surface 155a of each of the plurality of coupling parts 155 facing the mount object. In another embodiment, the pad member 156 can be provided as one body with the first surface 155a of each of the plurality of coupling parts 155. For example, the pad member 156 may configure in one body with the first surface 155a of each of the plurality of coupling parts 155.

The pad member 156 can include a hollow portion 156h overlapping the through hole 155h at each of the plurality of coupling parts 155. For example, the pad member 156 can have a circular ring shape including the hollow portion 156h, but embodiments of the present disclosure are not limited thereto.

The pad member 156 can be disposed (or interposed) between each of the plurality of coupling parts 155 and the mount object, and thus, can block or prevent vibration transfer between the mount object and the acoustic apparatus 100 and can prevent the occurrence of sound noise (or noise) caused by vibration transfer between the mount object and the acoustic apparatus 100.

Figure 6:
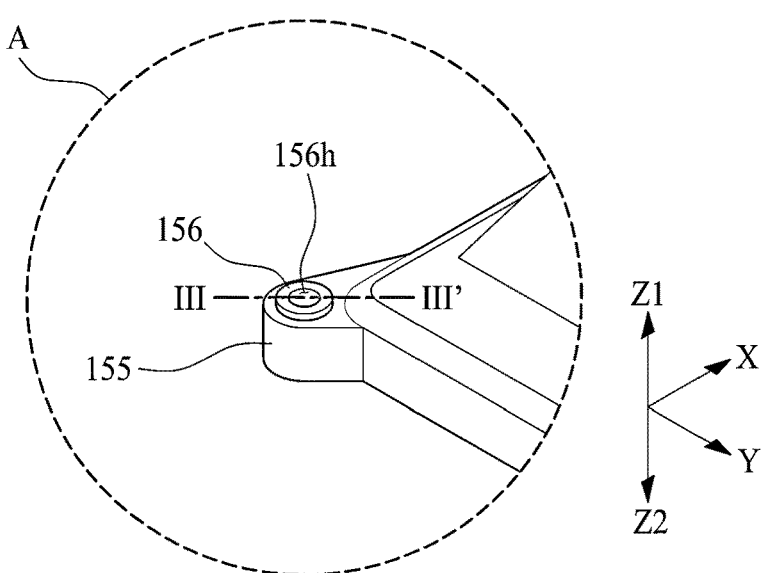
FIG. 6 is another enlarged view of a portion 'A' illustrated in FIG. 1 according to an embodiment of the present disclosure.
Figure 7:
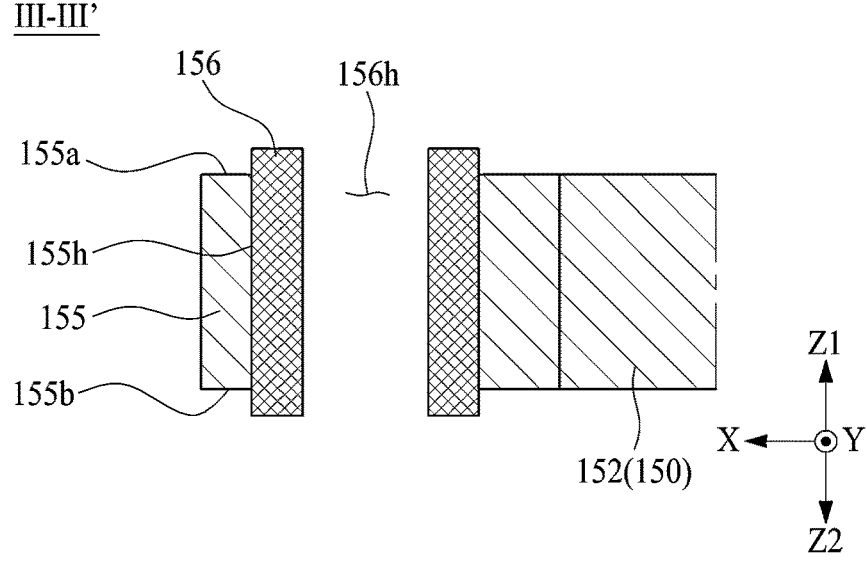
FIG. 7 is a cross-sectional view taken along line III-III' illustrated in FIG. 6 according to an embodiment of the present disclosure.

FIG. 6 is another enlarged view of a portion 'A' illustrated in FIG. 1 according to an embodiment of the present disclosure. FIG. 7 is a cross-sectional view taken along line III-III' illustrated in FIG. 6 according to an embodiment of the present disclosure. FIGS. 6 and 7 illustrate an embodiment implemented by modifying the pad member according to an embodiment of the present disclosure described above with reference to FIG. 5. In the following description, the other elements except a pad member and relevant elements are referred to like reference numerals and repeated descriptions thereof can be omitted.

With reference to FIGS. 1, 6, and 7, the pad member 156 according to another embodiment of the present disclosure can be configured at each of the plurality of coupling parts 155 which are configured at the acoustic apparatus 100 or the supporting member 150.

The pad member 156 can be configured to pass through the through hole 155h of each of the plurality of coupling parts 155. The pad member 156 can be inserted (or accommodated) into the through hole 155h of each of the plurality of coupling parts 155. The pad member 156 can protrude by a certain height from the first surface 155a (or an upper surface) and a second surface 155b (or a lower surface) of each of the plurality of coupling parts 155. For example, with respect to a vertical direction (Z1, Z2), a height of the pad member 156 can be greater than that of the coupling part 155. The pad member 156 can be provided as one body with each of the plurality of coupling parts 155. For example, the pad member 156 can configure in one body with each of the plurality of coupling parts 155. In addition, the pad member 156 can correspond to edge portions of the plurality of coupling parts 155.

The pad member 156 can include a hollow portion 156h overlapping with the through hole 155h of each of the plurality of coupling parts 155. For example, the pad member 156 can have a circular pillar shape or a pipe shape including the hollow portion 156h, but embodiments of the present disclosure are not limited thereto. The pad member 156 can include a same material as that of the pad member 156 described above with reference to FIGS. 4 and 5, and thus, a repeated description thereof can be omitted.

An upper surface of the pad member 156 protruding upward from the first surface 155a of each of the plurality of coupling parts 155 can be disposed (or interposed) between each of the plurality of coupling parts 155 and the mount object, and thus, can block or prevent vibration transfer between the mount object and the acoustic apparatus 100 and can prevent the occurrence of sound noise (or noise) caused by vibration transfer between the mount object and the acoustic apparatus 100. Further, a top surface of the pad member 156 can protrude above a top surface of the plurality of coupling parts 155.

A center portion of the pad member 156 inserted (or accommodated) into the through hole 155h of each of the plurality of coupling parts 155 can block or prevent the transfer of a vibration to the supporting member 150 by a fastening means fastened to the mount object and can prevent the occurrence of sound noise (or noise) caused by vibration transfer between the mount object and the acoustic apparatus 100 by a fastening means.

Figure 8:
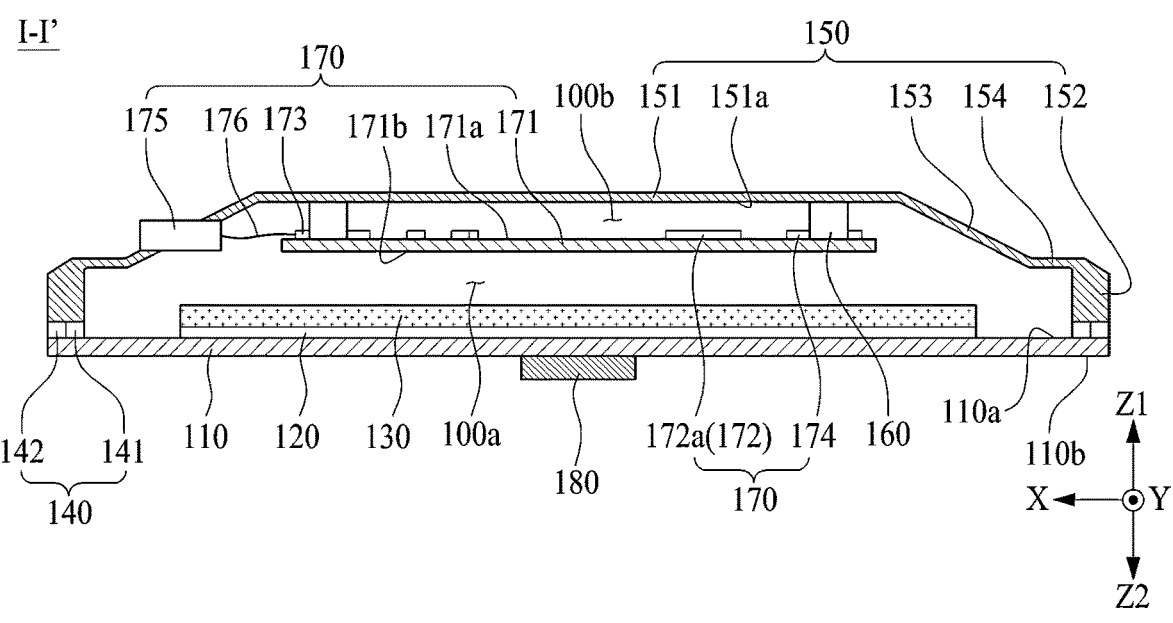
FIG. 8 is another cross-sectional view taken along line I-I' illustrated in FIG. 1 according to an embodiment of the present disclosure.

FIG. 8 is another cross-sectional view taken along line I-I' illustrated in FIG. 1 according to an embodiment of the present disclosure. FIG. 8 illustrates an embodiment where a mass member is further configured at the acoustic apparatus according to an embodiment of the present disclosure described above with reference to FIGS. 1 to 7. In the following description, the other elements except a mass member and relevant elements are referred to like reference numerals and repeated descriptions thereof are omitted.

With reference to FIGS. 1 to 8, the acoustic apparatus 100 according to another embodiment of the present disclosure can further include one or more mass members 180.

According to another embodiment of the present disclosure, the one or more mass members 180 can be disposed at the vibration member 110 to overlap the vibration apparatus 130. The one or more mass members 180 can be coupled or attached to a first surface 100a of the vibration member 110. The one or more mass members 180 can be coupled or attached to the first surface 100a of the vibration member 110 to overlap a center portion of the vibration apparatus 130. For example, the acoustic apparatus 100 according to an embodiment of the present disclosure can include one mass member 180 which is coupled or attached to the center portion of the first surface 100a of the vibration member 110 to overlap the center portion of the vibration apparatus 130. However, according to another embodiment, the mass members 180 can be disposed at other locations on the first surface 100a of the vibration member 110. For example, the mass members 180 can be disposed at edge portions of the first surface 100a of the vibration member 110.

According to another embodiment of the present disclosure, the one or more mass members 180 can be disposed at the vibration apparatus 130 in the internal space 100a. The one or more mass members 180 can be attached to the center portion of the vibration apparatus 130. For example, the one or more mass members 180 can be attached to the center portion of the vibration apparatus 130 to be disposed between the vibration apparatus 130 and the supporting member 150.

The one or more mass members 180 according to an embodiment of the present disclosure can have a polygonal pillar shape or a circular pillar shape, but the present disclosure is not limited thereto. The one or more mass members 180 according to an embodiment of the present disclosure can be configured as a weighing material having a large weight, but embodiments of the present disclosure are not limited thereto. For example, the one or more mass members 180 can include one or more materials of stainless steel, aluminum (Al), an Al alloy, titanium (Ti), or titanium alloy, but embodiments of the present disclosure are not limited thereto.

The one or more mass members 180 can increase a weight (or a mass) in a region of the vibration member 110 overlapping the vibration apparatus 130, and thus, can be lowered a lowest resonance frequency (or a lowest natural frequency) of the vibration member 110. Therefore, the vibration apparatus 130 can vibrate at a relatively low frequency due to a lowest resonance frequency (or a lowest natural frequency) based on an increase in mass caused by the one or more mass members 130. Accordingly, a sound characteristic and/or a sound pressure level characteristic of a low-pitched sound band generated by the vibration of the vibration member 110 based on a vibration of the vibration apparatus 130 can be enhanced. For example, the one or more mass members 180 can be a local mass, a point mass, a resonance pad, a weight member, or a weight clapper, but embodiments of the present disclosure are not limited thereto. For example, the low-pitched sound band can be about 300 Hz or less or about 500 Hz or less, but embodiments of the present disclosure are not limited thereto.

The acoustic apparatus 100 according to an embodiment of the present disclosure can have substantially a same effect as that of the acoustic apparatus described above with reference to FIGS. 1 to 7. The acoustic apparatus 100 according to an embodiment of the present disclosure can further include the one or more mass members 180, and thus, a sound characteristic and/or a sound pressure level characteristic of a low-pitched sound band can be increased or improved and a low-pitched sound band of a sound generated based on a vibration of the vibration member 110 can be expanded.

Figure 9:
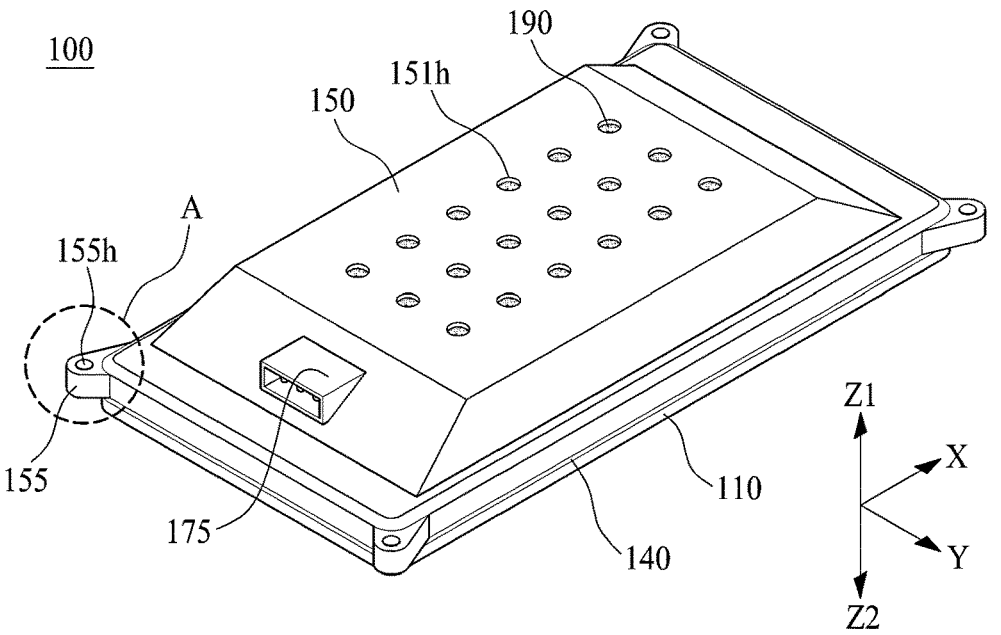
FIG. 9 is a perspective view illustrating an acoustic apparatus according to another embodiment of the present disclosure.
Figure 10:
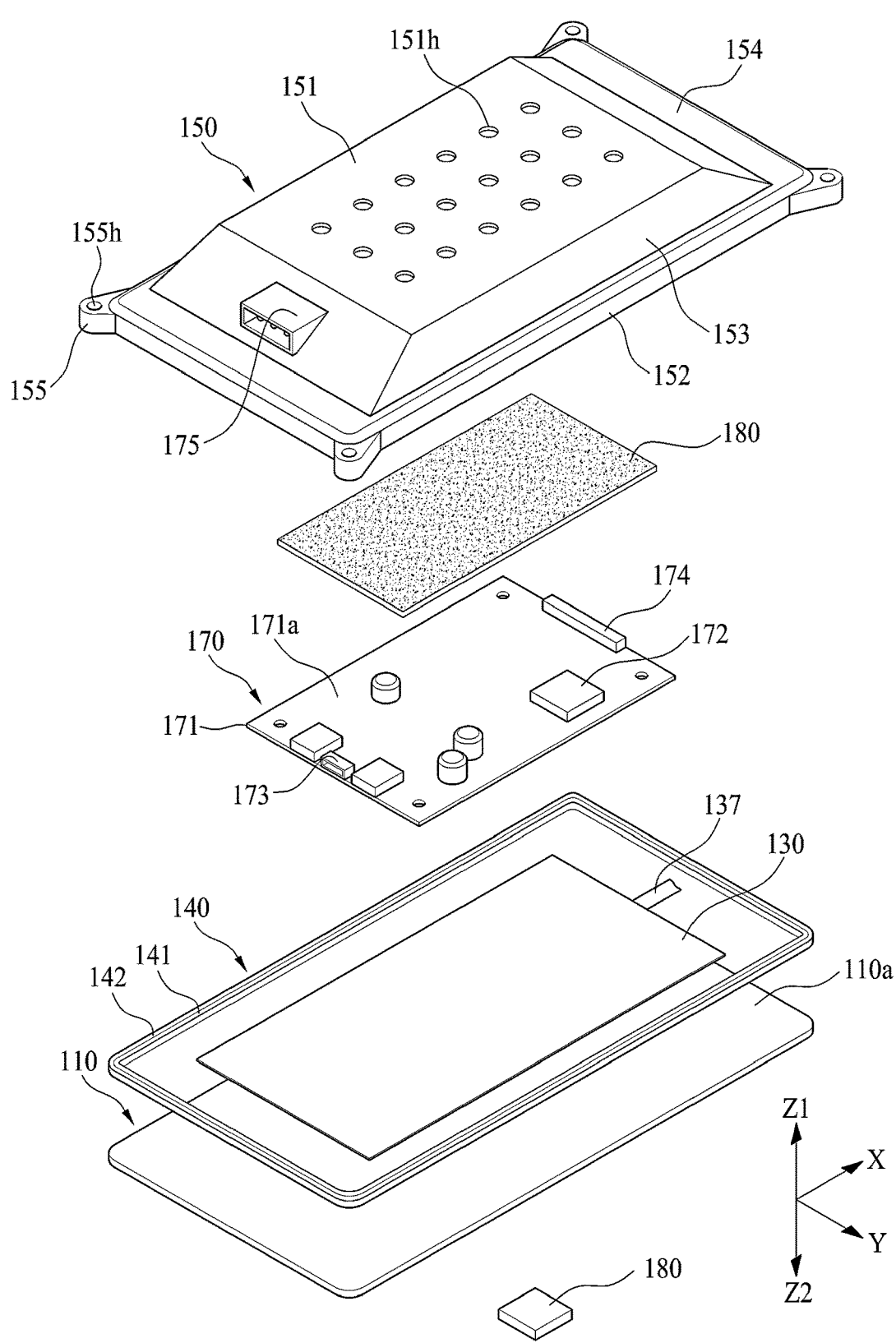
FIG. 10 is an exploded perspective view illustrating an acoustic apparatus according to another embodiment of the present disclosure.
Figure 11:
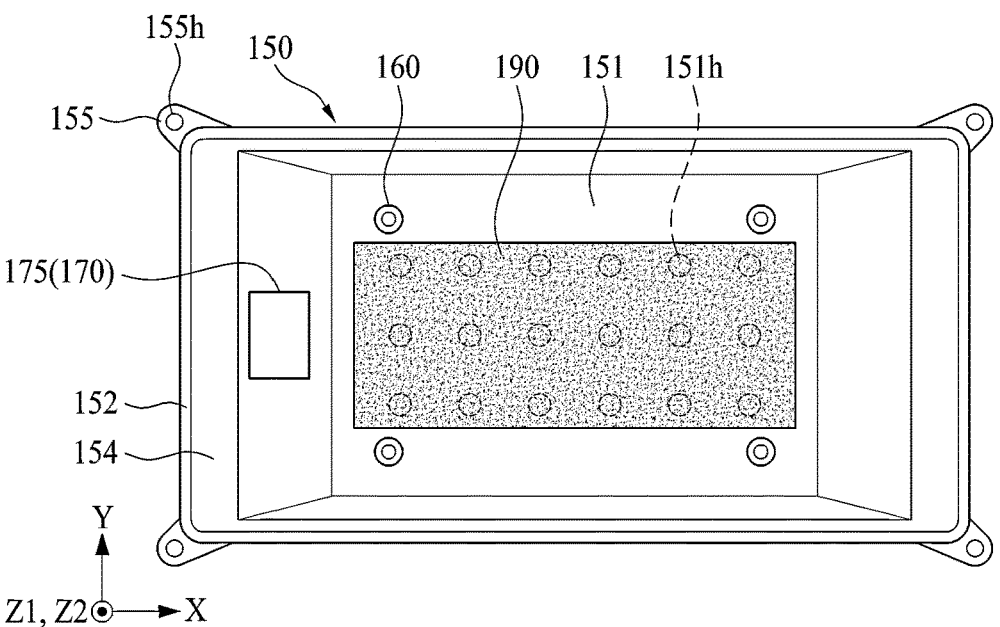
FIG. 11 is a plan view illustrating an air vent hole and a water blocking member illustrated in FIGS. 9 and 10 according to another embodiment of the present disclosure.

FIG. 9 is a perspective view illustrating an acoustic apparatus 100 according to another embodiment of the present disclosure. FIG. 10 is an exploded perspective view illustrating the acoustic apparatus 100 according to another embodiment of the present disclosure. FIG. 11 is a plan view illustrating an air vent hole and a water blocking member illustrated in FIGS. 9 and 10 according to another embodiment of the present disclosure. FIGS. 9 to 11 illustrate an embodiment where one or more air vent holes are further configured at the acoustic apparatus described above with reference to FIGS. 1 to 8. In the following description, the other elements except a plurality of air vent holes and relevant elements are referred to like reference numerals and repeated descriptions thereof can be omitted.

With reference to FIGS. 9 to 11, the acoustic apparatus 100 according to another embodiment of the present disclosure can further include one or more air vent holes 151h.

The one or more air vent holes 151h can be configured to adjust a flow of air in an internal space 100a of the supporting member 150 or the acoustic apparatus 100. The one or more air vent holes 151*h* can be configured to decrease an air pressure of the internal space 100*a* of the supporting member 150 or the acoustic apparatus 100. For example, the one or more air vent holes 151*h* can be configured to decrease an air pressure of the internal space 100*a* provided between the vibration member 110 and the supporting member 150. Accordingly, a band (or a reproduction band) of a low-pitched sound band can expand, and thus, a sound characteristic and/or a sound pressure level characteristic of the low-pitched sound band can be improved. Further, the vibration member 110 can be more stably vibrated by reducing the air pressure of the internal space 100*a* or enhancing the flow of air of the internal space 100*a* by the one or more air vent holes 151*h*, and thus, a sound characteristic and/or a sound pressure level charac- teristic can be further improved.

The one or more air vent holes 151*h* can be configured at the supporting member 150 to connect (or couple) the internal space 100*a* and an external space with each other. The one or more air vent holes 151*h* can be configured at a certain region or a partial region of the first supporting part 151 of the supporting member 150. According to an embodi- ment of the present disclosure, the one or more air vent holes 151*h* can be configured at a certain region or a partial region of the first supporting part 151 of the supporting member 150 overlapping the vibration apparatus 130. According to another embodiment of the present disclosure, the one or more air vent holes 151*h* can be configured in a partial region or a periphery region of the first supporting part 151 which does not overlap the vibration apparatus 130.

The acoustic apparatus 100 according to another embodi- ment of the present disclosure can include a plurality of air vent holes 151*h* which are arranged at a certain interval (or a certain distance) in the first supporting part 151 of the supporting member 150. For example, the plurality of air vent holes 151*h* can be configured to have a certain interval (or a certain distance) in the first supporting part 151 overlapping the vibration apparatus 130, and in this case, a size of a hole region configured in the plurality of air vent holes 151*h* can be smaller than or equal to that of the vibration apparatus 130, but embodiments of the present disclosure are not limited thereto. For example, a size of the hole region configured at the plurality of air vent holes 151*h* can be greater than that of the vibration apparatus 130. Additionally, the plurality of air vent holes 151*h* can be configured to have a certain interval (or a certain distance) in a partial region or a periphery region of the first support- ing part 151 which does not overlap the vibration apparatus 130. For example, the plurality of air vent holes 151*h* can be configured to have a certain interval in an entire region of the first supporting part 151. Further, some of the plurality of air vent holes 151*h* can overlap the vibration apparatus 130, and the other of the plurality of air vent holes 151*h* can not overlap the vibration apparatus 130.

In addition, each of the air vent holes 151*h* can have a same diameter. However, the present disclosure is not lim- ited thereto. In another embodiment, the air vent holes 151*h* may have a different diameter from each other.

The one or more air vent holes 151*h* or the plurality of air vent holes 151*h* can be formed to pass through or vertically pass through the first supporting part 151 along the vertical direction (Z1, Z2) or a thickness direction of the first supporting part 151. Therefore, the internal space 100*a* of the acoustic apparatus 100 or the supporting member 150 or the internal space 100*a* provided between the vibration member 110 and the first supporting part 151 can be con- nected to or connect with the outside by the one or more air vent holes 151*h* or the plurality of air vent holes 151*h*, and thus, an air pressure of the internal space 100*a* of the supporting member 150 can be lowered.

The one or more air vent holes 151*h* or the plurality of air vent holes 151*h* can be configured in a polygonal shape such as a circular shape, an oval shape, or a tetragonal shape, but embodiments of the present disclosure are not limited thereto. For example, the air vent holes 151*h* can be a second hole, a vent hole, an air flow hole, a duct hole, a ventilation hole, an air duct hole, a connection hole, or a communication hole, but embodiments of the present disclosure are not limited thereto.

The acoustic apparatus 100 according to an embodiment of the present disclosure can have substantially a same effect as that of the acoustic apparatus described above with reference to FIGS. 1 to 8. In the acoustic apparatus 100 according to another embodiment of the present disclosure, a flow of air or a reduction in air pressure in the internal space 100*a* can be adjusted by the one or more air vent holes 151*h*, and thus, a band (or a reproduction band) of a low-pitched sound band can extend, thereby improving a sound characteristic and/or a sound pressure level charac- teristic of the low-pitched sound band.

The acoustic apparatus 100 according to another embodi- ment of the present disclosure can further include a water blocking member 190.

The water blocking member 190 can be configured to prevent the damage of the vibration apparatus 130 and the driving circuit part 170 caused by water. For example, the water blocking member 190 can be configured to prevent the penetration of water into the acoustic apparatus 100 or the supporting member 150 through the one or more air vent holes 151*h* or the plurality of air vent holes 151*h*. For example, the water blocking member 190 can be configured to prevent the penetration of water into the internal space 100*a* of the acoustic apparatus 100 or the supporting mem- ber 150 through the one or more air vent holes 151*h* or the plurality of air vent holes 151*h*.

The water blocking member 190 can be disposed (or attached) at the first supporting part 151 of the supporting member 150 to cover the one or more air vent holes 151*h* or the plurality of air vent holes 151*h*. For example, the water blocking member 190 can be disposed (or attached) at the inner surface 151*a* of the first supporting part 151 facing the vibration apparatus 130 to cover the one or more air vent holes 151*h* or the plurality of air vent holes 151*h*, but embodiments of the present disclosure are not limited thereto. For example, the water blocking member 190 can be disposed (or attached) at an outer surface of the first sup- porting part 151 to cover the one or more air vent holes 151*h* or the plurality of air vent holes 151*h*.

The water blocking member 190 according to an embodi- ment of the present disclosure can be configured to allow air to pass through the water blocking member 190 or allow water not to pass through the water blocking member 190. Specifically, the water blocking member 190 can be a breathable nano membrane member or a breathable water- proof membrane member, but embodiments of the present disclosure are not limited thereto.

The acoustic apparatus 100 according to another embodi- ment of the present disclosure can have substantially a same effect as that of the acoustic apparatus described above with reference to FIGS. 1 to 8. The acoustic apparatus 100 according to another embodiment of the present disclosure can further include the water blocking member 190 covering the one or more air vent holes 151*h*, and thus, can prevent the damage of the vibration apparatus 130 and the driving circuit part 170 caused by water.

Figure 12:
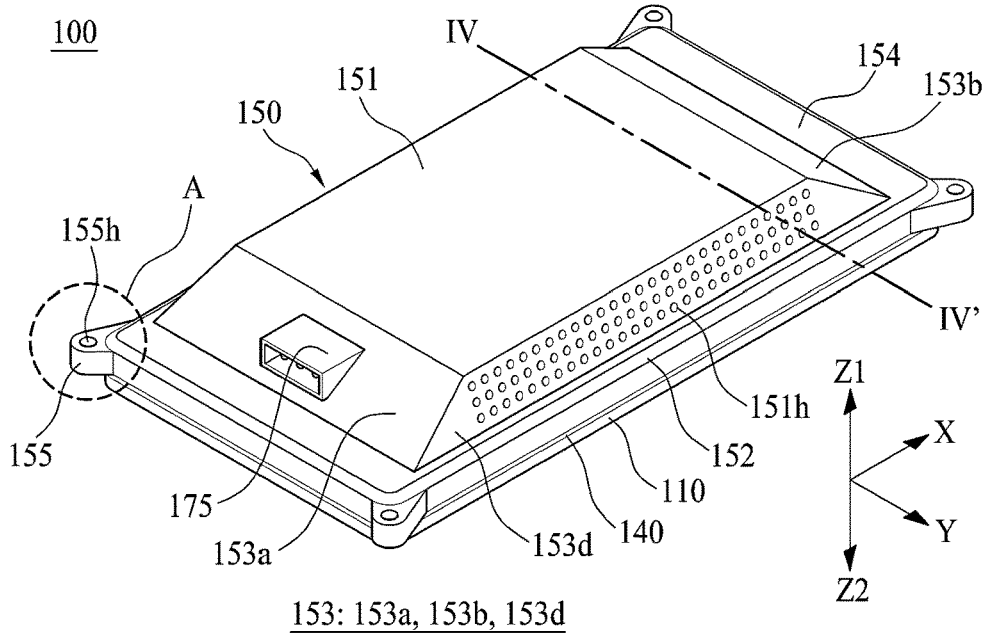
FIG. 12 is a perspective view illustrating an acoustic apparatus according to another embodiment of the present disclosure.
Figure 13:
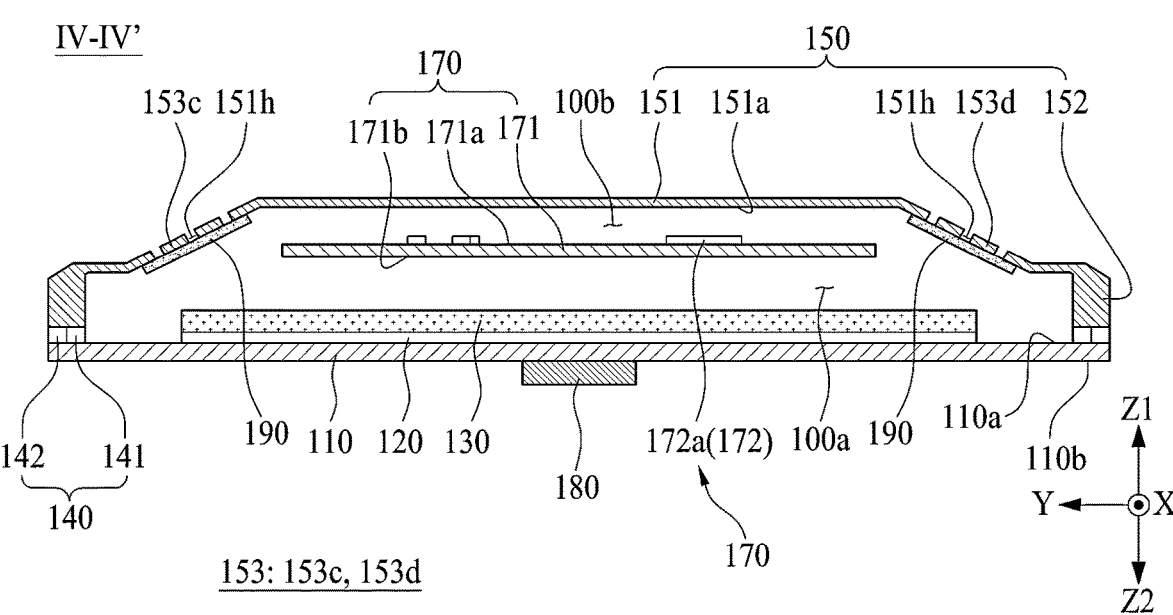
FIG. 13 is a cross-sectional view taken along line IV-IV' illustrated in FIG. 12 according to an embodiment of the present disclosure.

FIG. 12 is a perspective view illustrating an acoustic apparatus according to another embodiment of the present disclosure. FIG. 13 is a cross-sectional view taken along line IV-IV' illustrated in FIG. 12 according to an embodiment of the present disclosure. FIGS. 12 and 13 illustrate an embodiment implemented by modifying the one or more air vent holes described above with reference to FIGS. 9 to 11. In the following description, the other elements except the one or more air vent holes and relevant elements are referred to like reference numerals and repeated descriptions thereof can be omitted.

With reference to FIGS. 12 and 13, an acoustic apparatus 100 according to another embodiment of the present disclosure can further include a one or more air vent holes 151h or a plurality of air vent holes 151h.

The one or more air vent holes 151h or the plurality of air vent holes 151h can be configured at a certain region or a partial region of the inclined part 153 of the supporting member 150. Except for that the one or more air vent holes 151h or the plurality of air vent holes 151h are configured at the inclined part 153 of the supporting member 150, the plurality of air vent holes 151h can be substantially the same as the one or more air vent holes 151h or the plurality of air vent holes 151h described above with reference to FIGS. 9 to 11, and thus, repeated descriptions thereof can be omitted and the descriptions of the one or more air vent holes 151h or the plurality of air vent holes 151h described above with reference to FIGS. 9 to 11 can be included in descriptions of FIGS. 12 and 13.

The supporting member 150 can include first to fourth inclined parts 153a to 153d. For example, the first and third inclined parts 153a and 153b can each be a short-side inclined part of the supporting member 150, and the second and fourth inclined parts 153c and 153d can each be a long-side inclined part of the supporting member 150. Further, the one or more air vent holes 151h can be configured at one or more of the first to fourth inclined parts 153a to 153d. For example, when each of the one or more air vent holes 151h and the connection connector 175 of the driving circuit part 170 is configured at the first inclined part 153a of the first to fourth inclined parts 153a to 153d of the supporting member 150, the one or more air vent holes 151h can be configured at a periphery of the connection connector 175 of the first inclined part 153a. For example, to enhance a flow of air or reduce an air pressure in the internal space 100a of the vibration member 110, the one or more air vent holes 151h can be configured at each of the first to fourth inclined parts 153a to 153d, but embodiments of the present disclosure are not limited thereto.

In another embodiment, the supporting member 150 can have the one or more air vent holes 151h disposed on both the first to fourth inclined parts 153a to 153d of the supporting member 150 and on the first supporting part 151 of the supporting member 150.

The acoustic apparatus 100 according to an embodiment of the present disclosure can have substantially a same effect as that of the acoustic apparatus described above with reference to FIGS. 1 to 8. In the acoustic apparatus 100 according to another embodiment of the present disclosure, a flow of air or a reduction in air pressure in the internal space 100a can be adjusted by the one or more air vent holes 151h configured at the inclined parts 153 of the supporting member 150, and thus, a band (or a reproduction band) of a low-pitched sound band can extend, thereby improving a sound characteristic and/or a sound pressure level characteristic of the low-pitched sound band.

The acoustic apparatus 100 according to another embodiment of the present disclosure can further include a water blocking member 190.

The water blocking member 190 can be configured at the inclined parts 153 of the supporting member 150 to cover the one or more air vent holes 151h or the plurality of air vent holes 151h. For example, the water blocking member 190 can be configured (or attached) at an inner side of the inclined parts 153 of the supporting member 150 to cover the one or more air vent holes 151h or the plurality of air vent holes 151h, but embodiments of the present disclosure are not limited thereto. For example, in another embodiment, the water blocking member 190 can be configured (or attached) at an outer surface of the inclined parts 153 of the supporting member 150 to cover the one or more air vent holes 151h or the plurality of air vent holes 151h.

The water blocking member 190 according to an embodiment of the present disclosure can be configured to allow air to pass through the water blocking member 190 or allow water not to pass through the water blocking member 190. For example, the water blocking member 190 can be a breathable nano membrane member or a breathable waterproof membrane member, but embodiments of the present disclosure are not limited thereto.

The acoustic apparatus 100 according to another embodiment of the present disclosure can have substantially a same effect as that of the acoustic apparatus described above with reference to FIGS. 1 to 8. The acoustic apparatus 100 according to another embodiment of the present disclosure can further include the water blocking member 190 covering the one or more air vent holes 151h, and thus, can prevent the damage of the vibration apparatus 130 and the driving circuit part 170 caused by water.

Figure 14:
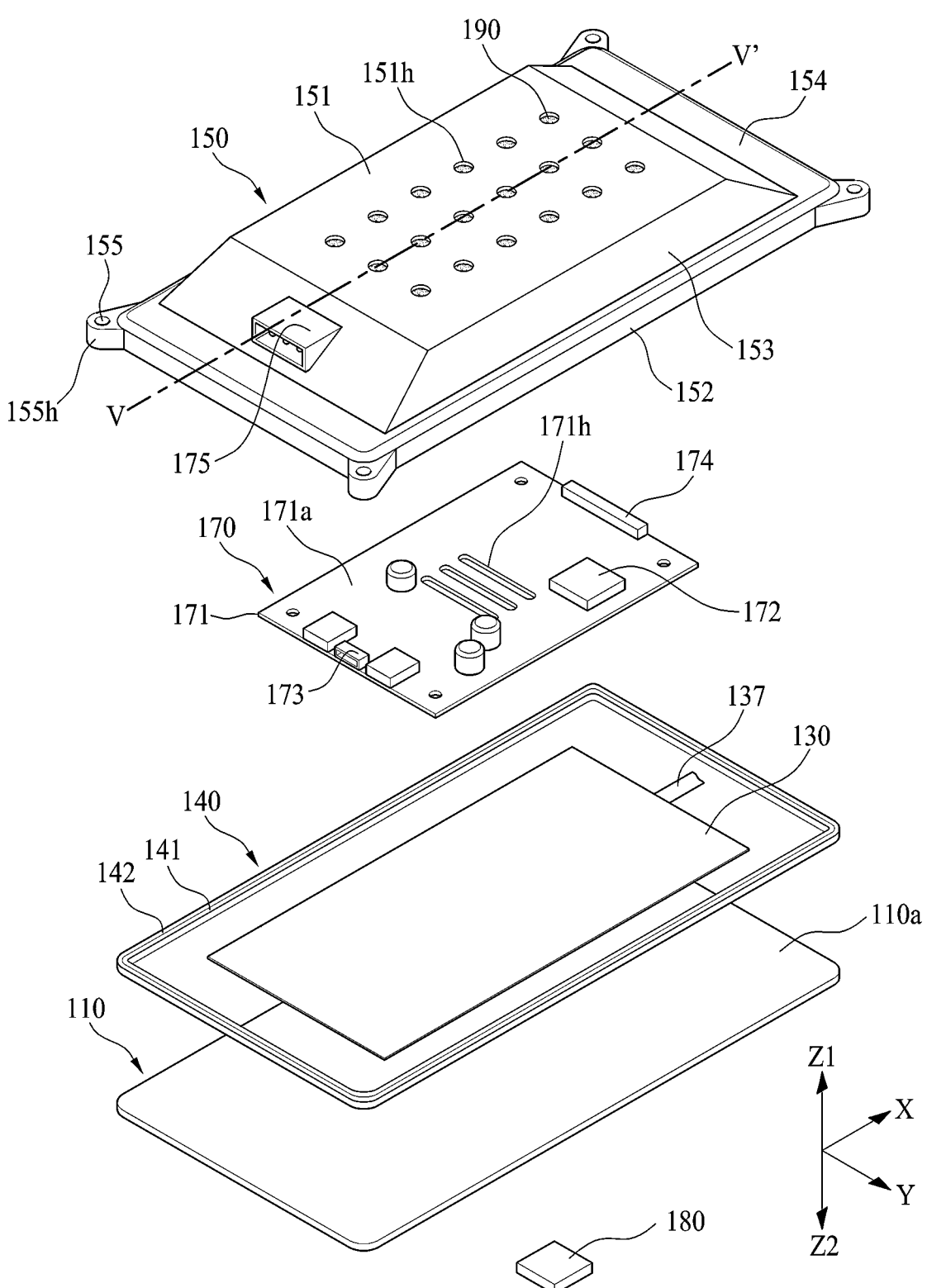
FIG. 14 is an exploded perspective view illustrating an acoustic apparatus according to another embodiment of the present disclosure.
Figure 15:
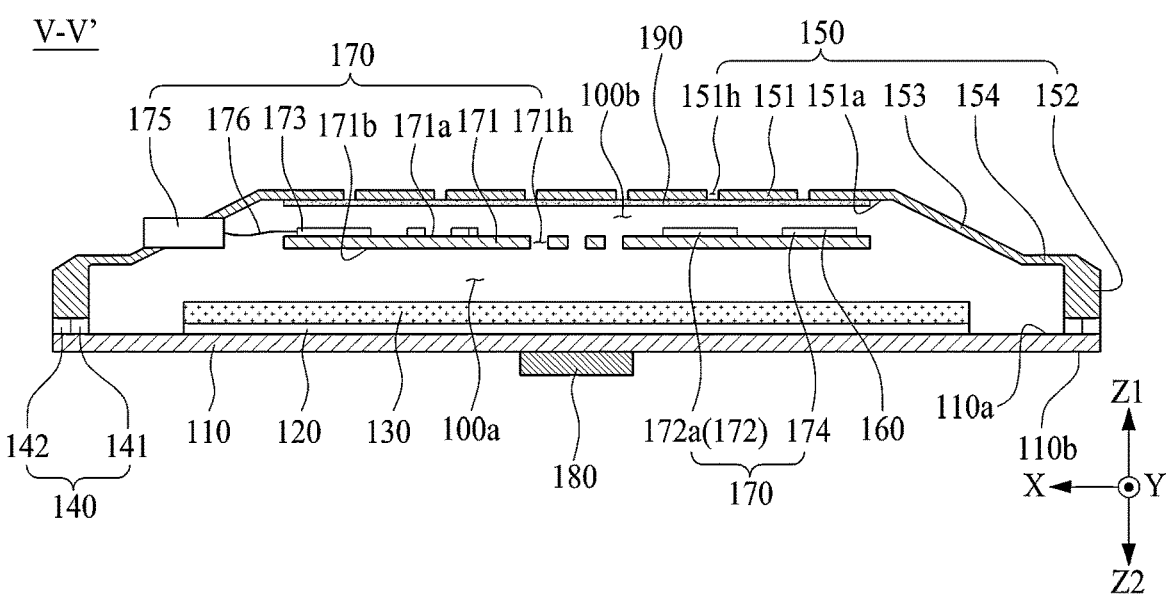
FIG. 15 is a cross-sectional view taken along line V-V' illustrated in FIG. 14 according to an embodiment of the present disclosure.
Figure 16:
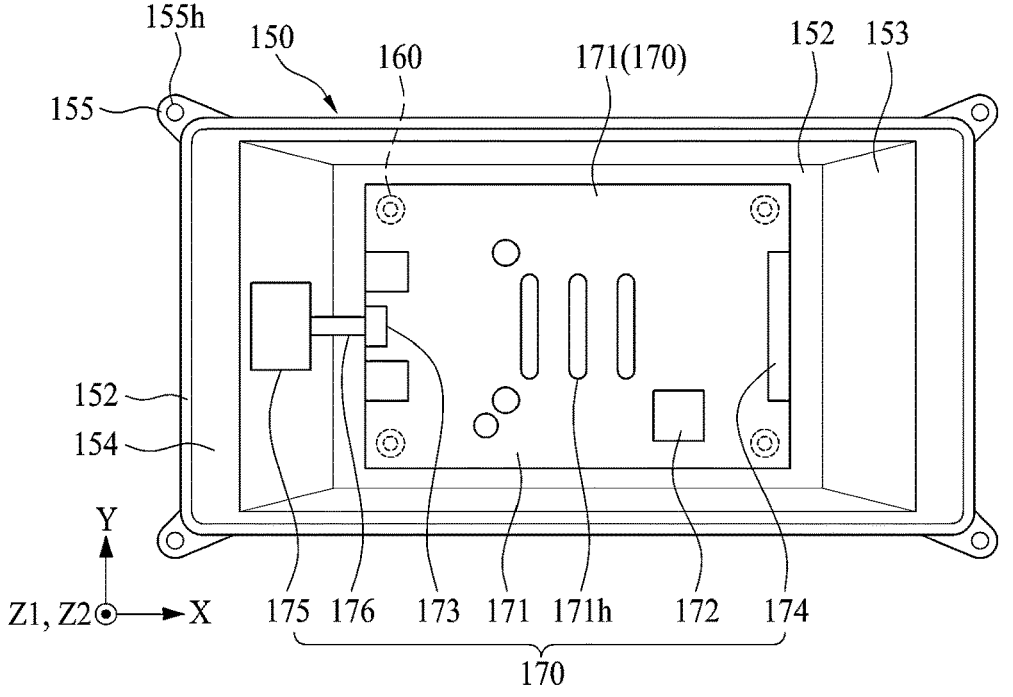
FIG. 16 is a plan view illustrating a printed circuit board and one or more connection holes illustrated in FIGS. 14 and 15 according to an embodiment of the present disclosure.

FIG. 14 is an exploded perspective view illustrating an acoustic apparatus according to another embodiment of the present disclosure. FIG. 15 is a cross-sectional view taken along line V-V' illustrated in FIG. 14 according to an embodiment of the present disclosure. FIG. 16 is a plan view illustrating a printed circuit board and one or more connection holes illustrated in FIGS. 14 and 15 according to an embodiment of the present disclosure. FIGS. 14 to 16 illustrate an embodiment where one or more connection holes are further configured at the PCB of the acoustic apparatus described above with reference to FIGS. 1 to 13. In the following description, the other elements except a plurality of connection holes and relevant elements are referred to like reference numerals and repeated descriptions thereof can be omitted.

With reference to FIGS. 14 to 16, the acoustic apparatus 100 according to another embodiment of the present disclosure can further include one or more connection holes 171h or a plurality of connection holes 171h configured at the PCB 171 of the driving circuit part 170.

The one or more connection holes 171h (or the plurality of connection holes 171h) can be configured at the PCB 171 to adjust air flow in the internal space 100a of the acoustic apparatus 100 or the supporting member 150. The one or more connection holes 171h can be configured at the PCB 171 to adjust air flow between the internal space 100a and the protrusion space 100b, in the acoustic apparatus 100 or the supporting member 150. For example, the one or more connection holes 171h can be configured to pass through the PCB 171 along the vertical direction (Z1, Z2) or the thickness direction of the PCB 171. The one or more connection holes 171h can be configured at a center portion of the PCB 171. However, the present disclosure is not limited thereto. Therefore, the internal space 100*a* and the protrusion space 100*b* can be connected (or communicated) with each other through the one or more connection holes 171*h*. Accordingly, when the vibration member 110 vibrates based on driving of the vibration apparatus 130, air flow in the internal space 100*a* and the protrusion space 100*b* can be more smoothly performed by the one or more connection holes 171*h* configured in the PCB 171. Therefore, a vibration of the PCB 171 by a sound pressure level (or a sound wave) generated based on a vibration of the vibration member 110 can be prevented or minimized, and thus, the occurrence of noise caused by the PCB 171 can be prevented or minimized.

Each of the one or more connection holes 171*h* according to an embodiment of the present disclosure can be configured in a circular shape, an oval shape, a polygonal shape, a line shape, or a slit shape, but embodiments of the present disclosure are not limited thereto. For example, the connection hole 171*h* can be a third hole, a communication hole, a slit hole, or a slot hole, but embodiments of the present disclosure are not limited thereto.

The acoustic apparatus 100 according to another embodiment of the present disclosure can have substantially a same effect as that of the acoustic apparatus described above with reference to FIGS. 1 to 13. In the acoustic apparatus 100 according to another embodiment of the present disclosure, air flow in the internal space 100*a* and the protrusion space 100*b* can be more smoothly performed by the one or more connection holes 171*h* configured at the PCB 171, and a vibration of the PCB 171 by a sound pressure level (or a sound wave) generated based on a vibration of the vibration member 110 can be prevented or minimized, thereby preventing or minimizing the occurrence of noise caused by the PCB 171.

Figure 17:
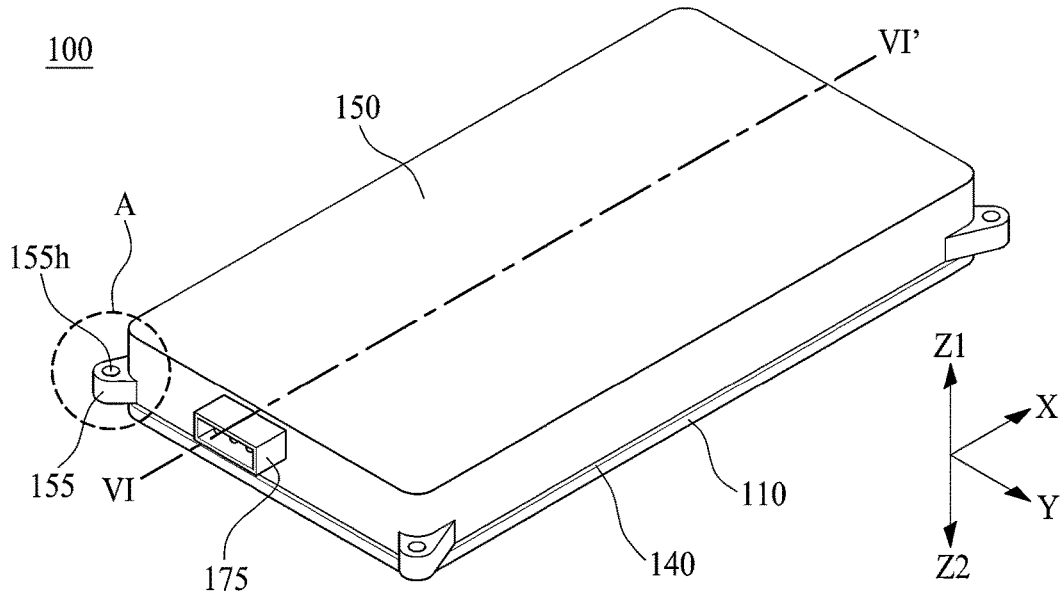
FIG. 17 is a perspective view illustrating an acoustic apparatus according to another embodiment of the present disclosure.
Figure 18:
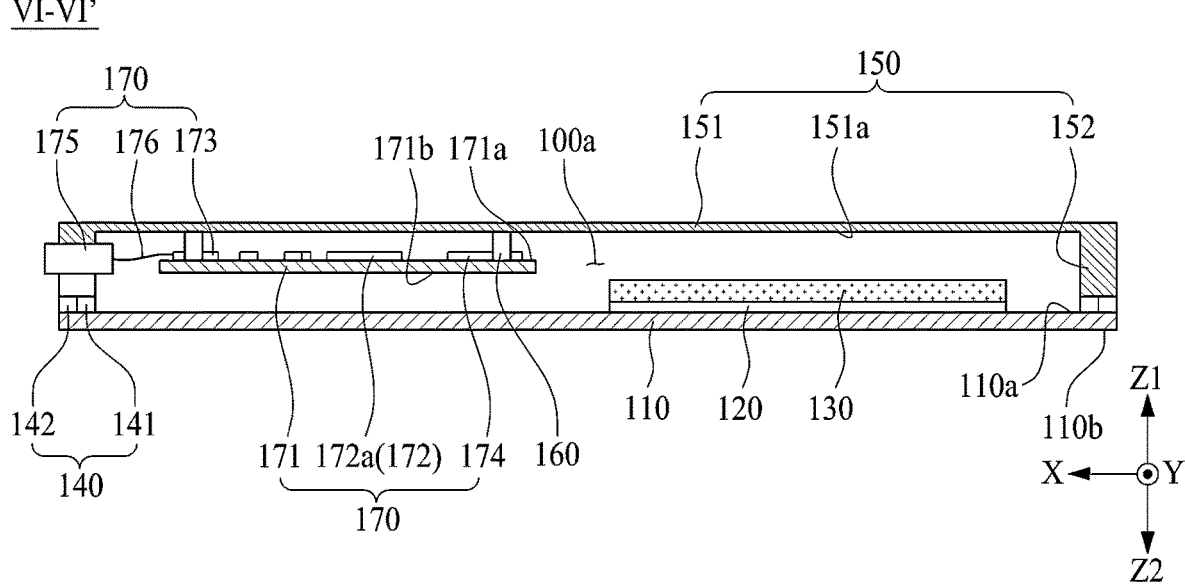
FIG. 18 is a cross-sectional view taken along line VI-VI' illustrated in FIG. 17 according to an embodiment of the present disclosure.
Figure 19:
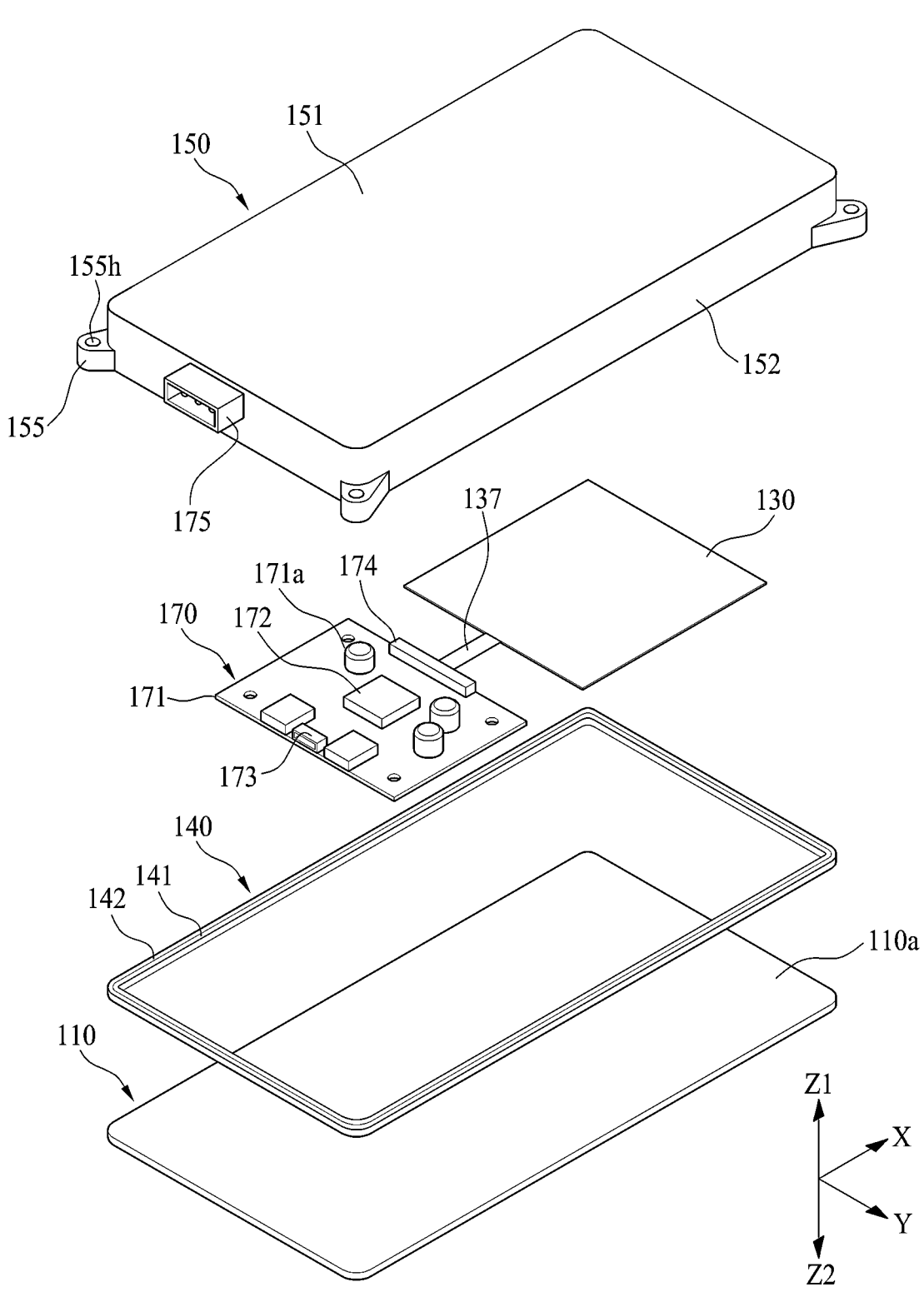
FIG. 19 is an exploded perspective view illustrating an acoustic apparatus according to another embodiment of the present disclosure.

FIG. 17 is a perspective view illustrating an acoustic apparatus according to another embodiment of the present disclosure. FIG. 18 is a cross-sectional view taken along line VI-VI' illustrated in FIG. 17 according to an embodiment of the present disclosure. FIG. 19 is an exploded perspective view illustrating an acoustic apparatus according to another embodiment of the present disclosure. FIGS. 17 to 19 illustrate an embodiment implemented by modifying the supporting member, the vibration apparatus, and the PCB in the acoustic apparatus described above with reference to FIGS. 1 to 8. In the following description, a modified configuration of each of a supporting member, a vibration apparatus, and a PCB and the other elements except elements relevant thereto are referred to by like reference numerals and repeated descriptions thereof can be omitted. An enlarged view of a region 'A' illustrated in FIG. 17 is illustrated in FIGS. 4 to 7.

With reference to FIGS. 17 to 19, in an acoustic apparatus 100 according to another embodiment of the present disclosure, a supporting member 150 can include a first supporting part 151 and a second supporting part 152 connected to a periphery portion of the first supporting part 151. Comparing with the supporting member 150 described above with reference to FIGS. 1 to 8, the supporting member 150 can have a structure where the inclined part 153 and the edge flat part 154 are omitted, and thus, a repeated description thereof can be omitted. For example, the supporting member 150 can include a box shape where one side (or an upper side or an upper portion) is opened by the first supporting part 151 and the second supporting part 152. In addition, a thickness of the second supporting part 152 can be greater than a thickness of the first supporting part 151.

The supporting member 150 or the first supporting part 151 can include a first region and a second region which are parallel to each other. For example, supporting member 150 or the first supporting part 151 can include the first region overlapping the vibration apparatus 130 and the second region overlapping the PCB 171 (or the driving circuit part 170). For example, the first region and the second region can have different sizes. For example, the first region can have a size which is greater than that of the second region. For example, the first region can correspond to a size of the vibration apparatus 130, and the second region can correspond to a size of the PCB 171.

The vibration apparatus 130 can be disposed (or configured) between the vibration member 110 and the first supporting part 151 of the supporting member 150. For example, the vibration apparatus 130 can be disposed (or configured) at the first region of the first supporting part 151. The vibration apparatus 130 can be disposed at the vibration member 110 to overlap the first region of the first supporting part 151. The vibration apparatus 130 can be disposed at the vibration member 110 to directly face the first supporting part 151. For example, the vibration apparatus 130 can be disposed at the vibration member 110 to directly face the inner surface 151*a* of the first supporting part 151. For example, the vibration apparatus 130 can be disposed at the first surface 110*a* of the vibration member 110 to directly face the inner surface 151*a* of the first supporting part 151.

The driving circuit part 170 or the PCB 171 can be configured (or disposed) between the first supporting part 151 of the supporting member 150 and the vibration member 110. The driving circuit part 170 or the PCB 171 can be configured (or disposed) between the first supporting part 151 and the vibration member 110 not to overlap the vibration apparatus 130. For example, the PCB 171 can be configured (or disposed) at the second region of the first supporting part 151. The PCB 171 can be disposed (or fixed) at the first supporting part 151 to overlap the second region of the first supporting part 151. The PCB 171 can be disposed (or fixed) at the first supporting part 151 to directly face the vibration member 110. For example, the PCB 171 can be disposed (or fixed) at the first supporting part 151 to directly face the first surface 110*a* of the vibration member 110. In addition, there can be a gap between an edge of the PCB 171 and an edge of the vibration apparatus 130, however, the present disclosure is not limited thereto.

The PCB 171 can have a size which is smaller than that of the vibration apparatus 130. The PCB 171 can be disposed (or fixed) at the first supporting part 151 by a fixing member 160. For example, each corner portion of the PCB 171 can be disposed (or fixed) at the first supporting part 151 by the fixing member 160. For example, the fixing member 160 can be disposed (or fixed) between the first surface 171*a* of the PCB 171 and the inner surface 151*a* of the first supporting part 151 and can be configured to support or fix the first surface 171*a* of the PCB 171. The fixing member 160 can be substantially the same as the fixing member 160 described above with reference to FIGS. 1 to 3, and thus, repeated descriptions thereof can be omitted.

The PCB 171 can be disposed in parallel with the vibration apparatus 130 without overlapping the vibration apparatus 130, in the internal space 100*a* of the supporting member 150 or the acoustic apparatus 100. For example, the PCB 171 (or driving circuit part 170) and the vibration apparatus 130 can be disposed in parallel not to overlap each other, in the internal space 100*a*. For example, the PCB 171 (or driving circuit part 170) and the vibration apparatus 130 can be disposed in parallel not to vertically (or up-and-down) overlap each other, in the internal space 100a.

The acoustic apparatus 100 according to another embodiment of the present disclosure can have substantially a same effect as that of the acoustic apparatus described above with reference to FIGS. 1 to 8. In the acoustic apparatus 100 according to another embodiment of the present disclosure, the driving circuit part 170 (or PCB 171) and the vibration apparatus 130 can not overlap each other in the vertical direction (Z1, Z2) and can be disposed in parallel in a horizontal direction in the internal space 100a of the supporting member 150 or the acoustic apparatus 100, and thus, a thickness of the acoustic apparatus 100 can be reduced.

According to another embodiment of the present disclosure, the one or more air vent holes and the water blocking member described above with reference to FIGS. 9 to 13 can be substantially identically applied to the acoustic apparatus 100 described above with reference to FIGS. 17 to 19, and thus, repeated descriptions thereof can be omitted. The one or more connection holes 171h described above with reference to FIGS. 14 and 15 can be substantially identically applied to the acoustic apparatus 100 described above with reference to FIGS. 17 to 19, and thus, repeated descriptions thereof can be omitted.

Figure 20:
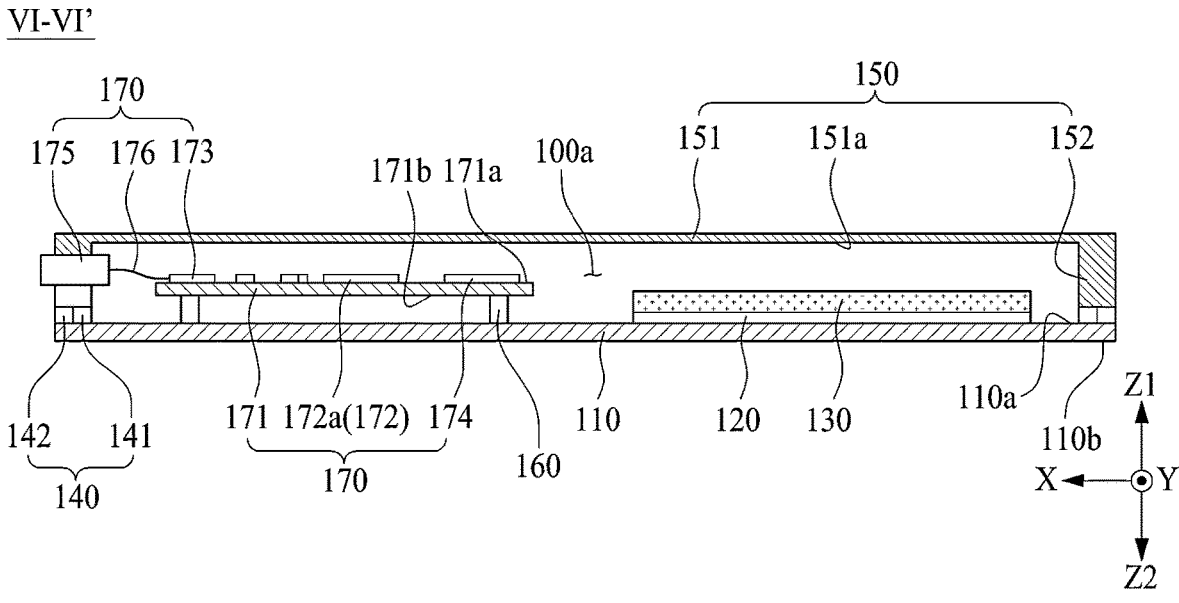
FIG. 20 is another cross-sectional view taken along line VI-VI' illustrated in FIG. 17 according to an embodiment of the present disclosure.

FIG. 20 is another cross-sectional view taken along line VI-VI' illustrated in FIG. 17 according to another embodiment of the present disclosure. FIG. 20 illustrates an embodiment implemented by modifying a connection structure of the PCB in the acoustic apparatus described above with reference to FIGS. 17 to 19. In the following description, a connection structure of the PCB and the other elements except elements relevant thereto are referred to by like reference numerals and repeated descriptions thereof can be omitted.

With reference to FIG. 20, in an acoustic apparatus 100 according to another embodiment of the present disclosure, the driving circuit part 170 or the PCB 171 can be configured (or disposed) at the vibration member 110 not to overlap the vibration apparatus 130. For example, the PCB 171 can be configured (or disposed) at the vibration member 110 to overlap the second region of the first supporting part 151. The PCB 171 can be disposed (or fixed) at a first surface 110a of the vibration member 110 to overlap the second region of the first supporting part 151. For example, the PCB 171 can be disposed (or fixed) at the first surface 110a of the vibration member 110 to directly face the first surface 110a of the vibration member 110. In addition, there can be a gap between an edge of the PCB 171 and an edge of the vibration apparatus 130, however, the present disclosure is not limited thereto.

The PCB 171 can have a size which is smaller than that of the vibration apparatus 130. The PCB 171 can be disposed (or fixed) at the vibration member 110 by a fixing member 160. For example, each corner portion of the PCB 171 can be disposed (or fixed) at the vibration member 110 by the fixing member 160. For example, the fixing member 160 can be disposed (or fixed) between the second surface 171b of the PCB 171 and the first surface 110a of the vibration member 110 and can be configured to support or fix the second surface 171b of the PCB 171. Except for that the fixing member 160 is connected to (or disposed at) the first surface 110a of the vibration member 110, the fixing member 160 can be substantially the same as the fixing member 160 described above with reference to FIGS. 1 to 3, and thus, repeated descriptions thereof can be omitted.

The PCB 171 can be disposed in parallel with the vibration apparatus 130 without overlapping the vibration apparatus 130, in the internal space 100a of the supporting member 150 or the acoustic apparatus 100.

The PCB 171 can increase a weight (or a mass) of the vibration member 110, and thus, can be lowered a lowest resonance frequency (or a lowest natural frequency) of the vibration member 110. Accordingly, a sound characteristic and/or a sound pressure level characteristic of a low-pitched sound band generated by the vibration of the vibration member 110 based on a vibration of the vibration apparatus 130 can be further enhanced.

The acoustic apparatus 100 according to another embodiment of the present disclosure can have substantially a same effect as that of the acoustic apparatus described above with reference to FIGS. 1 to 8. In the acoustic apparatus 100 according to another embodiment of the present disclosure, the PCB 171 and the vibration apparatus 130 can not overlap each other and can be disposed in parallel in the internal space 100a of the supporting member 150 or the acoustic apparatus 100, and thus, a thickness of the acoustic apparatus 100 can be reduced.

According to another embodiment of the present disclosure, the one or more air vent holes and the water blocking member described above with reference to FIGS. 9 to 13 can be substantially identically applied to the acoustic apparatus 100 described above with reference to FIG. 20, and thus, repeated descriptions thereof can be omitted. The one or more connection holes 171h described above with reference to FIGS. 14 and 15 can be substantially identically applied to the acoustic apparatus 100 described above with reference to FIG. 20, and thus, repeated descriptions thereof can be omitted.

Figure 21:
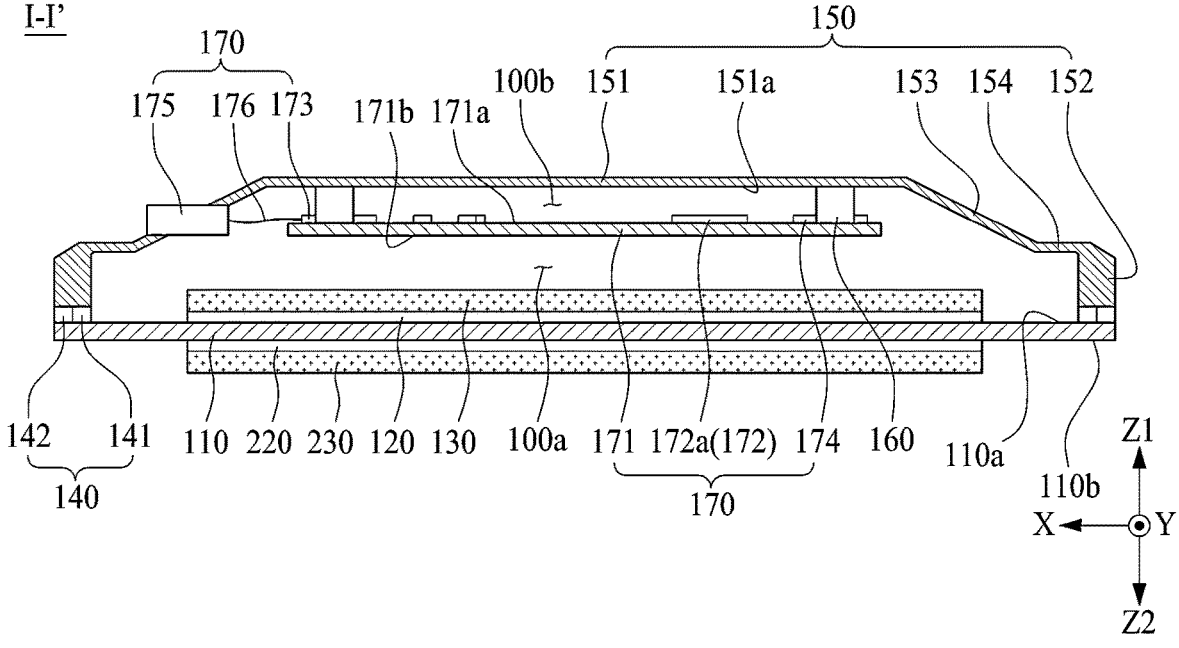
FIG. 21 is another cross-sectional view taken along line I-I' illustrated in FIG. 1 according to another embodiment of the present disclosure.
Figure 22:
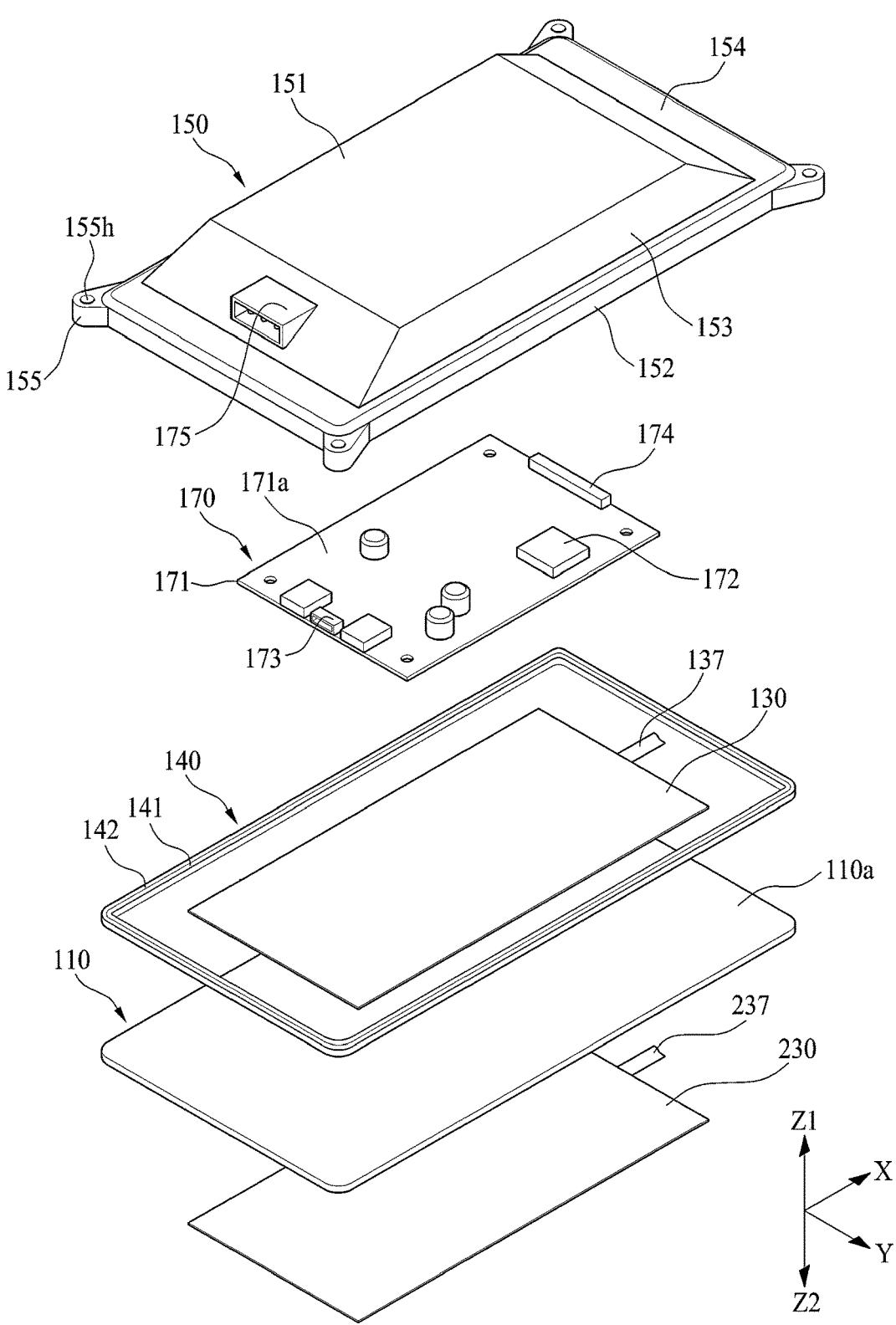
FIG. 22 is an exploded perspective view illustrating an acoustic apparatus according to another embodiment of the present disclosure.

FIG. 21 is another cross-sectional view taken along line I-I' illustrated in FIG. 1 according to another embodiment of the present disclosure. FIG. 22 is an exploded perspective view illustrating an acoustic apparatus according to another embodiment of the present disclosure. FIGS. 21 and 22 illustrate an embodiment where a second vibration apparatus is further configured at the acoustic apparatus described above with reference to FIGS. 1 to 8. In the following description, the other elements except a second vibration apparatus and relevant elements are referred to like reference numerals and repeated descriptions thereof can be omitted.

With reference to FIGS. 21 and 22, an acoustic apparatus according to another embodiment of the present disclosure can further include a second vibration apparatus 230.

The second vibration apparatus 230 can be configured to vibrate the vibration member 110. The second vibration apparatus 230 can be disposed or configured at a second surface 110b of the vibration member 110. The second vibration apparatus 230 can be configured to vibrate (or displace or drive) based on a driving signal (or an electrical signal or a voice signal) applied thereto to vibrate (or displace) the vibration member 110. For example, the second vibration apparatus 230 can be a second active vibration member, a second vibration generator, a second vibration structure, a second vibrator, a second vibration generating device, a second sound generator, a second sound device, a second sound generating structure, or a second sound generating device, but embodiments of the present disclosure are not limited thereto.

The second vibration apparatus 230 can include a piezoelectric material or an electroactive material which have a piezoelectric characteristic. The second vibration apparatus 230 can autonomously vibrate (or displace) by a vibration (or displacement) of the piezoelectric material based on a driving signal applied to the piezoelectric material, or can vibrate (or displace) the vibration member 110. For example, the second vibration apparatus 230 can alternately repeat contraction and/or expansion based on a piezoelectric effect (or a piezoelectric characteristic) to vibrate (or displace or drive). For example, the second vibration apparatus 230 can vibrate (or displace or drive) in a vertical direction (or a thickness direction) Z1 and Z2 as contraction and/or expansion are alternately repeated by an inverse piezoelectric effect. For example, the second vibration apparatus 230 can include a piezoelectric device.

The second vibration apparatus 230 can be disposed or configured at the second surface 110b of the vibration member 110 to overlap the vibration apparatus 130. For example, the second vibration apparatus 230 can be disposed or configured at the second surface 110b of the vibration member 110 to overlap the vibration apparatus 130 with the vibration member 110 therebetween. For example, vibration apparatus 130 can be a first vibration apparatus.

The second vibration apparatus 230 can be configured to have a same size as the vibration apparatus 130. For example, the second vibration apparatus 230 and the vibration apparatus 130 can have substantially a same size within an error range of a manufacturing process. The second vibration apparatus 230 can be configured to vibrate (or displace) in a same direction as the vibration apparatus 130, and thus, the second vibration apparatus 230 and the vibration apparatus 130 can maximize an amplitude displacement of the vibration member 110. For example, an acoustic apparatus according to another embodiment of the present disclosure can include a bimorph type structure by the vibration apparatus 130 and the second vibration apparatus 230.

However, in another embodiment, the second vibration apparatus 230 can have a different size than the vibration apparatus 130. For example, the second vibration apparatus 230 can have a size either larger or smaller than a size of the vibration apparatus 130.

The second vibration apparatus 230 can be electrically connected to the driving circuit part 170 through a second signal supply member 237.

The second vibration apparatus 230 can be connected or coupled to the vibration member 110 by a second connection member 220. For example, the second vibration apparatus 230 can be connected to or supported by the second surface 110b of the vibration member 110 by the second connection member 220, but embodiments of the present disclosure are not limited thereto. For example, the second connection member 220 can be a second adhesive member, but embodiments of the present disclosure are not limited thereto. For example, the second connection member 220 can be substantially a same as the connection member 120, and thus, repeated descriptions thereof can be omitted. For example, the connection member 120 can be a first connection member 120.

The acoustic apparatus 100 according to another embodiment of the present disclosure can further include the second vibration apparatus 230 configured to vibrate (or displace) in a same direction as the vibration apparatus 130 with the vibration member 110 therebetween, and thus, the amount of displacement or an amplitude displacement of the vibration member 110 can be maximized or increased, thereby further enhancing a sound characteristic and/or a sound pressure level characteristic of the low-pitched sound band.

According to another embodiment of the present disclosure, the second vibration apparatus 230 can be substantially identically applied to the acoustic apparatus 100 described above with reference to FIGS. 8 to 20, and thus, repeated descriptions thereof can be omitted. For example, the second vibration apparatus 230 described above with reference to FIGS. 21 and 22 can be disposed (or coupled) at the second surface 110b of the vibration member 110 by the second connection member 220 to overlap the vibration apparatus 130 of the acoustic apparatus 100 described above with reference to FIGS. 8 to 20.

Figure 23:
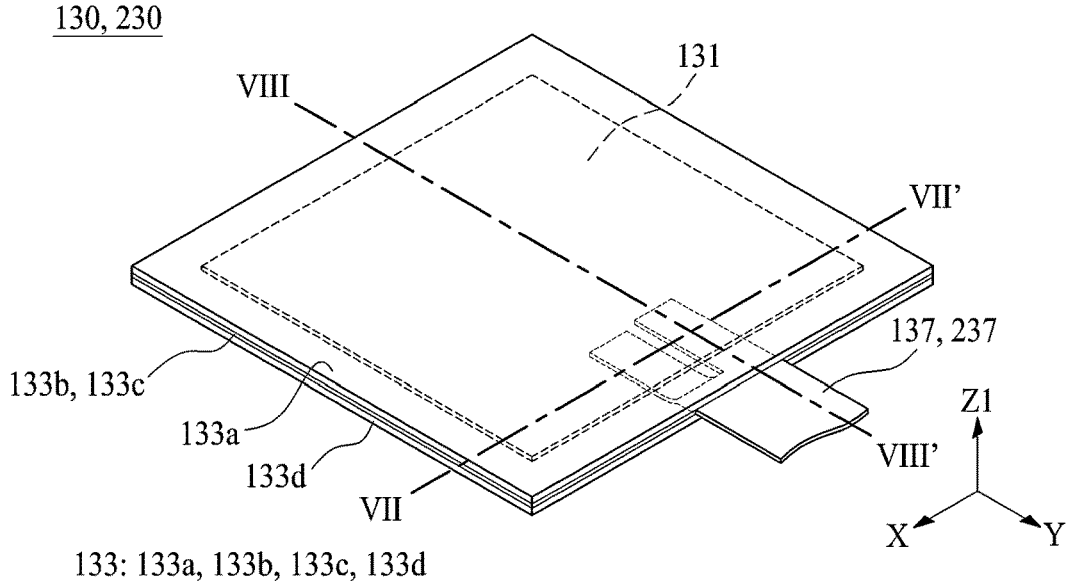
FIG. 23 is a perspective view illustrating a vibration apparatus according to an embodiment of the present disclosure.
Figure 24:
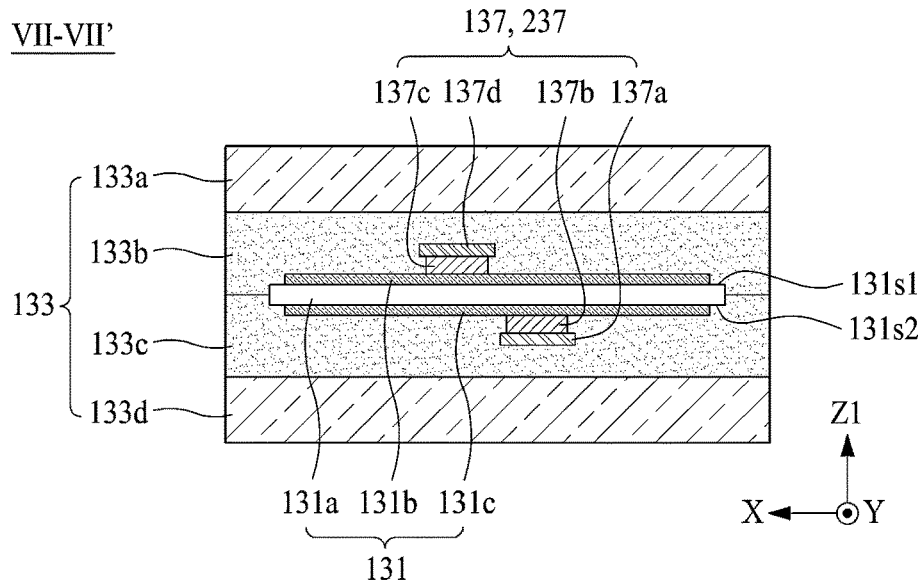
FIG. 24 is a cross-sectional view taken along line VII-VII' illustrated in FIG. 23 according to an embodiment of the present disclosure.
Figure 25:
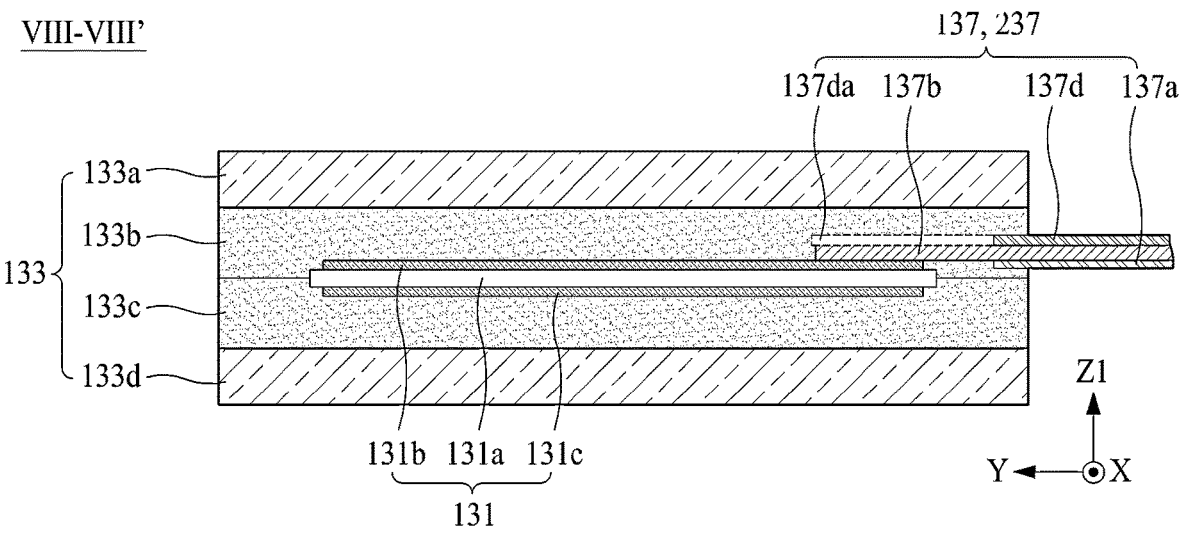
FIG. 25 is a cross-sectional view taken along line VIII-VIII' illustrated in FIG. 23 according to an embodiment of the present disclosure.

FIG. 23 is a perspective view illustrating a vibration apparatus according to an embodiment of the present disclosure. FIG. 24 is a cross-sectional view taken along line VII-VII' illustrated in FIG. 23 according to an embodiment of the present disclosure. FIG. 25 is a cross-sectional view taken along line VIII-VIII' illustrated in FIG. 23 according to an embodiment of the present disclosure. FIGS. 23 to 25 illustrate a vibration apparatus and/or a second vibration apparatus described above with reference to FIGS. 1 to 22. In the following description, a vibration apparatus 130 and a second vibration apparatus 230 can be referred to as a vibration apparatus 130 and 230.

With reference to FIGS. 23 to 25, the vibration apparatus 130 and 230 according to an embodiment of the present disclosure can include a piezoelectric material having a piezoelectric characteristic. The vibration apparatus 130 and 230 can be configured as a ceramic-based piezoelectric material for implementing a relatively strong vibration, or can be configured as a piezoelectric ceramic having a perovskite-based crystal structure, but the present disclosure is not limited thereto.

With reference to FIGS. 23 to 25, the vibration apparatus 130 and 230 according to an embodiment of the present disclosure can include a vibration part 131.

The vibration part 131 can be configured to vibrate by a piezoelectric effect based on a driving signal. The vibration part 131 can include at least one or more of a piezoelectric inorganic material and a piezoelectric organic material. For example, the vibration part 131 can be a vibration device, a piezoelectric device, a piezoelectric device part, a piezoelectric device layer, a piezoelectric structure, a piezoelectric vibration part, or a piezoelectric vibration layer, or the like, but embodiments of the present disclosure are not limited thereto.

The vibration part 131 according to an embodiment of the present disclosure can include a vibration layer 131a, a first electrode layer 131b, and a second electrode layer 131c. Additionally, the vibration part 131 can be surrounded by a non-vibration part. However, in another embodiment, the vibration part 131 is not surrounded by the non-vibration part, or may only be partially surrounded by a non-vibration part.

The vibration layer 131a can include a piezoelectric material or an electroactive material which includes a piezoelectric effect. For example, the piezoelectric material can have a characteristic in which, when pressure or twisting phenomenon is applied to a crystalline structure by an external force, a potential difference occurs due to dielectric polarization caused by a relative position change of a positive (+) ion and a negative (−) ion, and a vibration is generated by an electric field based on a reverse voltage applied thereto. For example, the vibration layer 131a can be a piezoelectric layer, a piezoelectric material layer, an electroactive layer, a piezoelectric composite layer, a piezoelectric composite, or a piezoelectric ceramic composite, or the like, but embodiments of the present disclosure are not limited thereto.

The vibration layer 131a can be configured as a ceramic-based material for implementing a relatively strong vibration, or can be configured as a piezoelectric ceramic having a perovskite-based crystalline structure. The perovskite crystalline structure can have a piezoelectric effect and/or an inverse piezoelectric effect and can be a plate-shaped structure having orientation, however, embodiments of the present disclosure are not limited thereto.

The piezoelectric ceramic can be configured as a single crystalline ceramic having a single crystalline structure, or can be configured as a ceramic material or polycrystalline ceramic having a polycrystalline structure. A piezoelectric material including the single crystalline ceramic can include $\alpha$-AlPO$_4$, $\alpha$-SiO$_2$, LiNbO$_3$, Tb$_2$ (MoO$_4$)$_3$, Li$_2$B$_4$O$_7$, or ZnO, but embodiments of the present disclosure are not limited thereto. A piezoelectric material including the polycrystalline ceramic can include a lead zirconate titanate (PZT)-based material, including lead (Pb), zirconium (Zr), and titanium (Ti), or can include a lead zirconate nickel niobate (PZNN)-based material, including lead (Pb), zirconium (Zr), nickel (Ni), and niobium (Nb), but embodiments of the present disclosure are not limited thereto. For example, the vibration layer 131a can include at least one or more of calcium titanate (CaTiO$_3$), barium titanate (BaTiO$_3$), and strontium titanate (SrTiO$_3$), without lead (Pb), but embodiments of the present disclosure are not limited thereto.

The first electrode layer 131b can be disposed at a first surface (or an upper surface or a front surface) 131s1 of the vibration layer 131a. The first electrode layer 131b can have a same size as that of the vibration layer 131a, or can have a size which is smaller than that of the vibration layer 131a.

The second electrode layer 131c can be disposed at a second surface (or a lower surface or a rear surface) 131s2 which is opposite to or different from the first surface 131s1 of the vibration layer 131a. The second electrode layer 131c can have a same size as that of the vibration layer 131a, or can have a size which is smaller than that of the vibration layer 131a. For example, the second electrode layer 131c can have a same shape as that of the vibration layer 131a, but embodiments of the present disclosure are not limited thereto.

According to an embodiment of the present disclosure, in order to prevent electrical short circuit between the first electrode layer 131b and the second electrode layer 131c, each of the first electrode layer 131b and the second electrode layer 131c can be formed at the other portion, except a periphery portion, of the vibration layer 131a. For example, the first electrode layer 131b can be formed at an entire first surface 131s1, other than a periphery portion, of the vibration layer 131a. For example, the second electrode layer 131c can be formed at an entire second surface 131s2, other than a periphery portion, of the vibration layer 131a. For example, a distance between a lateral surface (or a sidewall) of each of the first electrode layer 131b and the second electrode layer 131c and a lateral surface (or a sidewall) of the vibration layer 131a can be at least 0.5 mm or more. For example, the distance between the lateral surface of each of the first electrode layer 131b and the second electrode layer 131c and the lateral surface of the vibration layer 131a can be at least 1 mm or more, but embodiments of the present disclosure are not limited thereto.

According to an embodiment of the present disclosure, one or more of the first electrode layer 131b and the second electrode layer 131c can be formed of a transparent conductive material, a semitransparent conductive material, or an opaque conductive material. For example, the transparent conductive material or the semitransparent conductive material can include indium tin oxide (ITO) or indium zinc oxide (IZO), but embodiments of the present disclosure are not limited thereto. The opaque conductive material can include gold (Au), silver (Ag), platinum (Pt), palladium (Pd), molybdenum (Mo), magnesium (Mg), carbon, or silver (Ag) including glass frit, or the like, or can be formed of an alloy thereof, but embodiments of the present disclosure are not limited thereto. Additionally, to enhance an electrical characteristic and/or a vibration characteristic of the vibration layer 131a, each of the first electrode layer 131b and the second electrode layer 131c can include silver (Ag) having a low resistivity. Further, carbon can be carbon black, ketjen black, carbon nanotube, and a carbon material including graphite, but embodiments of the present disclosure are not limited thereto.

The vibration layer 131a can be polarized (or poling) by a certain voltage applied to the first electrode layer 131b and the second electrode layer 131c in a certain temperature atmosphere, or a temperature atmosphere that can be changed from a high temperature to a room temperature, but embodiments of the present disclosure are not limited thereto. For example, a polarization direction (or a poling direction) formed in the vibration layer 131a can be formed or aligned (or arranged) from the first electrode layer 131b to the second electrode layer 131c, but is not limited thereto, and a polarization direction (or a poling direction) formed in the vibration layer 131a can be formed or aligned (or arranged) from the second electrode layer 131c to the first electrode layer 131b.

The vibration layer 131a can alternately and repeatedly contract and/or expand based on an inverse piezoelectric effect according to a driving signal applied to the first electrode layer 131b and the second electrode layer 131c from an outside to vibrate. For example, the vibration layer 131a can vibrate in a vertical direction (or a thickness direction) and in a planar direction by the driving signal applied to the first electrode layer 131b and the second electrode layer 131c. The vibration layer 131a can be displaced (or vibrated or driven) by contraction and/or expansion of the planar direction, thereby improving a sound characteristic and/or a sound pressure level characteristic of the vibration part 131.

The vibration apparatus 130 and 230 according to an embodiment of the present disclosure can further include a cover member 133.

The cover member 133 can be configured to cover at least one or more of a first surface and a second surface of the vibration part 131. The cover member 133 can be configured to protect at least one or more of the first surface and the second surface of the vibration part 131. For example, the first surface of the vibration part 131 can be a front surface, a highest surface, or an upper surface. For example, the second surface of the vibration part 131 can be a rear surface, a back surface, or a lower surface which are opposite to the first surface. In an embodiment of the present disclosure, the cover member 131 can surround the vibration part 131.

The vibration apparatus 130 and 230 according to an embodiment of the present disclosure can further include a first cover member 133a.

The first cover member 133a can be disposed at the first surface of the vibration part 131. For example, the first cover member 133a can be configured to cover the first electrode layer 131b of the vibration part 131. For example, the first cover member 133a can be configured to have a larger size than the vibration part 131. The first cover member 133a can be configured to protect the first surface of the vibration part 131 and the first electrode layer 131b.

The first cover member 133a according to an embodiment of the present disclosure can include an adhesive layer. For example, the first cover member 133a can include a base film, and an adhesive layer which is in the base film and is connected or coupled to the first surface of the vibration part 131. Further, the adhesive layer can include an electrical insulating material which has adhesive properties and is capable of compression and decompression.

The first cover member 133a according to another embodiment of the present disclosure can be connected or coupled to the first surface of the vibration part 131 by a first adhesive layer 133b. For example, the first cover member 133a can be connected or coupled to the first surface or the first electrode layer 131b of the vibration part 131 by the first adhesive layer 133b. Additionally, the first cover member 133a can be connected or coupled to the first surface or the first electrode layer 131b of the vibration part 131 by a film laminating process by the first adhesive layer 133b. The first adhesive layer 133b can be configured to surround an entire first surface or a portion of a side surface (or lateral surface) of the vibration part 131.

The cover member 133 according to an embodiment of the present disclosure can include a second adhesive layer 133c.

The second adhesive layer 133c can be disposed at the second surface of the vibration part 131. The second adhesive layer 133c can be configured to cover the second electrode layer 131c of the vibration part 131. The second adhesive layer 133c can be configured to protect the second surface and the second electrode layer 131c of the vibration part 131. In addition, the second adhesive layer 133c can be configured to surround an entire second surface or a portion of a side surface (or lateral surface) of the vibration part 131. For example, the second adhesive layer 133c can be a protection layer or a protection member.

The second adhesive layer 133c can be connected or coupled to the first adhesive layer 133b in a side surface (or lateral surface) of the vibration part 131 or a periphery portion of the first cover member 133a. Thus, the first adhesive layer 133b and the second adhesive layer 133c can be configured to surround or completely surround the vibration part 131. However, in another embodiment of the present disclosure, the first adhesive layer 133b and the second adhesive layer 133c cannot completely surround the vibration part 131. The first adhesive layer 133b and the second adhesive layer 133c can be configured to cover or surround all surfaces of the vibration part 131. For example, the vibration part 131 can be inserted (or accommodated) or embedded (or built-in) at an inner portion of the adhesive layer including the first adhesive layer 133b and the second adhesive layer 133c.

The cover member 133 can be connected or coupled to the vibration member 110 by the connection member 120 illustrated in FIGS. 2 to 12. For example, any one of the first cover member 133a and the second adhesive layer 133c can be connected or coupled to the vibration member 110 by the connection member 120 illustrated in FIGS. 2 to 12.

The cover member 133 according to an embodiment of the present disclosure can further include a second cover member 133d, but embodiments of the present disclosure are not limited thereto.

The second cover member 133d can be disposed at the second surface of the vibration part 131. For example, the second cover member 133d can be configured to cover the second electrode layer 131c of the vibration part 131. For example, the second cover member 133d can be configured to have a larger size than the vibration part 131 and can be configured to have a same size as the vibration part 131. The second cover member 133d can be configured to protect the second surface and the second electrode layer 131c of the vibration part 131.

The first cover member 133a and the second cover member 133d according to an embodiment of the present disclosure can include a same material or a different material. For example, each of the first cover member 133a and the second cover member 133d can be a polyimide film, a polyethylene naphthalate film, or a polyethylene terephthalate film, but embodiments of the present disclosure are not limited thereto.

The second cover member 133d can be connected or coupled to the second surface or the second electrode layer 131c of the vibration part 131 by a second adhesive layer 133c. Further, the second cover member 133d can be connected or coupled to the second surface or the second electrode layer 131c of the vibration part 131 by a film laminating process by the second adhesive layer 133c.

The vibration part 131 can be disposed or inserted (or accommodated) between the first cover member 133a and the second cover member 133d. For example, the vibration part 131 can be inserted (or accommodated) or embedded (or built-in) at an inner portion of the adhesive layer including the first adhesive layer 133b and the second adhesive layer 133c.

Each of the first adhesive layer 133b and the second adhesive layer 133c according to an embodiment of the present disclosure can include an electrical insulating material which has adhesive properties and is capable of compression and decompression. For example, each of the first adhesive layer 133b and the second adhesive layer 133c can include epoxy resin, acrylic resin, silicone resin, urethane resin, a pressure sensitive adhesive (PSA), an optically cleared adhesive (OCA), or an optically cleared resin (OCR), or the like, but embodiments of the present disclosure are not limited thereto.

The first adhesive layer 133b and the second adhesive layer 133c can be configured between the first cover member 133a and the second cover member 133d to surround the vibration part 131. For example, one or more of the first adhesive layer 133b and the second adhesive layer 133c can be configured to surround the vibration part 131.

Any one of the first cover member 133a and the second cover member 133d can be connected or coupled to the vibration member 110 by the connection member 120 illustrated in FIGS. 2 to 12.

The vibration apparatus 130 and 230 according to an embodiment of the present disclosure can further include a signal supply member 137 and 237. For example, the vibration apparatus 130 can further include a signal supply member 137. For example, the second vibration apparatus 230 can further include a second signal supply member 237. In the following description, the signal supply member 137 and the second signal supply member 237 can be referred to as a signal supply member 137 and 237.

The signal supply member 137 and 237 can be configured to supply a driving signal supplied from a driving circuit part to the vibration part 131. The signal supply member 137 and 237 can be configured to be electrically connected to the vibration part 131. The signal supply member 137 and 237 can be configured to be electrically connected to the first electrode layer 131b and the second electrode layer 131c of the vibration part 131.

A portion of the signal supply member 137 and 237 can be accommodated (or inserted) between the cover member 133 and the vibration part 131. For example, the portion of the signal supply member 137 and 237 can be accommodated (or inserted) between the first surface of the vibration part 131 and the first cover member 133*a*. For example, the portion of the signal supply member 137 and 237 can be accommodated (or inserted) between the first cover member 133*a* and the second cover member 133*d*.

In addition, the signal supply members 137 and 237 can be disposed on opposite surfaces of the vibration part 131 from each other. However, in another embodiment, the signal supply members 137 and 237 can be disposed on the same side of the vibration part 131 as each other.

According to an embodiment of the present disclosure, an end portion (or a distal end portion or one side) of the signal supply member 137 and 237 can be disposed or inserted (or accommodated) between one periphery portion of the cover member 133 and the vibration part 131. For example, the end portion (or a distal end portion or one side) of the signal supply member 137 and 237 can be disposed or inserted (or accommodated) between one periphery portion of the first cover member 133*a* and the first surface of the vibration part 131.

According to another embodiment of the present disclosure, the end portion (or a distal end portion or one side or one portion) of the signal supply member 137 and 237 can be disposed or inserted (or accommodated) between the one periphery portion of the first cover member 133*a* and one periphery portion of the second cover member 133*d*. The one periphery portion of the first cover member 133*a* and the one periphery portion of the second cover member 133*d* can accommodate or vertically (or up and down) cover the end portion (or the distal end portion or the one side) of the signal supply member 137 and 237. Accordingly, the signal supply member 137 and 237 can be integrated as one body with the vibration apparatus 130 and 230. For example, the signal supply member 137 and 237 can be configured as a signal cable, a flexible cable, a flexible printed circuit cable, a flexible flat cable, a single-sided flexible printed circuit, a single-sided flexible printed circuit board, a flexible multi-layer printed circuit, or a flexible multilayer printed circuit board, but embodiments of the present disclosure are not limited thereto.

The signal supply member 137 and 237 according to an embodiment of the present disclosure can include a base member 137*a* and a plurality of signal lines 137*b* and 137*c*. For example, the signal supply member 137 and 237 can include a base member 137*a*, a first signal line 137*b*, and a second signal line 137*c*.

The base member 137*a* can include a transparent or opaque plastic material, but embodiments of the present disclosure are not limited thereto. The base member 137*a* can have a certain width along a first direction X and can be extended long along a second direction Y intersecting with the first direction X.

The first and second signal lines 137*b* and 137*c* can be disposed at a first surface of the base member 137*a* in parallel with the second direction Y and can be spaced apart from each other or electrically separated from each other along the first direction X. The first and second signal lines 137*b* and 137*c* can be disposed in parallel to each other at the first surface of the base member 137*a*. For example, the first and second signal lines 137*b* and 137*c* can be implemented in a line shape by patterning of a metal layer (or a conductive layer) formed or deposited at the first surface of the base member 137*a*.

End portions (or distal end portions or one sides) of the first and second signal lines 137*b* and 137*c* can be separated from each other, and thus, can be individually curved or bent.

The end portion (or the distal end portion or the one side or the one portion) of the first signal line 137*b* can be electrically connected to the first electrode layer 131*b* of the vibration part 131. For example, the end portion of the first signal line 137*b* can be electrically connected to at least a portion of the first electrode layer 131*b* of the vibration part 131 in the one periphery portion of the first cover member 131 in the one periphery portion of the first cover member 133*a*. For example, the end portion (or the distal end portion or the one side or the one portion) of the first signal line 137*b* can be electrically and directly connected to at least a portion of the first electrode layer 131*b* of the vibration part 131. For example, the end portion (or the distal end portion or the one side or the one portion) of the first signal line 137*b* can be electrically connected to or directly contact the first electrode layer 131*b* of the vibration part 131. For example, the end portion of the first signal line 137*b* can be electrically connected to the first electrode layer 131*b* by a conductive double-sided tape. Accordingly, the first signal line 137*b* can be configured to supply a first driving signal, supplied from the driving circuit part, to the first electrode layer 131*b* of the vibration part 131.

The end portion (or the distal end portion or the one side or the one portion) of the second signal line 137*c* can be electrically connected to the second electrode layer 131*c* of the vibration part 131. For example, the end portion of the second signal line 137*c* can be electrically connected to at least a portion of the second electrode layer 131*c* of the vibration part 131 in the one periphery portion of the second cover member 133*d*. For example, the end portion of the second signal line 137*c* can be electrically and directly connected to at least a portion of the second electrode layer 131*c* of the vibration part 131. For example, the end portion of the second signal line 137*c* can be electrically connected to or directly contact the second electrode layer 131*c* of the vibration part 131. For example, the end portion of the second signal line 137*c* can be electrically connected to the second electrode layer 131*c* by a conductive double-sided tape. Accordingly, the second signal line 137*c* can be configured to supply a second driving signal, supplied from the driving circuit part, to the second electrode layer 131*c* of the vibration part 131.

The signal supply member 137 and 237 according to an embodiment of the present disclosure can further include an insulation layer 137*d*.

The insulation layer 137*d* can be disposed at the first surface of the base member 137*a* to cover each of the first signal line 137*b* and the second signal line 137*c* other than the end portion (or one side) of the signal supply member 137 and 237.

According to an embodiment of the present disclosure, an end portion (or one side or one portion) of the signal supply member 137 and 237 including an end portion (or one side or one portion) of the base member 137*a* and an end portion (or one side or one portion) 137*da* of the insulation layer 137*d* can be inserted (or accommodated) between the cover member 133 and the vibration part 131 and can be fixed between the cover member 133 and the vibration part 131 by a first adhesive layer 133*b* and the second adhesive layer 133*c*.

According to an embodiment of the present disclosure, an end portion (or one side) of the signal supply member 137 and 237 including an end portion (or one side or one portion) of the base member 137*a* and an end portion (or one side or one portion) 137$da$ of the insulation layer 137$d$ can be inserted (or accommodated) between the first cover member 133$a$ and the second cover member 133$d$ and can be fixed between the first cover member 133$a$ and the second cover member 133$d$ by a first adhesive layer 133$b$ and the second adhesive layer 133$c$. Accordingly, the end portion (or one side or one portion) of the first signal line 137$b$ can be maintained with being electrically connected to the first electrode layer 131$b$ of the vibration part 131, and the end portion (or one side or one portion) of the second signal line 137$c$ can be maintained with being electrically connected to the second electrode layer 131$c$ of the vibration part 131. In addition, the end portion (or one side or one portion) of the signal supply member 137 and 237 can be inserted (or accommodated) and fixed between the vibration part 131 and the first cover member 133$a$, and thus, a contact defect between the vibration apparatus 130 and 230 and the signal supply member 137 and 237 caused by the movement of the signal supply member 137 and 237 can be prevented.

In the signal supply member 137 and 237 according to an embodiment of the present disclosure, each of the end portion (or one side) of the base member 137$a$ and the end portion (or one side or one portion) 137$da$ of the insulation layer 137$d$ can be removed. For example, each of the end portion of the first signal line 137$b$ and the end portion of the second signal line 137$c$ can be exposed at the outside without being supported or covered by each of the end portion (or one side or one portion) of the base member 137$a$ and the end portion (or one side or one portion) 137$da$ of the insulation layer 137$d$, respectively. In addition, the end portion (or one side or one portion) of each of the first signal line 137$b$ and the second signal line 137$c$ can protrude (or extend) to have a certain length from an end of the base member 137$a$ or an end of the insulation layer 137$d$. Accordingly, each of the end portion (or the distal end portion or the one side or one portion) of each of the first signal line 137$b$ and the second signal line 137$c$ can be individually or independently bent.

The end portion (or one side or one portion) of the first signal line 137$b$, which is not supported by the end portion (or one side or one portion) of the base member 137$a$ and the end portion (or one side or one portion) 137$da$ of the insulation layer 137$d$, can be directly connected to or directly contact the first electrode layer 131$b$ of the vibration part 131. The end portion (or one side or one portion) of the second signal line 137$c$, which is not supported by the end portion (or one side or one portion) of the base member 137$a$ and the end portion (or one side or one portion) 137$da$ of the insulation layer 137$d$, can be directly connected to or directly contact the second electrode layer 131$c$ of the vibration part 131.

According to an embodiment of the present disclosure, a portion of the signal supply member 137 and 237 or a portion of the base member 137$a$ can be disposed or inserted (or accommodated) between the cover member 133 and the vibration part 131, and thus, the signal supply member 137 and 237 can be integrated as one body with the vibration part 131. Further, a portion of the signal supply member 137 and 237 or a portion of the base member 137$a$ can be disposed or inserted (or accommodated) between the first cover member 133$a$ and the second cover member 133$d$, and thus, the signal supply member 137 and 237 can be integrated as one body with the vibration apparatus 130 and 230. Accordingly, the vibration apparatus 130 and 230 and the signal supply member 137 and 237 can be configured as one part (or one element or one component), and thus, an effect of uni-materialization can be obtained.

According to an embodiment of the present disclosure, the first signal line 137$b$ and the second signal line 137$c$ of the signal supply member 137 and 237 can be integrated as one body with the vibration apparatus 130 and 230, and thus, a soldering process for an electrical connection between the vibration apparatus 130 and 230 and the signal supply member 137 and 237 is not be needed. Accordingly, a manufacturing process and a structure of the vibration apparatus 130 and 230 can be simplified, and hazards associated with the soldering process can be reduced.

Figure 26:
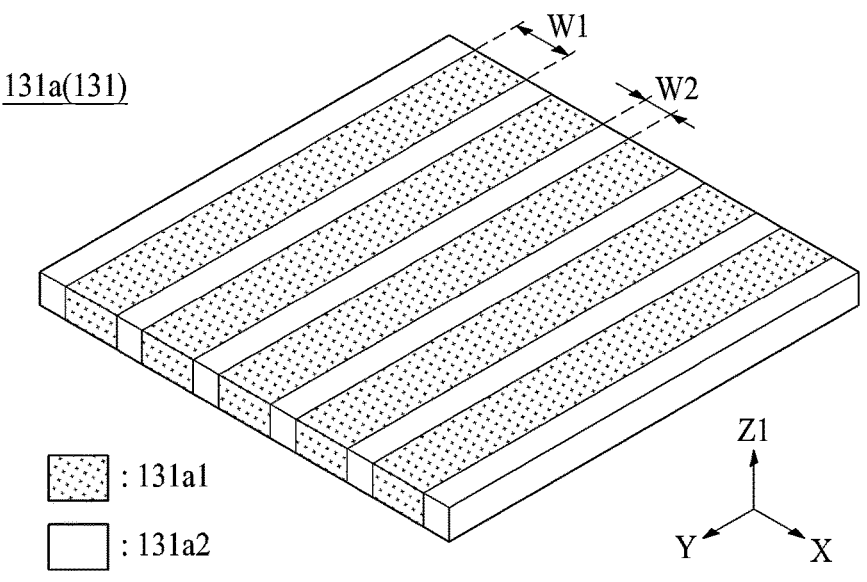
FIG. 26 is a perspective view illustrating a vibration layer according to another embodiment of the present disclosure.

FIG. 26 is a perspective view illustrating a vibration layer according to another embodiment of the present disclosure. FIG. 26 illustrates another embodiment of the vibration layer described above with reference to FIGS. 23 to 25.

With reference to FIGS. 24 and 26, the vibration layer 131$a$ according to another embodiment of the present disclosure can include a plurality of first portions 131$a$1 and a plurality of second portions 131$a$2. For example, the plurality of first portions 131$a$1 and the plurality of second portions 131$a$2 can be alternately and repeatedly disposed along a first direction X (or second direction Y).

Each of the plurality of first portions 131$a$1 can include an inorganic material portion having a piezoelectric effect (or a piezoelectric characteristic). For example, each of the plurality of first portions 131$a$1 can include at least one or more of a piezoelectric inorganic material and a piezoelectric organic material. Further, each of the plurality of first portions 131$a$1 can be an inorganic portion, an inorganic material portion, a piezoelectric portion, a piezoelectric material portion, or an electroactive portion, but embodiments of the present disclosure are not limited thereto.

According to an embodiment of the present disclosure, each of the plurality of first portions 131$a$1 can have a first width W1 parallel to the first direction X (or the second direction Y) and can be extended along the second direction Y (or the first direction X). Each of the plurality of first portions 131$a$1 can be substantially a same as a vibration layer 131$a$ described above with reference to FIGS. 23 to 25, and thus, repeated descriptions thereof can be omitted.

Each of the plurality of second portions 131$a$2 can be disposed between the plurality of first portions 131$a$1. For example, each of the plurality of first portions 131$a$1 can be disposed between two adjacent second portions 131$a$2 of the plurality of second portions 131$a$2. Each of the plurality of second portions 131$a$2 can have a second width W2 parallel to the first direction X (or the second direction Y) and can be extended along the second direction Y (or the first direction X). The first width W1 can be a same as or different from the second width W2. For example, the first width W1 can be greater than the second width W2. For example, the first portion 131$a$1 and the second portion 131$a$2 can include a line shape or a stripe shape which has a same size or different sizes. However, in another embodiment, the first width W1 can be less than the second width W2.

Each of the plurality of second portions 131$a$2 can be configured to fill a gap between two adjacent first portions of the plurality of first portions 131$a$1. Each of the plurality of second portions 131$a$2 can be configured to fill a gap between two adjacent first portions of the plurality of first portions 131$a$1, and thus, can be connected to or attached at lateral surfaces of the first portion 131$a$1 adjacent thereto. According to an embodiment of the present disclosure, each of the plurality of first portions 131$a$1 and the plurality of second portions 131$a$2 can be disposed (or arranged) at a same plane (or a same layer) in parallel with each other. Therefore, the vibration layer 131$a$ can be expanded to a desired size or length by a lateral coupling (or connection) of the first portions 131a1 and the second portions 131a2.

According to an embodiment of the present disclosure, each of the plurality of second portions 131a2 can absorb an impact applied to the first portions 131a1, and thus, can enhance the total durability of the first portions 131a1 and provide flexibility to the vibration layer 131a. Each of the plurality of second portions 131a2 can include an organic material having a ductile characteristic. For example, each of the plurality of second portions 131a2 can include one or more of an epoxy-based polymer, an acrylic-based polymer, and a silicone-based polymer, but embodiments of the present disclosure are not limited thereto. In addition, each of the plurality of second portions 131a2 can be an organic portion, an organic material portion, an adhesive portion, a stretch portion, a bending portion, a damping portion, or a ductile portion, but embodiments of the present disclosure are not limited thereto.

A first surface of each of the plurality of first portions 131a1 and the plurality of second portions 131a2 can be connected to the first electrode layer 131b in common. A second surface of each of the plurality of first portions 131a1 and the plurality of second portions 131a2 can be connected to the second electrode layer 131c in common.

The plurality of first portions 131a1 and the plurality of second portion 131a2 can be disposed (or connected) at a same plane, and thus, the vibration part 131a according to another embodiment of the present disclosure can have a single thin film-type. Accordingly, the vibration layer 131 or the vibration apparatus 130 and 230 including the vibration layer 131a according to another embodiment of the present disclosure can vibrate by the first portion 131a1 having a vibration characteristic and can be bent in a curved shape by the second portion 131a2 having flexibility.

Figure 27:
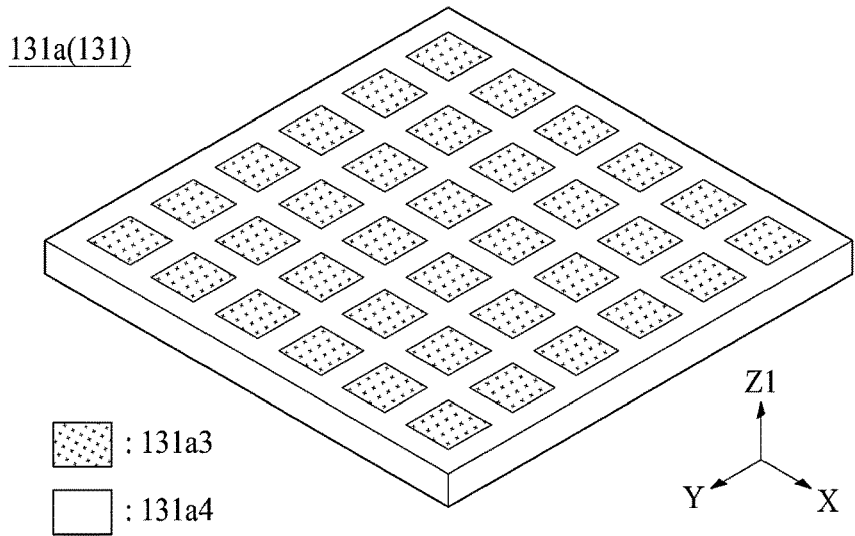
FIG. 27 is a perspective view illustrating a vibration layer according to another embodiment of the present disclosure.

FIG. 27 is a perspective view illustrating a vibration layer according to another embodiment of the present disclosure. FIG. 27 illustrates another embodiment of the vibration layer described above with reference to FIGS. 23 to 25.

With reference to FIGS. 24 and 27, the vibration layer 131a according to another embodiment of the present disclosure can include a plurality of first portions 131a3 and a second portion 131a4 disposed between the plurality of first portions 131a3.

Each of the plurality of first portions 131a3 can be disposed to be spaced apart from one another along each of the first direction X and the second direction Y. For example, each of the plurality of first portions 131a3 can have a hexahedral shape having a same size and can be disposed in a lattice shape, but embodiments of the present disclosure are not limited thereto. For example, each of the plurality of first portions 131a3 can have a circular shape plate, an oval shape plate, or a polygonal shape plate, which has a same size as each other, but embodiments of the present disclosure are not limited thereto.

Each of the plurality of first portions 131a3 can be substantially a same as the first portion 131a1 described above with reference to FIG. 26, and thus, repeated descriptions thereof can be omitted.

The second portion 131a4 can be disposed between the plurality of first portions 131a3 along each of the first direction X and the second direction Y. The second portion 131a4 can be configured to fill a gap between two adjacent first portions 131a3, or to be adjacent to each of the plurality of first portions 131a3 or to surround each of the plurality of first portions 131a3, and thus, the second portion 131a4 can be connected to or attached at the first portion 131a3 adjacent thereto. The second portion 131a4 can be substantially a same as the second portion 131a2 described above with reference to FIG. 26, and thus, repeated descriptions thereof can be omitted.

A first surface of each of the plurality of first portions 131a3 and the second portions 131a4 can be connected to the first electrode layer 131b in common. A second surface of each of the plurality of first portions 131a3 and the second portions 131a4 can be connected to the second electrode layer 131c in common.

The plurality of first portions 131a3 and the second portion 131a4 can be disposed (or connected) at a same plane, and thus, the vibration layer 131a according to another embodiment of the present disclosure can have a single thin film-type. Accordingly, the vibration part 131 or the vibration apparatus 130 and 230 including the vibration layer 131a according to another embodiment of the present disclosure can vibrate by the first portion 131a3 having a vibration characteristic and can be bent in a curved shape by the second portion 131a4 having flexibility.

Figure 28:
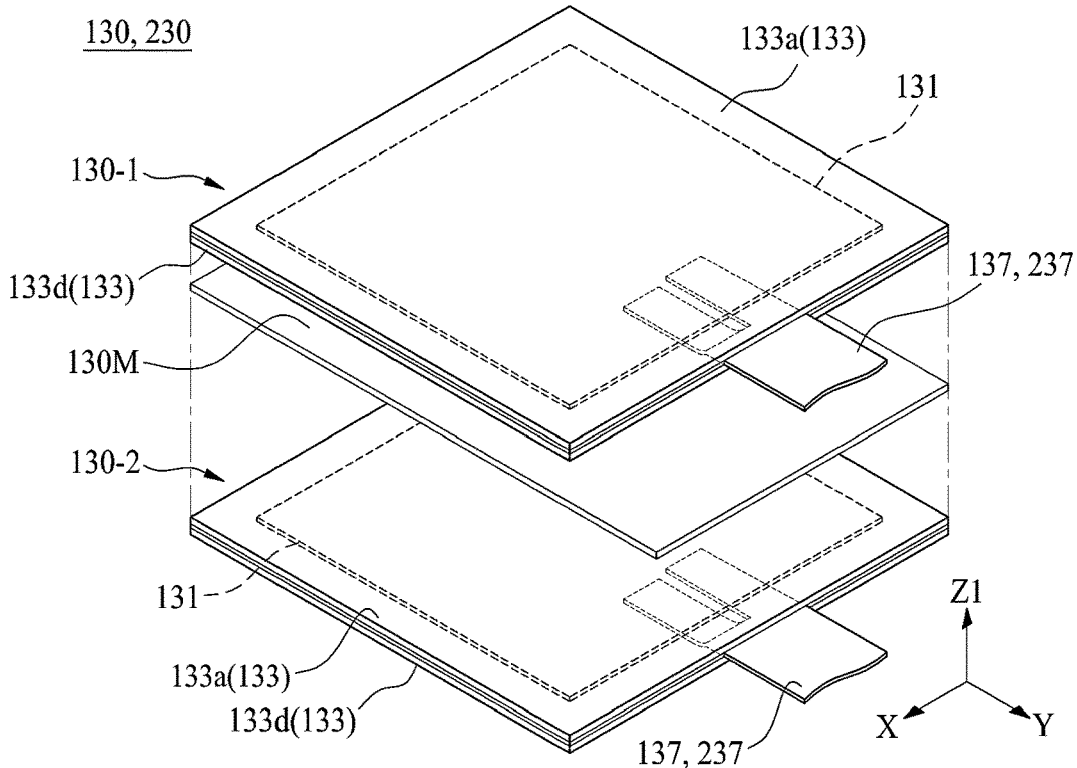
FIG. 28 is an overview illustrating a vibration apparatus according to another embodiment of the present disclosure.

FIG. 28 illustrates a vibration apparatus according to another embodiment of the present disclosure. FIG. 28 illustrates a vibration apparatus described above with reference to FIGS. 1 to 22.

With reference to FIGS. 2 and 28, the vibration apparatus 130 and 230 according to another embodiment of the present disclosure can include two or more vibration generating parts 130-1 and 130-2. For example, the vibration apparatus 130 and 230 can include a first vibration generating part 130-1 and a second vibration generating part 130-2.

The first vibration generating part 130-1 and the second vibration generating part 130-2 can overlap or be stacked with each other to be displaced (or driven or vibrated) in a same direction to maximize an amplitude displacement of the vibration apparatus 130 and 230 or an amplitude displacement of a vibration member. Additionally, the first vibration generating part 130-1 and the second vibration generating part 130-2 can have substantially a same size, but embodiments of the present disclosure are not limited thereto. For example, the first vibration generating part 130-1 and the second vibration generating part 130-2 can have substantially a same size within an error range of a manufacturing process, but embodiments of the present disclosure are not limited thereto. Therefore, the first vibration generating part 130-1 and the second vibration generating part 130-2 can maximize the amplitude displacement of the vibration apparatus 130 and 230 and/or the amplitude displacement of the vibration member. However, in another embodiment, the first vibration generating part 130-1 and the second vibration generating part 130-2 can have different sizes from each other.

According to an embodiment of the present disclosure, any one of the first vibration generating part 130-1 and the second vibration generating part 130-2 can be connected or coupled to the vibration member 110 by the connection member 120 and 220 illustrated in FIGS. 2 to 22. For example, the first vibration generating part 130-1 can be connected or coupled to the vibration member 110 by the connection member 120 and 220.

Each of the first vibration generating part 130-1 and the second vibration generating part 130-2 can be a same as or substantially a same as the vibration apparatus 130 and 230 described above with reference to FIGS. 23 to 27, and thus, like reference numeral refer to like element and repeated descriptions thereof can be omitted.

The vibration apparatus 130 and 230 according to another embodiment of the present disclosure can further include an intermediate adhesive member 130M.

The intermediate adhesive member 130M can be disposed or connected between the first vibration generating part 130-1 and the second vibration generating part 130-2. As an embodiment of the present disclosure, the intermediate adhesive member 130M can be disposed or connected between the second adhesive layer 133c of the first vibration generating part 130-1 and the first cover member 133a of the second vibration generating part 130-2. As another embodiment of the present disclosure, the intermediate adhesive member 130M can be disposed or connected between the second cover member 133d of the first vibration generating part 130-1 and the first cover member 133a of the second vibration generating part 130-2. For example, the intermediate adhesive member 130M can be an intermediate member, an adhesive member, or a connection member, but embodiments of the present disclosure are not limited thereto.

The intermediate adhesive member 130M according to an embodiment of the present disclosure can be configured in a material including an adhesive layer which is good in adhesive force or attaching force with respect to each of the first vibration generating part 130-1 and the second vibration generating part 130-2. For example, the intermediate adhesive member 130M can include a foam pad, a double-sided tape, a double-sided foam tape, a double-sided foam pad, a double-sided adhesive tape, or an adhesive, or the like, but embodiments of the present disclosure are not limited thereto. Additionally, an adhesive layer of the intermediate adhesive member 130M can include epoxy, acrylic, silicone, or urethane, but embodiments of the present disclosure are not limited thereto. For example, the adhesive layer of the intermediate adhesive member 130M can include a urethane-based material (or substance) having relatively ductile characteristic. Accordingly, the vibration loss caused by displacement interference between the first vibration generating part 130-1 and the second vibration generating part 130-2 can be reduced or minimized, or each of the first vibration generating part 130-1 and the second vibration generating part 130-2 can be freely displaced (or vibrated or driven).

The vibration apparatus 130 and 230 according to another embodiment of the present disclosure can include the first vibration generating part 130-1 and the second vibration generating part 130-2 which are stacked (or piled or overlap) to vibrate (or displace or drive) in a same direction, and thus, the amount of displacement or an amplitude displacement can be maximized or increase. Accordingly, the amount of displacement (or a bending force or a driving force) or an amplitude displacement of the vibration member 110 can be more maximized or more increased, thereby more enhancing a sound characteristic and/or a sound pressure level characteristic of a low-pitched sound band.

Figure 29:
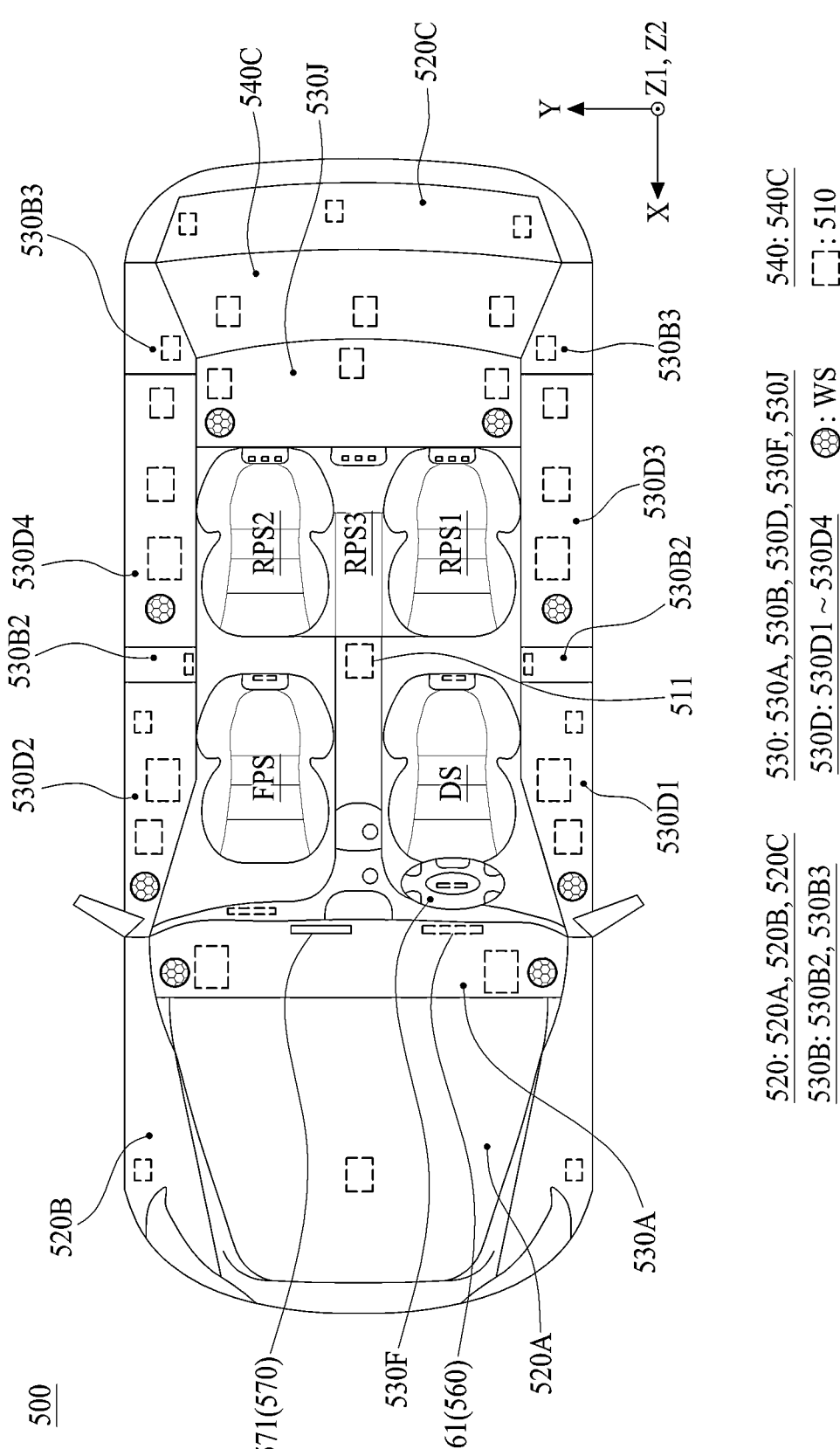
FIG. 29 is an overview illustrating a vehicular apparatus according to an embodiment of the present disclosure.
Figure 30:
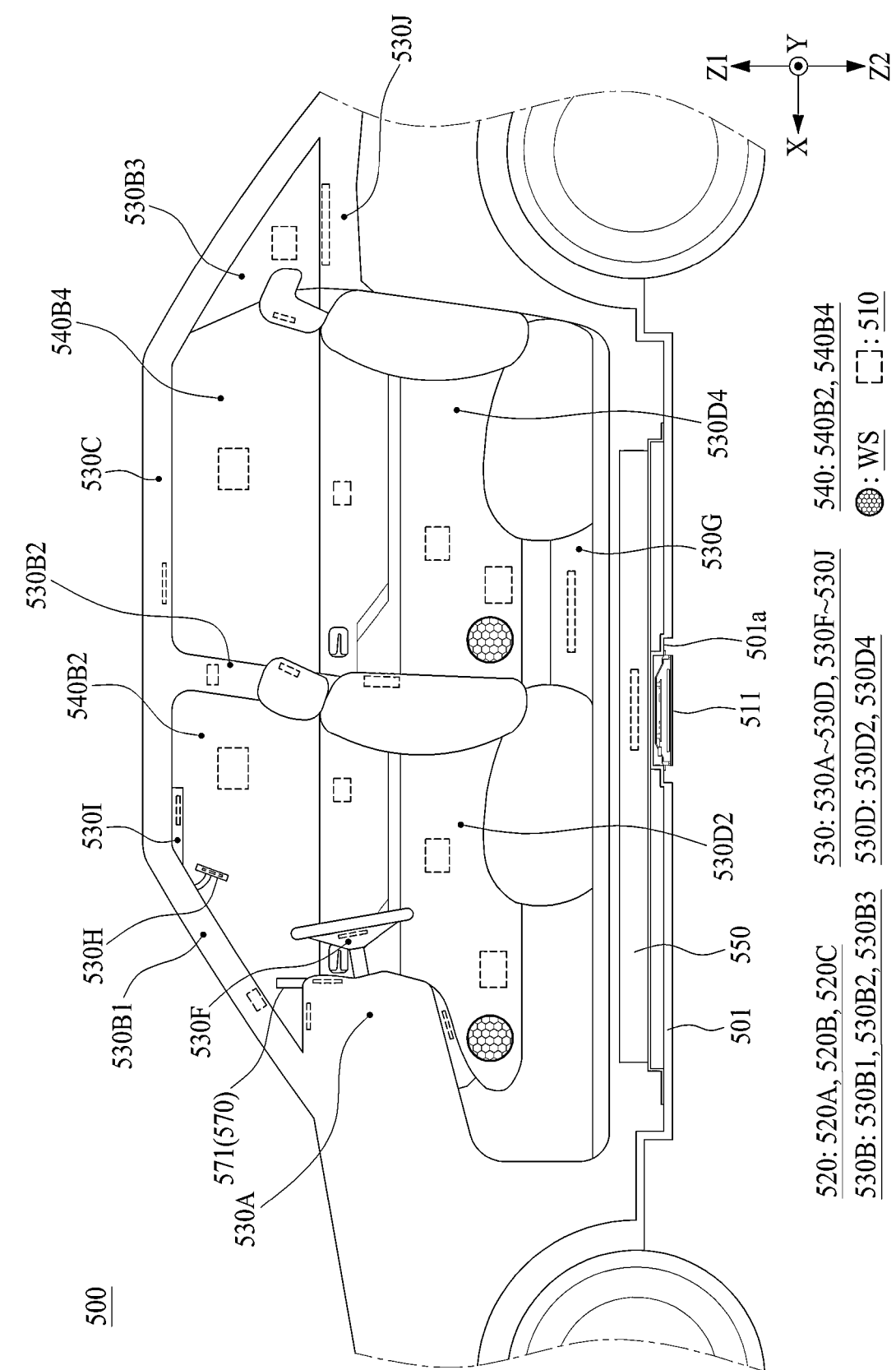
FIG. 30 is a cross-sectional view illustrating a vehicular apparatus according to an embodiment of the present disclosure.

FIG. 29 illustrates a vehicular apparatus according to an embodiment of the present disclosure. FIG. 30 is a cross-sectional view illustrating a vehicular apparatus according to an embodiment of the present disclosure.

With reference to FIGS. 29 and 30, the vehicular apparatus 500 according to an embodiment of the present disclosure can include one or more sound generating apparatuses 510 configured to output a sound at one or more of an exterior material 520 and an interior material 530. For example, one or more of the exterior material 520 and the interior material 530 can output sound based on a vibration of the one or more sound generating apparatuses 510. In FIGS. 29 and 30, a portion indicated by a dotted line indicates a portion where one or more sound generating apparatuses 510 can be disposed.

The one or more sound generating apparatuses 510 can be disposed at the exterior material 520 or the interior material 530 or between the exterior material 520 and the interior material 530 to output a sound. For example, the one or more sound generating apparatuses 510 can be disposed at at least one or more of the exterior material 520, the interior material 530, and between the exterior material 520 and the interior material 530 to output a sound.

The interior material 530 according to an embodiment of the present disclosure can include at least one or more of a dashboard 530A, a pillar interior material 530B, a roof interior material 530C, a door interior material 530D, a seat interior material, a handle interior material 530F, a floor interior material 530G, and a rear package interior material 530J, however, the present disclosure is not limited thereto. The one or more sound generating apparatuses 510 can vibrate at least one of the dashboard 530A, the pillar interior material 530B, the loop interior material 530C, the door interior material 530D, the seat interior material, the handle interior material 530F, the floor interior material 530G, and the rear package interior material 530J. In addition, the one or more sound generating apparatuses 510 can be disposed between the exterior material 520 and at least one or more of the dashboard 530A, the pillar interior material 530B, the loop interior material 530C, the door interior material 530D, the seat interior material, the handle interior material 530F and the floor interior material 530G. Therefore, the one or more sound generating apparatuses 510 can be output sounds of one or more channels.

At least one or more of the one or more sound generating apparatuses 510 can be configured to be transparent or translucent. For example, when a window is entirely transparent, at least one or more of the one or more sound generating apparatuses 510 can be configured to be transparent and can be disposed at an intermediate area or a peripheral area of the window. When a glass window includes a translucent portion or an opaque portion, at least one or more of the one or more sound generating apparatuses 510 can be configured to be translucent or opaque and can be disposed to correspond to a portion or an opaque portion of the glass window. Additionally, at least one or more of the one or more sound generating apparatuses 510 can be a transparent vibration generator, a transparent vibration generating apparatus, or a transparent sound generating apparatus, but embodiments of the present disclosure are not limited thereto.

With reference to FIGS. 29 and 30, the one or more sound generating apparatuses 510 according to an embodiment of the present disclosure can be disposed between a dash panel and the dashboard 530A and can be configured to indirectly or directly vibrate the dashboard 530A to output a sound. For example, the one or more sound generating apparatuses 510 can include the acoustic apparatus 100 described with reference to FIGS. 1 to 28, and thus, repeated descriptions thereof can be omitted. For example, the one or more sound generating apparatuses 510 can be a dashboard speaker or a first speaker, or the like, but embodiments of the present disclosure are not limited thereto.

According to an embodiment of the present disclosure, at least one or more of the dash panel and the dashboard 530A can include a first region corresponding to a driver seat DS, a second region corresponding to a front passenger seat FPS, and a third region (or a middle region) between the first region and the second region. One or more of the dash panel and the dashboard 530A can include a fourth region which is inclined to face the front passenger seat FPS. According to an embodiment of the present disclosure, the one or more sound generating apparatuses 510 can be disposed to vibrate at least one or more of the first to fourth regions of the dashboard 530A. In addition, the one or more sound generating apparatuses 510 can be disposed at each of the first and second regions of the dashboard 530A, or can be disposed at each of the first to fourth regions. Additionally, the one or more sound generating apparatuses 510 can be disposed at each of the first and second regions of the dashboard 530A, or can be disposed at at least one or more of the first to fourth regions. Further, the one or more sound generating apparatuses 510 can be configured to output a sound in a range of 150 Hz to 20 kHz. In addition, the one or more sound generating apparatuses 510 configured to vibrate at least one or more of the first to fourth regions of the dashboard 530A can have a same sound output charac- teristic or different sound output characteristics. Addition- ally, the one or more sound generating apparatuses 510 configured to vibrate each of the first to fourth regions of the dashboard 530A can have a same sound output characteristic or different sound output characteristics.

The one or more sound generating apparatuses 510 according to an embodiment of the present disclosure can be disposed between a pillar panel and the pillar interior material 530B and can be configured to indirectly or directly vibrate the pillar interior material 530B to output a sound. For example, the one or more sound generating apparatuses 510 can include the acoustic apparatus 100 described above with reference to FIGS. 1 to 28, and thus, repeated descrip- tions thereof can be omitted. For example, the one or more sound generating apparatuses 510 can be referred to as a pillar speaker, a tweeter speaker, or a second speaker, or the like, but embodiments of the present disclosure are not limited thereto.

According to an embodiment of the present disclosure, the pillar panel can include a first pillar (or an A pillar) which is disposed at both sides of a front window, a second pillar (or a B pillar) which is disposed at both sides of a center of a vehicle body, and a third pillar (or a C pillar) which is disposed at both sides of a rear portion of the vehicle body. The pillar interior material 530B can include a first pillar interior material 530B1 which covers the first pillar, a second pillar interior material 530B2 which covers the second pillar, and a third pillar interior material 530B3 which covers the third pillar. According to an embodiment of the present disclosure, the one or more sound generating apparatuses 510 can be disposed at one or more of a region between the first pillar and the first pillar interior material 530B1, a region between the second pillar and the second pillar interior material 530B2, and a region between the third pillar and the third pillar interior material 530B3, and thus, can vibrate at least one or more of the first to third pillar interior materials 530B1, 530B2, and 530B3. For example, the one or more sound generating apparatuses 510 can be configured to output a sound in a range of 2 kHz to 20 kHz, but embodiments of the present disclosure are not limited thereto. For example, the one or more sound generating apparatuses 510 can be configured to output a sound in a range of 150 Hz to 20 KHz. Additionally, the one or more sound generating apparatuses 510 configured to vibrate at least one or more of the first to third pillar interior materials 530B1, 530B2, and 530B3 can have a same sound output characteristic or different sound output characteristics.

The one or more sound generating apparatuses 510 according to an embodiment of the present disclosure can be disposed between a roof panel and the roof interior material 530C and can be configured to indirectly or directly vibrate the roof interior material 530C to output a sound. For example, the one or more sound generating apparatuses 510 can be configured to be transparent or translucent. Further, the one or more sound generating apparatuses 510 can include the acoustic apparatus 100 described with reference to FIGS. 1 to 28, and thus, repeated descriptions thereof can be omitted. In addition, the one or more sound generating apparatuses 510 can be a roof speaker or a third speaker, or the like, but embodiments of the present disclosure are not limited thereto.

According to an embodiment of the present disclosure, at least one or more of the roof panel and the roof interior material 530C covering the roof panel can include a first region corresponding to the driver seat DS, a second region corresponding to the front passenger seat FPS, a third region corresponding to a region between the driver seat DS and the front passenger seat FPS, a fourth region corresponding to a first rear passenger seat RPS1 behind the driver seat DS, a fifth region corresponding to a second rear passenger seat RPS2 behind the front passenger seat FPS, a sixth region corresponding to a region between the first rear passenger seat RPS1 and the second rear passenger seat RPS2, and a seventh region between the third region and the sixth region. For example, the one or more sound generating apparatuses 510 can be configured to vibrate at least one or more of the first to seventh regions of the roof interior material 530C. In addition, the one or more sound generating apparatuses 510 can be configured to output a sound in a range of 150 Hz to 20 kHz. For example, the one or more sound generating apparatuses 510 configured to vibrate at least one or more of the first to seventh regions of the roof interior material 530C can have a same sound output characteristic or different sound output characteristics. Further, the one or more sound generating apparatuses 510 configured to vibrate each of the first to seventh regions of the roof interior material 530C can have a same sound output characteristic or different sound output characteristics. Additionally, at least one or more of the one or more sound generating apparatuses 510 config- ured to vibrate at least one or more of the first to seventh regions of the roof interior material 530C can be configured to output a sound in a range of 2 kHz to 20 kHz, and the other can be configured to output a sound in a range of 150 Hz to 20 kHz. Further, at least one or more of one or more sound generating apparatuses 510 configured to vibrate each of the first to seventh regions of the roof interior material 530C can be configured to output a sound in a range of 2 kHz to 20 kHz, and the other can be configured to output a sound in a range of 150 Hz to 20 kHz.

According to an embodiment of the present disclosure, the one or more sound generating apparatuses 510 can be disposed between a door frame and the door interior material 530D and can be configured to indirectly or directly vibrate the door interior material 530D to output a sound. For example, the one or more sound generating apparatuses 510 can include the acoustic apparatus 100 described above with reference to FIGS. 1 to 28, and thus, repeated descriptions thereof can be omitted. For example, the one or more sound generating apparatuses 510 can be referred to as a door speaker or a fourth speaker, or the like, but embodiments of the present disclosure are not limited thereto.

According to an embodiment of the present disclosure, with respect to a height direction Z, at least one or more of the door frame and the door interior material 530D can include an upper region, a middle region, and a lower region. For example, the one or more sound generating apparatuses 510 can be disposed at at least one or more of an upper region, a middle region, and a lower region between the door frame and the door interior material 530D, and thus, can vibrate at least one or more of the upper region, the middle region, and the lower region of the door interior material 530D.

According to an embodiment of the present disclosure, an upper region of the door interior material 530D can include a curved portion having a relatively small radius of curvature. The one or more sound generating apparatuses 510 for vibrating the upper region of the door interior material 530D can be bent into a shape that follows a shape (or surface topology) of the curved portion of the upper region of the door interior material 530D due to the second portion 131*a*2 and 131*a*4 having flexibility of the vibration layer 131*a* described above with reference to FIGS. 26 and 27.

According to an embodiment of the present disclosure, the door frame can include a first door frame (or a left front door frame), a second door frame (or a right front door frame), a third door frame (or a left rear door frame), and a fourth door frame (or a right rear door frame). According to an embodiment of the present disclosure, the door interior material 530D can include a first door interior material (or a left front door interior material) 530D1 covering the first door frame, a second door interior material (or a right front door interior material) 530D2 covering the second door frame, a third door interior material (or a left rear door interior material) 530D3 covering the third door frame, and a fourth door interior material (or a right rear door interior material) 530D4 covering the fourth door frame. Additionally, the one or more sound generating apparatuses 510 can be disposed at at least one or more of an upper region, a middle region, and a lower region between each of the first to fourth door frames and the first to fourth door interior materials 530D1 to 530D4, and thus, can vibrate at least one or more of the upper region, the middle region, and the lower region of each of the first to fourth door interior materials 530D1 to 530D4.

According to an embodiment of the present disclosure, the one or more sound generating apparatuses 510 configured to vibrate the upper region of each of the first to fourth door interior materials 530D1 to 530D4 can be configured to output a sound in a range of 2 kHz to 20 kHz, or can be configured to output a sound in a range of 150 Hz to 20 kHz. For example, the one or more sound generating apparatuses 510 configured to vibrate the upper region of at least one or more of the first to fourth door interior materials 530D1 to 530D4 can be configured to output a sound in a range of 2 kHz to 20 kHz, or can be configured to output a sound in a range of 150 Hz to 20 KHz.

According to an embodiment of the present disclosure, the one or more sound generating apparatuses 510 configured to vibrate the middle region or/and the lower region of at least one or more of the first to fourth door interior materials 530D1 to 530D4 can be configured to output a sound in a range of 150 Hz to 20 kHz. The one or more sound generating apparatuses 510 configured to vibrate the middle region or/and the lower region of each of the first to fourth door interior materials 530D1 to 530D4 can be configured to output a sound in a range of 150 Hz to 20 kHz. For example, the one or more sound generating apparatuses 510 configured to vibrate the middle region or/and the lower region of at least one or more of the first to fourth door interior materials 530D1 to 530D4 can be any one or more of a woofer, a mid-woofer, and a sub-woofer. For example, the one or more sound generating apparatuses 510 configured to vibrate the middle region or/and the lower region of each of the first to fourth door interior materials 530D1 to 530D4 can be any one or more of a woofer, a mid-woofer, and a sub-woofer.

Sounds output from each of the one or more sound generating apparatuses 510 disposed at the first door interior material 530D1 and the one or more sound generating apparatuses 510 disposed at the second door interior material 530D2 can be combined and output. For example, sounds output from at least one or more of one or more sound generating apparatuses 510 disposed at the first door interior material 530D1 and the one or more sound generating apparatuses 510 disposed at the second door interior material 530D2 can be combined and output. In addition, sounds output from the one or more sound generating apparatuses 510 disposed at the third door interior material 530D3 and sounds output from the one or more sound generating apparatuses 510 disposed at the fourth door interior material 530D4 can be combined and output.

According to an embodiment of the present disclosure, the upper region of each of the first to fourth door interior materials 530D1 to 530D4 can include a first upper region adjacent to the dashboard 530A, a second upper region adjacent to back seats RPS1, RPS2, and RPS3, and a third upper region between the first upper region and the second upper region. For example, the one or more sound generating apparatuses 510 can be disposed at one or more of the first to third upper regions of each of the first to fourth door interior materials 530D1 to 530D4. For example, the one or more sound generating apparatuses 510 can be disposed at the first upper region of each of the first and second door interior materials 530D1 and 530D2 and can be disposed at one or more of the second and third upper regions of each of the first and second door interior materials 530D1 and 530D2. Additionally, the one or more sound generating apparatuses 510 can be disposed at one or more of the first to third upper regions of at least one or more of the first to fourth door interior materials 530D1 to 530D4. Further, the one or more sound generating apparatuses 510 configured to vibrate the first upper region of one or more of the first and second door interior materials 530D1 and 530D2 can be configured to output a sound in a range of 2 kHz to 20 kHz, and the one or more sound generating apparatuses 510 configured to vibrate one or more of the second and third upper regions of each of the first and second door interior materials 530D1 and 530D2 can be configured to output a sound in a range of 2 kHz to 20 kHz or can be configured to output a sound in a range of 150 Hz to 20 kHz. Further, the one or more sound generating apparatuses 510 configured to vibrate one or more of the second and third upper regions of at least one or more of the first and second door interior materials 530D1 and 530D2 can be configured to output a sound in a range of 2 kHz to 20 kHz, or can be configured to output a sound in a range of 150 Hz to 20 kHz.

According to an embodiment of the present disclosure, one or more sound generating apparatuses 510 can be disposed between a seat frame and the seat interior material 530E and can be configured to indirectly or directly vibrate the seat interior material 530E to output a sound. For example, the one or more sound generating apparatuses 510 can include the acoustic apparatus 100 described above with reference to FIGS. 1 to 28, and thus, repeated descriptions thereof can be omitted. Additionally, the one or more sound generating apparatuses 510 can be referred to as a sheet speaker, a headrest speaker, or a fifth speaker, or the like, but embodiments of the present disclosure are not limited thereto.

According to an embodiment of the present disclosure, the seat frame can include a first seat frame (or a driver seat frame), a second seat frame (or a front passenger seat frame), a third seat frame (or a first passenger seat frame), a fourth seat frame (or a second passenger seat frame), and a fifth seat frame (or a third passenger seat frame). According to an embodiment of the present disclosure, the seat interior material can include a first seat interior material surrounding the first seat frame, a second seat interior material surrounding the second seat frame, a third seat interior material surrounding the third seat frame, a fourth seat interior material surrounding the fourth seat frame, and a fifth seat interior material surrounding the fifth seat frame.

According to an embodiment of the present disclosure, at least one or more of the first to fifth seat frames can include a seat floor frame, a seat rear frame, and a headrest frame. The seat interior material can include a seat floor interior material surrounding the seat floor frame, a seat rear interior material surrounding the seat rear frame, and a headrest interior material surrounding the headrest frame. At least one or more of the seat floor interior material, the seat rear interior material, and the headrest interior material can include a seat internal interior material and a seat external interior material. The seat internal interior material can include a foam layer. The seat external interior material can include a skin layer including fiber or leather. The seat external interior material can further include a base layer including a plastic material, which supports the skin layer.

According to an embodiment of the present disclosure, the one or more sound generating apparatuses 510 can be disposed at at least one or more of a region between the seat rear frame and the seat rear interior material and a region between the headrest frame and the headrest interior material, and thus, can vibrate at least one or more of the seat external interior material of the seat rear interior material and a seat external interior material of the headrest interior material.

According to an embodiment of the present disclosure, the one or more sound generating apparatuses 510 disposed at at least one or more of the driver seat DS and the front passenger seat FPS can be disposed at at least one or more of a region between the seat rear frame and the seat rear interior material and a region between the headrest frame and the headrest interior material.

According to an embodiment of the present disclosure, the one or more sound generating apparatuses 510 disposed at at least one or more of the first to third passenger seats RPS1, RPS2, and RPS3 can be disposed between the headrest frame and the headrest interior material. For example, at least one or more of the first to third passenger seats RPS1, RPS2, and RPS3 can include one or more sound generating apparatuses 510 disposed between the headrest frame and the headrest interior material.

According to an embodiment of the present disclosure, the one or more sound generating apparatuses 510 vibrating the seat rear interior material of at least one or more of the driver seat DS and the front passenger seat FPS can be configured to output a sound in a range of 150 Hz to 20 KHz.

According to an embodiment of the present disclosure, the one or more sound generating apparatuses 510 vibrating the headrest interior material of at least one or more of the driver seat DS, the front passenger seat FPS, and the first to third passenger seats RPS1, RPS2, and RPS3 can be configured to output a sound in a range of 2 kHz to 20 kHz, or can be configured to output a sound in a range of 150 Hz to 20 KHz.

With reference to FIG. 30, the one or more sound generating apparatuses 510 according to an embodiment of the present disclosure can be disposed between a handle frame and the handle interior material 530F and can be configured to indirectly or directly vibrate the handle interior material 530F to output a sound. For example, the one or more sound generating apparatuses 510 can include the acoustic apparatus 100 described above with reference to FIGS. 1 to 28, and thus, repeated descriptions thereof can be omitted. For example, the one or more sound generating apparatuses 510 can be referred to as a handle speaker, a steering speaker, or a sixth speaker, or the like, but embodiments of the present disclosure are not limited thereto.

According to an embodiment of the present disclosure, the one or more sound generating apparatuses 510 can provide sound to a driver by indirectly or directly vibrating the handle interior material 530F. The sound output by the one or more sound generating apparatuses 510 at the handle interior material 530F can be a same as or different from the sound output by at least one or more among the one or more sound generating apparatuses 510 between the dash panel and the dashboard 530A, the one or more sound generating apparatuses 510 between the pillar panel and the pillar interior material 530B, the one or more sound generating apparatuses 510 between the roof panel and the roof interior material 530C, the one or more sound generating apparatus 510 between the door frame and door interior material 530D and the one or more sound generating apparatuses 510 between the seat frame and the seat interior material.

As an embodiment of the present disclosure, the one or more sound generating apparatuses 510 at the handle interior material 530F can output sound provided only to a driver of the vehicle, and not the first to third passenger seats RPS1, RPS2, and RPS3.

As another embodiment of the present disclosure, the sound output by the one or more sound generating apparatuses 510 at the handle interior material 530F and the sound output by at least one or more among the one or more sound generating apparatuses 510 between the dash panel and the dashboard 530A, the one or more sound generating apparatuses 510 between the pillar panel and the pillar interior material 530B, the one or more sound generating apparatuses 510 between the roof panel and the roof interior material 530C, the one or more sound generating apparatuses 510 between the door frame and door interior material 530D and the one or more sound generating apparatuses 510 between the seat frame and the seat interior material can be combined and output.

According to an embodiment of the present disclosure, the one or more sound generating apparatuses 510 can be disposed between a floor panel and the floor interior material 530G and can be configured to indirectly or directly vibrate the floor interior material 530G to output a sound. The one or more sound generating apparatuses 510 can be disposed between the floor panel and the floor interior material 530G disposed between front seats DS and FPS and a third rear passenger seat RPS3. Additionally, the one or more sound generating apparatuses 510 can include the acoustic apparatus 100 described above with reference to FIGS. 1 to 28, and thus, repeated descriptions thereof can be omitted. Further, the one or more sound generating apparatuses 510 can be configured to output a sound in a range of 150 Hz to 20 kHz. In addition, the one or more sound generating apparatuses 510 can be referred to as a floor speaker, a bottom speaker, an under-speaker, or a seventh speaker, or the like, but embodiments of the present disclosure are not limited thereto.

The vehicular apparatus according to an embodiment of the present disclosure can further include one or more sound generating apparatuses 510 disposed at the interior material 530 exposed to an indoor space. For example, the vehicular apparatus according to an embodiment of the present disclosure can include only the one or more sound generating apparatuses 510 disposed at the interior material 530 exposed to the indoor space instead of the one or more sound generating apparatuses 510 disposed at the interior material 530, or can include both the one or more sound generating apparatuses 510 disposed at the interior material 530 and the one or more sound generating apparatuses 510 disposed at the interior material 530 exposed to the indoor space. For example, the one or more sound generating apparatuses 510 disposed at the interior material 530 and/or the one or more sound generating apparatuses 510 disposed at the interior material 530 exposed to the indoor space can be disposed at the interior material 530 to output sound. Further, the interior material 530 can output sound based on vibrations of the one or more sound generating apparatuses (or vibration apparatuses).

According to an embodiment of the present disclosure, the interior material 530 can further include a rear view mirror 530H, an overhead console 530I, a rear package interior material 530J, a glove box, and a sun visor, or the like. However, embodiments of the present disclosure are not limited thereto.

The one or more sound generating apparatuses 510 according to an embodiment of the present disclosure can disposed at at least one of the rear view mirror 530H, the overhead console 530I, the rear package interior material 530J, the glove box, and the sun visor. For example, the one or more sound generating apparatuses 510 can output sounds of one or more channels.

The one or more sound generating apparatuses 510 can be disposed at the rear view mirror 530H and can be configured to indirectly or directly vibrate the rear view mirror 530H to output a sound. The one or more sound generating apparatuses 510 can be disposed between a mirror housing and the rear view mirror 530H supported by the mirror housing. For example, the one or more sound generating apparatuses 510 can include the acoustic apparatus 100 described above with reference to FIGS. 1 to 28, and thus, repeated descriptions thereof can be omitted. For example, the one or more sound generating apparatuses 510 can be configured to output a sound in a range of 150 Hz to 20 kHz. Additionally, the one or more sound generating apparatuses 510 can be referred to as a mirror speaker or an eighth speaker, or the like, but embodiments of the present disclosure are not limited thereto.

According to an embodiment of the present disclosure, the one or more sound generating apparatuses 510 can be disposed at the overhead console 530I and can be configured to indirectly or directly vibrate a console cover of the overhead console 530I to output a sound. According to an embodiment of the present disclosure, the overhead console 530I can include a console box buried in the roof panel, a lighting mechanism disposed at the console box, and a console cover covering the lighting mechanism and the console box.

The one or more sound generating apparatuses 510 can be disposed between the console box and the console cover of the overhead console 530I and can vibrate the console cover. Specifically, the one or more sound generating apparatuses 510 can be disposed between the console box and the console cover of the overhead console 530I and can directly vibrate the console cover. In addition, the one or more sound generating apparatuses 510 can include the acoustic apparatus 100 described above with reference to FIGS. 1 to 28, and thus, repeated descriptions thereof can be omitted. Further, the one or more sound generating apparatuses 510 can be configured to output a sound in a range of 150 Hz to 20 kHz. In addition, the one or more sound generating apparatuses 510 can be referred to as a console speaker, a lighting speaker, or a ninth speaker, or the like, but embodiments of the present disclosure are not limited thereto.

The vehicular apparatus according to an embodiment of the present disclosure can further include a center lighting box which is disposed at a center region of the roof interior material 530C, a center lighting mechanism which is disposed at the center lighting box, and a center lighting cover which covers the center lighting mechanism. In this case, the one or more sound generating apparatuses 510 can further vibrate the center lighting cover which is further provided between the center lighting cover and the center lighting box of the center lighting mechanism.

With reference to FIG. 29, the one or more sound generating apparatuses 510 can be disposed at the rear package interior material 530J and can be configured to indirectly or directly vibrate the rear package interior material 530J to output a sound. The rear package interior material 530J can be disposed behind the first to third passenger seats RPS1, RPS2, and RPS3. For example, a portion of the rear package interior material 530J can be disposed under a rear window 540C.

The one or more sound generating apparatuses 510 can be disposed at a rear surface of the rear package interior material 530J and can vibrate the rear package interior material 530J. Further, the one or more sound generating apparatuses 510 can include the acoustic apparatus 100 described above with reference to FIGS. 1 to 28, and thus, repeated descriptions thereof can be omitted. In addition, the one or more sound generating apparatuses 510 can be referred to as a rear speaker or a tenth speaker, or the like, but embodiments of the present disclosure are not limited thereto.

According to an embodiment of the present disclosure, the rear package interior material 530J can include a first region corresponding to the first rear passenger seat RPS1, a second region corresponding to the second rear passenger seat RPS2, and a third region corresponding to the third rear passenger seat RPS3. According to an embodiment of the present disclosure, the one or more sound generating apparatuses 510 can be disposed to vibrate at least one or more of the first to third regions of the rear package interior material 530J. For example, the one or more sound generating apparatuses 510 can be disposed at each of the first and second regions of the rear package interior material 530J, or can be disposed at each of the first to third regions. In addition, the one or more sound generating apparatuses 510 can be disposed at at least one or more of the first and second regions of the rear package interior material 530J, or can be disposed at at least one or more of the first to third regions. Further, the one or more sound generating apparatuses 510 can be configured to output a sound in a range of 150 Hz to 20 KHz. Additionally, the one or more sound generating apparatuses 510 configured to vibrate each of the first to third regions of the rear package interior material 530J can have a same sound output characteristic or different sound output characteristics. For example, the one or more sound generating apparatuses 510 configured to vibrate at least one or more of the first to third regions of the rear package interior material 530J can have a same sound output characteristic or different sound output characteristics.

According to an embodiment of the present disclosure, the one or more sound generating apparatuses 510 can be disposed at the glove box and can be configured to indirectly or directly vibrate the glove box to output a sound. The glove box can be disposed at the dashboard 530A corresponding to a forward region with respect to the front passenger seat FPS. The one or more sound generating apparatuses 510 can be either disposed directly on the glove box at the dashboard 530A, or inside of the glove box at the dashboard 530A, The one or more sound generating apparatuses 510 can be disposed at an inner surface of the glove box and can vibrate the glove box. Further, the one or more sound generating apparatuses 510 can include the acoustic apparatus 100 described above with reference to FIGS. 1 to 28, and thus, repeated descriptions thereof can be omitted. For example, the one or more sound generating apparatuses 510 can be configured to output a sound in a range of 150 Hz to 20 kHz, or can be one or more of a woofer, a mid-woofer, and a sub-woofer. Additionally, the one or more sound generating apparatuses 510 can be referred to as a glove box speaker or an eleventh speaker, or the like, but embodiments of the present disclosure are not limited thereto.

According to an embodiment of the present disclosure, the one or more sound generating apparatuses 510 can be disposed at the sun visor and can be configured to indirectly or directly vibrate the sun visor to output a sound. The sun visor can include a first sun visor corresponding to the driver seat DS and a second sun visor corresponding to the front passenger seat FPS.

The one or more sound generating apparatuses 510 can be disposed at at least one or more of the first sun visor and the second sun visor and can indirectly or directly vibrate at least one or more of the first sun visor and the second sun visor. For example, the one or more sound generating apparatuses 510 can include the acoustic apparatus 100 described above with reference to FIGS. 1 to 28, and thus, repeated descriptions thereof can be omitted. Further, the one or more sound generating apparatuses 510 can be configured to output a sound in a range of 150 Hz to 20 kHz. Additionally, the one or more sound generating apparatuses 510 can be referred to as a sun visor speaker or a twelfth speaker, or the like, but embodiments of the present disclosure are not limited thereto.

According to an embodiment of the present disclosure, one or more of the first sun visor and the second sun visor can further include a sun visor mirror. In this case, the one or more sound generating apparatuses 510 can be configured to indirectly or directly vibrate the sun visor mirror of at least one or more of the first sun visor and the second sun visor. The one or more sound generating apparatuses 510 vibrating the sun visor mirror can include the acoustic apparatus 100 described above with reference to FIGS. 1 to 28, and thus, repeated descriptions thereof can be omitted.

With reference to FIG. 29, the vehicular apparatus according to an embodiment of the present disclosure can further include one or more sound generating apparatuses 510 disposed at a glass window 540. For example, the one or more sound generating apparatuses 510 can be disposed at the glass window 540 to output sound. Additionally, the glass window 540 can output sound based on vibrations of the one or more sound generating apparatuses (or vibration apparatuses). For example, the one or more sound generating apparatuses 510 can be a window speaker, a transparent sound generating device, a transparent speaker, or an opaque speaker, or the like, but embodiments of the present disclosure are not limited thereto.

The one or more sound generating apparatuses 510 according to an embodiment of the present disclosure can be configured to output sound by indirectly or directly vibrating the glass window 540. For example, the one or more sound generating apparatuses 510 can include one or more of the acoustic apparatuses 100 described with reference to FIGS. 1 to 28, and can be configured to be transparent, translucent, or opaque.

According to an embodiment of the present disclosure, the window 540 can include a front window 540A, a side window 540B, and a rear window 540C. According to an embodiment of the present disclosure, the window 540 can further include a roof window 540D. For example, when the vehicular apparatus includes the roof window 540D, a portion of a region of each of the roof frame and the roof interior material 530C can be replaced with the roof window 540D. Additionally, when the vehicular apparatus includes the roof window 540D, the one or more sound generating apparatuses 510 can be configured to indirectly or directly vibrate a periphery portion (or an edge portion) of the roof interior material 530C surrounding the roof window 540D to output a sound. However, embodiments of the present disclosure are not limited thereto. The one or more sound generating apparatuses 510 can be disposed at any window 540.

According to an embodiment of the present disclosure, the one or more sound generating apparatuses 510 can be disposed at the front window 540A and can be configured to output a sound based on a vibration thereof or to indirectly or directly vibrate the front window 540A to output a sound.

According to an embodiment of the present disclosure, the front window 540A can include a first region corresponding to the driver seat DS, a second region corresponding to the front passenger seat FPS, and a third region (or a middle region) between the first region and the second region. Further, the one or more sound generating apparatuses 510 can be disposed at at least one or more of the first to third regions. For example, the one or more sound generating apparatuses 510 can be disposed at each of the first and second regions of the front window 540A, or can be disposed at each of the first to third regions. For example, the one or more sound generating apparatuses 510 can be disposed at at least one or more of the first and second regions of the front window 540A, or can be disposed at at least one or more of the first to third regions. For example, the one or more sound generating apparatuses 510 disposed at each of the first to third regions of the front window 540A can have a same sound output characteristic or different sound output characteristics. For example, the one or more sound generating apparatuses 510 disposed at at least one or more of the first to third regions of the front window 540A can have a same sound output characteristic or different sound output characteristics. For example, the one or more sound generating apparatuses 510 can be configured to output a sound in a range of 150 Hz to 20 kHz. Further, the one or more sound generating apparatuses 510 can be referred to as a front window speaker or a thirteenth speaker, or the like, but embodiments of the present disclosure are not limited thereto.

With reference to FIG. 30, the one or more sound generating apparatuses 510 according to an embodiment of the present disclosure can be disposed at the side window 540B and can be configured to output a sound based on a vibration thereof or to indirectly or directly vibrate the side window 540B to output a sound.

According to an embodiment of the present disclosure, the side window 540B can include a first side window (or a left front window), a second side window (or a right front window) 540B2, a third side window (or a left rear window), and a fourth side window (or a right rear window) 540B4.

According to an embodiment of the present disclosure, the one or more sound generating apparatuses 510 can be disposed at at least one or more of the first to fourth side windows 540B1 to 540B4. For example, at least one or more of the first to fourth side windows 540B1 to 540B4 can include one or more sound generating apparatuses 510.

According to an embodiment of the present disclosure, the one or more sound generating apparatuses 510 can be disposed at one or more of the first to fourth side windows 540B1 to 540B4 and can be configured to output a sound based on a vibration thereof or to indirectly or directly vibrate the first to fourth side windows 540B1 to 540B4 to output a sound. For example, the one or more sound generating apparatuses 510 can be configured to output a sound in a range of 150 Hz to 20 kHz. In addition, the one or more sound generating apparatuses 510 disposed at at least one or more of the first to fourth side windows 540B1 to 540B4 can have a same sound output characteristic or different sound output characteristics. Further, the one or more sound generating apparatuses 510 can be configured to output a sound in a range of 150 Hz to 20 kHz. Additionally, the one or more sound generating apparatuses 510 can be referred to as a side window speaker or a fourteenth speaker, or the like, but embodiments of the present disclosure are not limited thereto.

With reference to FIG. 29, the one or more sound generating apparatuses 510 can be disposed at the rear window 540C and can be configured to output a sound based on a vibration thereof or to indirectly or directly vibrate the rear window 540C to output a sound.

According to an embodiment of the present disclosure, the rear window 540C can include a first region corresponding to a rearward direction of the first rear passenger seat RPS1, a second region corresponding to a rearward direction of the second rear passenger seat RPS2, and a third region corresponding to a rearward direction of the third rear passenger seat RPS3.

According to an embodiment of the present disclosure, the one or more sound generating apparatuses 510 can be disposed at each of the first to third regions of the rear window 540C. For example, the one or more sound generating apparatuses 510 can be disposed at at least one or more of the first to third regions of the rear window 540C. In addition, the one or more sound generating apparatuses 510 can be disposed at each of the first and second regions of the rear window 540C, or can be disposed at each of the first to third regions of the rear window 540C.

According to an embodiment of the present disclosure, the one or more sound generating apparatuses 510 can be disposed at at least one or more of the first and second regions of the rear window 540C, or can be disposed at at least one or more of the first to third regions of the rear window 540C. Additionally, the one or more sound generating apparatuses 510 can be configured to output a sound in a range of 150 Hz to 20 kHz. For example, the one or more sound generating apparatuses 510 disposed at each of the first to third regions of the rear window 540C can have a same sound output characteristic or different sound output characteristics. Further, the one or more sound generating apparatuses 510 disposed at at least one or more of the first to third regions of the rear window 540C can have a same sound output characteristic or different sound output characteristics. For example, the one or more sound generating apparatuses 510 disposed at at least one or more of the first and second regions of the rear window 540C can be configured to output a sound in a range of 150 Hz to 20 kHz, or can be one or more of a woofer, a mid-woofer, and a sub-woofer. For example, the one or more sound generating apparatuses 510 can be referred to as a rear window speaker or a fifteenth speaker, or the like, but embodiments of the present disclosure are not limited thereto.

According to another embodiment of the present disclosure, the one or more sound generating apparatuses 510 can be disposed at the roof window 540D and can be configured to output a sound based on a vibration thereof or to indirectly or directly vibrate the roof window 540D to output a sound.

The roof window according to an embodiment of the present disclosure can be disposed over front seats DS and FPS. For example, the one or more sound generating apparatuses 510 can be disposed at a center region of the roof window. Further, the one or more sound generating apparatuses 510 can be configured to output a sound in a range of 150 Hz to 20 KHz. Additionally, the one or more sound generating apparatuses 510 can be referred to as a roof window speaker or a sixteenth speaker, or the like, but embodiments of the present disclosure are not limited thereto.

According to another embodiment of the present disclosure, the roof window can be disposed over the front seats DS and FPS, or can be disposed over the rear seats RPS1, RPS2, and RPS3. For example, the roof window can include a first region corresponding to the front seats DS and FPS and a second region corresponding to the rear seats RPS1, RPS2, and RPS3. In addition, the roof window can include a third region between the first region and the second region. For example, the one or more sound generating apparatuses 510 can be disposed at at least one or more of the first and second regions of the roof window, or can be disposed at at least one or more of the first to third regions of the roof window. Further, the one or more sound generating apparatuses 510 can be configured to output a sound in a range of 150 Hz to 20 kHz. For example, the one or more sound generating apparatuses 510 disposed at at least one or more of the first to third regions of the roof window can have a same sound output characteristic or different sound output characteristics.

With reference to FIGS. 29 and 30, the vehicular apparatus according to an embodiment of the present disclosure can further include a woofer speaker WS which is disposed at at least one or more of the dashboard 530A, the door frame, and the rear package interior material 530J. However, in another embodiment, the woofer speaker WS can be disposed elsewhere.

The woofer speaker WS according to an embodiment of the present disclosure can be one or more of a woofer, a mid-woofer, and a sub-woofer. For example, the woofer speaker WS can be referred to as the term such as a speaker which outputs a sound of 60 Hz to 150 Hz, but embodiments of the present disclosure are not limited thereto.

Accordingly, the woofer speaker WS can output a sound in a range of 60 Hz to 150 Hz, thereby enhancing a low-pitched sound band characteristic of a sound which is output to an indoor space.

According to an embodiment of the present disclosure, the woofer speaker WS can be disposed at at least one or more of the first and second regions of the dashboard 530A. According to an embodiment of the present disclosure, the woofer speaker WS can be disposed at each of the first to fourth door frames of the door interior material 530D and can be exposed at a lower region of each of the first to fourth door interior materials 530D1 to 530D4 of the door interior material 530D. Further, the woofer speaker WS can be disposed at at least one or more of the first to fourth door frames of the door interior material 530D and can be exposed at the lower region of at least one or more of the first to fourth door interior materials 530D1 to 530D4 of the door interior material 530D. According to an embodiment of the present disclosure, the woofer speaker WS can be disposed at at least one or more of the first and second regions of the rear package interior material 530J. Furthermore, the one or more sound generating apparatuses 510 disposed at the lower region of each of the first to fourth door interior materials 530D1 to 530D4 can be replaced with the woofer speaker WS. For example, the one or more sound generating apparatuses 510 disposed at the lower region of at least one or more of the first to fourth door interior materials 530D1 to 530D4 can be replaced with the woofer speaker WS.

The vehicular apparatus according to an embodiment of the present disclosure can further include a garnish member which covers a portion of the interior material 530 exposed at the indoor space, and one or more sound generating apparatuses 510 disposed at the interior material 530. For example, the one or more sound generating apparatuses 510 can be disposed at a garnish member and the interior material 530 to output a sound. For example, at least one or more of the garnish member and the interior material 530 can output a sound based on vibrations of one or more vibration generating apparatuses (or vibration apparatuses).

The garnish member can be configured to cover a portion of the door interior material 530D exposed at an indoor space, but embodiments of the present disclosure are not limited thereto. For example, the garnish member can be configured to cover a portion of one or more of the dashboard 530A, the pillar interior material 530B, and the roof interior material 530C, which are exposed at the indoor space.

The garnish member according to an embodiment of the present disclosure can include a metal material or a nonmetal material (or a composite nonmetal material) having a material characteristic suitable for generating a sound based on a vibration. For example, a metal material of the garnish member can include any one or more materials of stainless steel, aluminum (Al), an Al alloy, a magnesium (Mg), a Mg alloy, and a magnesium-lithium (Mg—Li) alloy, but embodiments of the present disclosure are not limited thereto. The nonmetal material (or the composite nonmetal material) of the garnish member can include one or more of wood, plastic, glass, metal, cloth, fiber, rubber, paper, carbon, and leather, but embodiments of the present disclosure are not limited thereto. Further, the garnish member can include a metal material having a material characteristic suitable for generating a sound of a high-pitched sound band, but embodiments of the present disclosure are not limited thereto. For example, the high-pitched sound band can have a frequency in a range of 1 kHz or more or 3 kHz or more, but embodiments of the present disclosure are not limited thereto.

The one or more sound generating apparatuses 510 can be disposed between the garnish member and the interior material 530. For example, the one or more sound generating apparatuses 510 can be referred to as the term such as a garnish speaker or a seventeenth speaker, or the like, but embodiments of the present disclosure are not limited thereto.

The one or more sound generating apparatuses 510 according to an embodiment of the present disclosure can include one or more of the acoustic apparatuses 100 described above with reference to FIGS. 1 to 28. The one or more sound generating apparatuses 510 can be disposed at a main interior material or the interior material 530 and a garnish member and can be connected or coupled to the garnish member.

The one or more sound generating apparatuses 510 according to an embodiment of the present disclosure can be configured to indirectly or directly vibrate the garnish member to output a sound into the indoor space of the vehicular apparatus. Additionally, the one or more sound generating apparatuses 510 can be configured to output a sound of a high-pitched sound band, but embodiments of the present disclosure are not limited thereto.

With reference to FIGS. 29 and 30, the vehicular apparatus according to an embodiment of the present disclosure can further include one or more sound generating apparatuses 510 disposed at an inner surface of the exterior material 520. For example, the one or more sound generating apparatuses 510 can be disposed at the exterior material 520 to output a sound. For example, the exterior material 520 can output a sound based on vibrations of one or more vibration generating apparatuses (or vibration apparatuses).

The exterior material 520 according to an embodiment of the present disclosure can include at least one or more among a hood panel 520A, a front fender panel 520B, a door frame, a roof panel, a pillar panel, a trunk panel 520C, a front bumper, a rear bumper, a spoiler, a headlight, a taillight, a fog light, or a vehicle body floor (or bottom) 501. The one or more sound generating apparatuses can vibrate at least one of the hood panel 520A, the front fender panel 520B, the door frame, the roof panel, the pillar panel, the trunk panel 520C, the front bumper, the rear bumper, the spoiler, the headlight, the taillight, the fog light, or the vehicle body floor 501 from the outside or the inside.

The one or more sound generating apparatuses 510 can be disposed at one or more of the hood panel 520A, the front fender panel 520B, and the trunk panel 520C. Therefore, sounds of one or more channels can be output.

The one or more sound generating apparatuses 510 according to an embodiment of the present disclosure can be connected or coupled to the inner side of the hood panel 520A, and can be configured to indirectly or directly vibrate the hood panel 520A to output sound to an external space of the vehicular apparatus. For example, the one or more sound generating apparatuses 510 can be configured to be connected or coupled to one or more of a central portion and a periphery portion of the inner side of the hood panel 520A.

The one or more sound generating apparatuses 510 according to an embodiment of the present disclosure can include one or more of the acoustic apparatuses 100 described above with reference to FIGS. 1 to 28. Further, the one or more sound generating apparatuses 510 can be connected or coupled to an inner surface of the hood panel 520A. Additionally, the one or more sound generating apparatuses 510 can be configured to output a sound in a range of 150 Hz to 20 kHz. In addition, the one or more sound generating apparatuses 510 can be referred to as a hood panel speaker or an eighteenth speaker, or the like, but embodiments of the present disclosure are not limited thereto.

The one or more sound generating apparatuses 510 according to an embodiment of the present disclosure can be connected or coupled to an inner surface of the front fender panel 520B and can be configured to indirectly or directly vibrate the front fender panel 520B to output a sound to the outdoor space of the vehicular apparatus. For example, the one or more sound generating apparatuses 510 can be disposed to have a certain interval at the inner surface of the front fender panel 520B.

The one or more sound generating apparatuses 510 according to an embodiment of the present disclosure can include one or more of the acoustic apparatuses 100 described above with reference to FIGS. 1 to 28. The one or more sound generating apparatuses 510 can be connected or coupled to the inner surface of the front fender panel 520B. Furthermore, the one or more sound generating apparatuses 510 can be configured to output a sound in a range of about 150 Hz to about 20 kHz. Additionally, the one or more sound generating apparatuses 510 can be referred to as the term such as a fender panel speaker or a nineteenth speaker, or the like, but embodiments of the present disclosure are not limited thereto.

The one or more sound generating apparatuses 510 according to an embodiment of the present disclosure can be connected or coupled to an inner surface of the trunk panel 520C and can be configured to indirectly or directly vibrate the trunk panel 520C to output a sound to the outdoor space of the vehicular apparatus. For example, the one or more sound generating apparatuses 510 can be configured to be connected or coupled to one or more of a center portion and a periphery portion of the trunk panel 520C.

The one or more sound generating apparatuses 510 according to an embodiment of the present disclosure can include one or more of the acoustic apparatuses 100 disclosure described above with reference to FIGS. 1 to 28. The one or more sound generating apparatuses 510 can be connected or coupled to the inner surface of the trunk panel 520C. Further, the one or more sound generating apparatuses 510 can be configured to output a sound in a range of about 150 Hz to about 20 kHz. Additionally, the one or more sound generating apparatuses 510 can be referred to as the term such as a trunk panel speaker or a twentieth speaker, or the like, but embodiments of the present disclosure are not limited thereto.

According to another embodiment of the present disclosure, the one or more sound generating apparatuses 510 can be disposed at one or more of a door inner panel or a door outer panel.

The vehicular apparatus according to an embodiment of the present disclosure can output a sound to one or more of the indoor space and the outdoor space (or an external space) through at least one or more among the one or more sound generating apparatuses 510 disposed at the interior material 530, the one or more sound generating apparatuses 510 disposed at the interior material 530 exposed at the indoor space, the one or more sound generating apparatuses 510 disposed at the glass window, the one or more sound generating apparatuses 510 disposed at the garnish member, and the one or more sound generating apparatuses 510 disposed at the exterior material 520, and thus, can output the sound by one or more of the exterior material 520 and the interior material 530 as a sound vibration plate, thereby outputting a multichannel surround stereo sound.

With reference to FIG. 30, the vehicular apparatus or the exterior material 520 according to an embodiment of the present disclosure can further include a battery module 550 and a vehicle body floor 501.

The battery module 550 can be disposed at a vehicle body bottom frame. For example, the battery module 550 can be disposed at the exterior material 520. In addition, the battery module 550 can be disposed between the vehicle body bottom frame and the exterior material 520.

The vehicle body floor 501 can be configured to cover the battery module 550. For example, the battery module 550 can be disposed between the vehicle body bottom frame and the vehicle body floor 501. For example, the vehicle body floor 501 can be a vehicle body panel or a vehicle body frame, and embodiments of the present disclosure are not limited thereto.

The one or more sound generating apparatuses 510 can be disposed between the battery module 550 and the vehicle body floor 501 and can be configured to output a sound or a virtual engine sound, but the present disclosure is not limited thereto.

Recently, an eco-friendly vehicular apparatus having no noise, such as an electric vehicle, has a problem that a pedestrian cannot recognize when the vehicular apparatus moves. Therefore, the vehicular apparatus 500 according to an embodiment of the present disclosure can further include one or more virtual engine sound apparatuses 511.

The one or more virtual engine sound apparatuses 511 can be a device for transferring a location and/or driving information of the vehicular apparatus to a pedestrian. Accordingly, the pedestrian may be alerted that the vehicular apparatus is driving and/or located near the pedestrian. For example, the one or more virtual engine sound apparatuses 511 can be a virtual engine sound system or a vehicle access information device, but embodiments of the present disclosure are not limited thereto.

With reference to FIGS. 29 and 30, the one or more virtual engine sound apparatuses 511 can be disposed at a center of the vehicular apparatus, but embodiments of the present disclosure are not limited thereto. For another example, the one or more virtual engine sound apparatuses 511 can be disposed at one or more of the front, back, left, or right of the vehicular apparatus. Additionally, the one or more virtual engine sound apparatuses 511 can include the acoustic apparatus 100 described above with reference to FIGS. 1 to 28, and thus, a repeated description thereof can be omitted. Further, the one or more virtual engine sound apparatuses 511 can be configured to output a virtual engine sound or a sound in a range of 150 Hz to 20 KHz.

The one or more virtual engine sound apparatuses 511 according to an embodiment of the present disclosure can be disposed (or mounted) between the battery module 550 and the vehicle body floor (or a vehicle body bottom or a vehicle body bottom frame) 501. For example, the one or more virtual engine sound apparatuses 511 can be configured to be covered by the vehicle body floor 501. For example, a portion of the vehicle body floor 501 overlapping the one or more virtual engine sound apparatuses 511 can include one or more holes for outputting a sound (or a virtual engine sound), output from the one or more virtual engine sound apparatuses 511, in an earth-surface direction.

The one or more virtual engine sound apparatuses 511 according to another embodiment of the present disclosure can be disposed at the vehicle body floor 501, or can be accommodated (or received) into the vehicle body floor (or the vehicle body bottom or the vehicle body bottom frame) 501. The vehicle body floor (or the vehicle body bottom or the vehicle body bottom frame) 501 can include an accommodating part 501a for accommodating (or receiving) the one or more virtual engine sound apparatuses 511. For example, the accommodating part 501a of the vehicle body floor 501 can protrude toward the battery module 550 from the vehicle body floor 501 to include an accommodating space.

The one or more virtual engine sound apparatuses 511 can be accommodated (or received) into the accommodating part 501a of the vehicle body floor 501 by a plurality of fastening members and can be fixed (or mounted) to the vehicle body floor 501. For example, the plurality of fastening members can pass through a through hole 155h of each of the plurality of coupling parts 155 configured at the supporting member 150 or the acoustic apparatus 100 configuring the one or more virtual engine sound apparatuses 511 and can be fastened to the vehicle body floor 501, and thus, can couple each of the plurality of coupling parts 155 to the vehicle body floor 501. Accordingly, the one or more virtual engine sound apparatuses 511 can be fixed (or mounted) to the vehicle body floor 501 and can output a sound (or a virtual engine sound) in the earth-surface direction.

The one or more virtual engine sound apparatuses 511 can be disposed (or configured) at a center of the vehicular apparatus 500. For example, the one or more virtual engine sound apparatuses 511 can be disposed (or configured) at a center of the vehicle body floor (or the vehicle body bottom frame) 501.

However, in another embodiment, the one or more virtual engine sound apparatuses 511 can be disposed at a different location of the vehicular apparatus 100. For example, the one or more virtual engine sound apparatuses 511 can be disposed (or configured) at an edge portion of the vehicle body floor (or the vehicle body bottom frame) 501.

Figure 31:
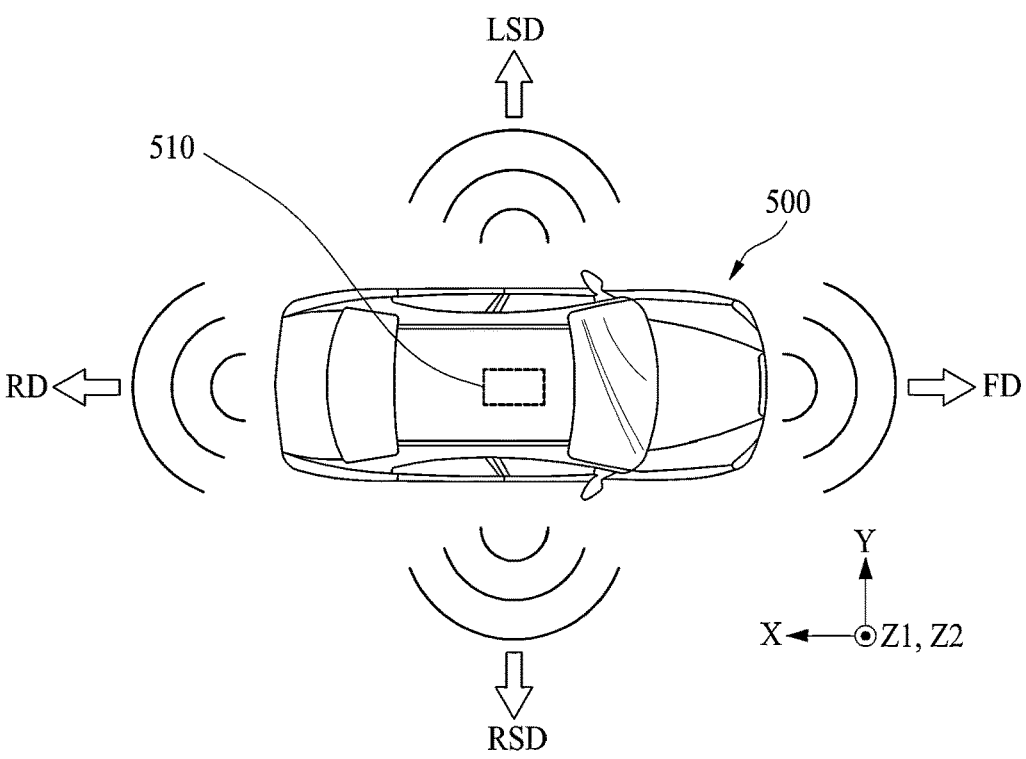
FIG. 31 is an overview illustrating an output direction of the virtual engine sound output from a virtual engine sound apparatus according to an embodiment of the present disclosure.

The one or more virtual engine sound apparatuses 511 can include the vibration apparatus 130 configured with a piezoelectric device, and thus, can be lightweight and can have a thin thickness and can output a sound (or a virtual engine sound) having a wide directivity angle or a non-directivity angle, based on a non-directivity characteristic of the vibration apparatus 130 configured with the piezoelectric device. Further, the one or more virtual engine sound apparatuses 511 can have sound having a wide directivity angle compared to a sound generated based on a vibration of an actuator including a magnet and a coil. For example, as illustrated in FIG. 31, in a case where the one or more virtual engine sound apparatuses 511 are disposed (or configured) at a center of the vehicular apparatus 100 to output a virtual engine sound, the one or more virtual engine sound apparatuses 511 can output a uniform virtual engine sound in each of a forward direction FD, a rearward direction RD, a left direction LSD, and a right direction RSD with respect to the center of the vehicular apparatus 100. The acoustic apparatus according to an embodiment of the present disclosure can output a sound or a virtual engine sound having a sound pressure level of 60 dB or more in a pitched sound band of 300 Hz or more.

Figure 32:
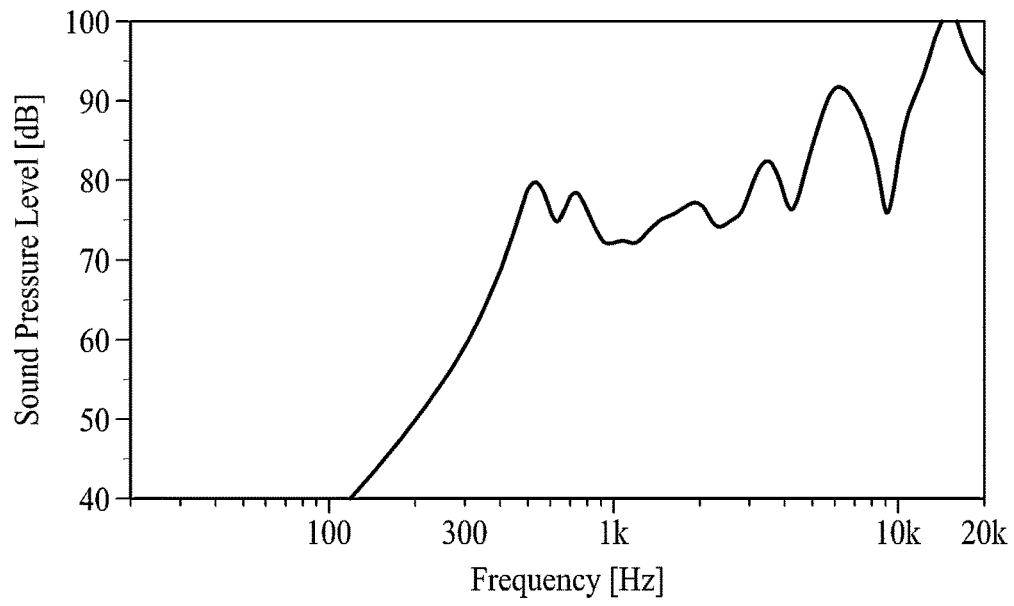
FIG. 32 is a graph illustrating a sound output characteristic of an acoustic apparatus according to an embodiment of the present disclosure.

FIG. 32 illustrates a sound output characteristic of an acoustic apparatus according to an embodiment of the present disclosure. FIG. 32 illustrates a sound output characteristic of an acoustic apparatus according to an embodiment of the present disclosure described above with reference to FIGS. 1 to 3. In FIG. 32, the abscissa axis represents a frequency in hertz (Hz), and the ordinate axis represents a sound pressure level (SPL) in decibels (dB).

A sound output characteristic can be measured by a sound measurement apparatus. The sound analysis apparatus can be configured to include a sound card that can transmit or receive sound to or from a control personal computer (PC), an amplifier that can amplify a signal generated from the sound card and transfer the amplified signal to a vibration apparatus, and a microphone that can collect sound generated by a vibration member based on driving of an acoustic apparatus. For example, the microphone is disposed at a center of an acoustic apparatus, and a separation distance between the vibration member and the microphone can be 50 cm. A sound can be measured in state where the microphone is vertical to an acoustic apparatus. The sound collected through the microphone can be input to the control PC through the sound card, and a control program can check the input sound to analyze the sound output characteristic of the acoustic apparatus. For example, frequency response characteristic of a frequency range of 100 Hz to 20 kHz can be measured by a pulse program.

With reference to FIG. 32, it has been measured that an average sound pressure level of a sound is 77 dB, and it has been measured that a sound pressure level in a sound band in a range of 300 Hz or more is 60 dB or more. For example, it has been measured that a sound pressure level in a sound band in a range of 300 Hz or more is 70 dB or more.

As seen in FIG. 32, the acoustic apparatus according to an embodiment of the present disclosure can enhance a sound characteristic and/or a sound pressure level characteristic of a low-pitched sound band, and can output a sound or a virtual engine sound with a sound pressure level of 60 dB or more in a sound band in a range of 300 Hz or more.

An acoustic apparatus and a vehicular apparatus comprising the same according to one or more embodiments of the present disclosure will be described below.

An acoustic apparatus according to one or more embodiments of the present disclosure can include a vibration member, a supporting member at a first surface of the vibration member, a vibration apparatus configured to vibrate the vibration member, and a driving circuit part electrically connected to the first vibration apparatus and configured to drive the first vibration apparatus. The driving circuit part can be disposed at an internal space between the vibration member and the supporting member.

According to one or more embodiments of the present disclosure, the vibration apparatus can be disposed at the internal space and can be connected to the first surface of the vibration member.

According to one or more embodiments of the present disclosure, the driving circuit part can include a printed circuit board disposed between the vibration apparatus and the supporting member. The printed circuit board can be spaced apart from the vibration apparatus.

According to one or more embodiments of the present disclosure, the acoustic apparatus can further include a fixing member configured between the supporting member and the printed circuit board.

According to one or more embodiments of the present disclosure, the fixing member can include one or more adhesive members, the one or more adhesive members including a material having an adhesive force and being elastic.

According to one or more embodiments of the present disclosure, the supporting member can include one or more holes that are disposed at the printed circuit board.

According to one or more embodiments of the present disclosure, the supporting member can include one or more holes configured to connect the internal space to an external space of the acoustic apparatus.

According to one or more embodiments of the present disclosure, the acoustic apparatus can further include a water blocking member configured to cover the one or more holes.

According to one or more embodiments of the present disclosure, the acoustic apparatus can further include a coupling member between the vibration member and the supporting member.

According to one or more embodiments of the present disclosure, the coupling member can include a waterproof structure or a waterproof member.

According to one or more embodiments of the present disclosure, the acoustic apparatus can further include a plurality of coupling parts protruding from each of corner portions of the supporting member. Each of the plurality of coupling parts can include a through hole configured to receive a portion of a fastener.

According to one or more embodiments of the present disclosure, the acoustic apparatus can further include a pad member disposed at each of the plurality of coupling parts. Each pad member can include a hollow portion overlapping the through hole of a respective coupling part.

According to one or more embodiments of the present disclosure, the pad member can include a ductile material.

According to one or more embodiments of the present disclosure, the pad member can be disposed as one body with each of the plurality of coupling parts.

According to one or more embodiments of the present disclosure, the supporting member can include a first supporting part disposed in parallel with the vibration member, and a second supporting part connected to the first supporting part and connected to the first surface of the vibration member and configured to surround the vibration apparatus.

According to one or more embodiments of the present disclosure, the driving circuit part can include a printed circuit board disposed between the vibration apparatus and the supporting member, and a connection connector electrically connected to the printed circuit board. A portion of the connection connector can be disposed through a surface of the supporting member and an other portion of the connection connector can be accommodated in the internal space.

According to one or more embodiments of the present disclosure, the supporting member can include a first supporting part disposed in parallel with the vibration member, a second supporting part connected to the first supporting part and connected to the first surface of the vibration member and configured to surround the vibration apparatus, and an inclined part between the first supporting part and the second supporting part. A portion of the connection connector can be disposed through the inclined part and can be accommodated in the internal space.

According to one or more embodiments of the present disclosure, the supporting member can include one or more holes disposed at one or more of the first supporting part and the inclined part.

According to one or more embodiments of the present disclosure, the acoustic apparatus can further include a water blocking member configured to cover the one or more holes.

According to one or more embodiments of the present disclosure, the supporting member can include one or more holes disposed at the printed circuit board.

According to one or more embodiments of the present disclosure, the driving circuit part and the vibration apparatus can be disposed in parallel at the internal space.

According to one or more embodiments of the present disclosure, the driving circuit part can include a printed circuit board disposed between the vibration apparatus and the supporting member. The printed circuit board can be spaced apart from the vibration apparatus.

According to one or more embodiments of the present disclosure, the acoustic apparatus can further include a fixing member configured between the supporting member and the printed circuit board, or configured between the vibration member and the printed circuit board.

According to one or more embodiments of the present disclosure, the vibration apparatus can include a vibration part including a piezoelectric material, and a cover member covering at least one or more of the first surface of the vibration part and a second surface of the vibration part opposite to the first surface of the vibration part.

According to one or more embodiments of the present disclosure, the vibration apparatus can further include a signal supply member electrically connected to the vibration part. A portion of the signal supply member can be accommodated between the cover member and the vibration part.

According to one or more embodiments of the present disclosure, the vibration apparatus further can include a first vibration generating part, a second vibration generating part stacked on the first vibration generating part, and an intermediate member between the first vibration generating part and the second vibration generating part. One of the first vibration generating part and the second vibration generating part can be connected to the vibration member.

According to one or more embodiments of the present disclosure, each of the first vibration generating part and the second vibration generating part can include a vibration part including a piezoelectric material, and a cover member covering at least one or more of the first surface of the vibration part and a second surface of the vibration part opposite to the first surface of the vibration part.

According to one or more embodiments of the present disclosure, the acoustic apparatus can further include one or more mass members disposed at a second surface of the vibration member opposite to the first surface of the vibration member.

According to one or more embodiments of the present disclosure, the acoustic apparatus can further include a second vibration apparatus disposed at a second surface of the vibration member opposite to the first surface of the vibration member. The second vibration apparatus can include a vibration part.

According to one or more embodiments of the present disclosure, the second vibration apparatus can overlap the vibration apparatus and can be configured to be displaced in a same direction as the vibration apparatus.

According to one or more embodiments of the present disclosure, the vibration member can include one or more materials including metal, plastic, fiber reinforced plastic, carbon, and wood.

A vehicular apparatus according to one or more embodiments of the present disclosure can include an exterior material, an interior material covering the exterior material, and one or more sound generating apparatuses configured at one or more of the exterior material, the interior material, and between the exterior material and the interior material and configured to output a sound, the one or more sound generating apparatuses can include an acoustic apparatus. The acoustic apparatus according to one or more embodiments of the present disclosure can include a vibration member, a supporting member at a first surface of the vibration member, a vibration apparatus configured to vibrate the vibration member, and a driving circuit part electrically connected to the first vibration apparatus and configured to drive the first vibration apparatus. The driving circuit part can be disposed at an internal space between the vibration member and the supporting member.

According to one or more embodiments of the present disclosure, the interior material can include at least one or more of a dash board, a pillar interior material, a roof interior material, a door interior material, a seat interior material, a handle interior material, a floor interior material or a rear package interior material.

According to one or more embodiments of the present disclosure, the exterior material can include at least one or more of a hood panel, a front fender panel, a door frame, a roof panel, a pillar panel, a trunk panel, a front bumper, a rear bumper, a spoiler, a headlight, a taillight, a fog light, or a vehicle body floor.

According to one or more embodiments of the present disclosure, the exterior material can include a battery module disposed at the exterior material, and a vehicle body floor covering the battery module. The one or more sound generating apparatuses can be disposed between the battery module and the vehicle body floor. The one or more sound generating apparatuses can output the sound or a virtual engine sound.

A vehicular apparatus according to one or more embodiments of the present disclosure can include a vehicle body bottom frame, and one or more virtual engine sound apparatuses mounted at the vehicle body bottom frame. The one or more virtual engine sound apparatuses can include an acoustic apparatus. The acoustic apparatus according to one or more embodiments of the present disclosure can include a vibration member, a supporting member at a first surface of the vibration member, a vibration apparatus configured to vibrate the vibration member, and a driving circuit part electrically connected to the first vibration apparatus and configured to drive the first vibration apparatus. The driving circuit part can be disposed at an internal space between the vibration member and the supporting member.

According to one or more embodiments of the present disclosure, the vehicle body bottom frame can include an accommodation part configured to accommodate the one or more virtual engine sound apparatuses.

According to one or more embodiments of the present disclosure, the one or more virtual engine sound apparatuses can be disposed at a center of the vehicle body bottom frame.

An acoustic apparatus according to an embodiment of the present disclosure can be applied to or included in a sound disposed at an apparatus or a display apparatus. The apparatus or the display apparatus according to an embodiment of the present disclosure can be applied to or included in mobile apparatuses, video phones, smart watches, watch phones, wearable apparatuses, foldable apparatuses, rollable apparatuses, bendable apparatuses, flexible apparatuses, curved apparatuses, sliding apparatuses, variable apparatuses, electronic organizers, electronic books, portable multimedia players (PMPs), personal digital assistants (PDAs), MP3 players, mobile medical devices, desktop personal computers (PCs), laptop PCs, netbook computers, workstations, navigation apparatuses, automotive navigation apparatuses, automotive display apparatuses, automotive apparatuses, theatre apparatuses, theatre display apparatuses, TVs, wall paper display apparatuses, signage apparatuses, game machines, notebook computers, monitors, cameras, camcorders, and home appliances, or the like. Further, the acoustic apparatus according to one or more embodiments of the present disclosure can be applied to or included in an organic light-emitting lighting apparatus or an inorganic light-emitting lighting apparatus. When the acoustic apparatus is applied to or included in the lighting apparatuses, the lighting apparatuses can act as lighting and a speaker. In addition, when the acoustic apparatus according to one or more embodiments of the present disclosure is applied to or included in the mobile apparatuses, or the like, the acoustic apparatus can be one or more of a speaker, a receiver, and a haptic device, but embodiments of the present disclosure are not limited thereto.

It will be apparent to those skilled in the art that various modifications and variations can be made in the present disclosure without departing from the scope of the disclosures. Thus, it is intended that the present disclosure covers the modifications and variations of this disclosure that come within the scope of the appended claims and their equivalents.

What is claimed is:

1. An acoustic apparatus, comprising:
a vibration member;
a supporting member disposed at a first surface of the vibration member;
a first vibration apparatus configured to vibrate the vibration member; and
a driving circuit part electrically connected to the first vibration apparatus and configured to drive the first vibration apparatus,
wherein the driving circuit part is disposed at an internal space between the vibration member and the supporting member,
wherein the driving circuit part comprises:
a printed circuit board disposed between the first vibration apparatus and the supporting member; and
a connection connector electrically connected to the printed circuit board,
wherein the supporting member comprises:
a first supporting part disposed in parallel with the vibration member;
a second supporting part connected to the first supporting part and connected to the first surface of the vibration member and configured to surround the first vibration apparatus; and
an inclined part disposed between the first supporting part and the second supporting part, and
wherein a portion of the connection connector is disposed through the inclined part and is accommodated in the internal space.

2. The acoustic apparatus of claim 1, wherein the first vibration apparatus is disposed at the internal space and is connected to the first surface of the vibration member.

3. The acoustic apparatus of claim 2,
wherein the printed circuit board is spaced apart from the first vibration apparatus.

4. The acoustic apparatus of claim 3, further comprising a fixing member configured between the supporting member and the printed circuit board.

5. The acoustic apparatus of claim 4, wherein the fixing member comprises one or more adhesive members, the one or more adhesive members including a material having an adhesive force and being elastic.

6. The acoustic apparatus of claim 3, further comprising one or more holes that are disposed at the printed circuit board.

7. The acoustic apparatus of claim 1, wherein the supporting member comprises one or more holes configured to connect the internal space to an external space of the acoustic apparatus.

8. The acoustic apparatus of claim 7, further comprising a water blocking member configured to cover the one or more holes.

9. The acoustic apparatus of claim 1, further comprising a coupling member disposed between the vibration member and the supporting member.

10. The acoustic apparatus of claim 9, wherein the coupling member comprises a waterproof structure or a waterproof member.

11. The acoustic apparatus of claim 1, further comprising a plurality of coupling parts protruding from each of corner portions of the supporting member,
wherein each of the plurality of coupling parts comprises a through hole configured to receive a portion of a fastener.

12. The acoustic apparatus of claim 11, further comprising a pad member disposed at each of the plurality of coupling parts, each pad member including a hollow portion overlapping the through hole of a respective coupling part.

13. The acoustic apparatus of claim 12, wherein the pad member comprises a ductile material.

14. The acoustic apparatus of claim 12, wherein the pad member is disposed as one body with each of the plurality of coupling parts.

15. The acoustic apparatus of claim 1, wherein the supporting member further comprises one or more holes disposed at one or more of the first supporting part and the inclined part.

16. The acoustic apparatus of claim 15, further comprising a water blocking member configured to cover the one or more holes.

17. The acoustic apparatus of claim 15, further comprising one or more holes that are disposed at the printed circuit board.

18. The acoustic apparatus of claim 1, wherein the driving circuit part and the first vibration apparatus are disposed in parallel at the internal space.

19. The acoustic apparatus of claim 18,
   wherein the printed circuit board is spaced apart from the first vibration apparatus.

20. The acoustic apparatus of claim 19, further comprising a fixing member configured between the supporting member and the printed circuit board, or configured between the vibration member and the printed circuit board.

21. The acoustic apparatus of claim 1, wherein the first vibration apparatus comprises:
   a vibration part including a piezoelectric material; and
   a cover member covering at least one or more of a first surface of the vibration part and a second surface of the vibration part opposite to the first surface of the vibration part.

22. The acoustic apparatus of claim 21,
   wherein the first vibration apparatus further comprise a signal supply member electrically connected to the vibration part, and
   wherein a portion of the signal supply member is accommodated between the cover member and the vibration part.

23. The acoustic apparatus of claim 1,
   wherein the first vibration apparatus comprises:
      a first vibration generating part;
      a second vibration generating part stacked on the first vibration generating part; and
      an intermediate member between the first vibration generating part and the second vibration generating part, and
   wherein one of the first vibration generating part and the second vibration generating part is connected to the vibration member.

24. The acoustic apparatus of claim 23, wherein at least one of the first vibration generating part and the second vibration generating part comprises:
   a vibration part including a piezoelectric material; and
   a cover member covering at least one or more of a first surface of the vibration part and a second surface of the vibration part opposite to the first surface of the vibration part.

25. The acoustic apparatus of claim 1, further comprising one or more mass members disposed at a second surface of the vibration member opposite to the first surface of the vibration member.

26. The acoustic apparatus of claim 1, wherein the vibration member comprises one or more materials including metal, plastic, fiber reinforced plastic, carbon, and wood.

27. A vehicular apparatus, comprising:
   an exterior material;
   an interior material covering the exterior material; and
   one or more sound generating apparatuses configured at one or more of the exterior material, the interior material, and between the exterior material and the interior material and configured to output a sound,
   wherein the one or more sound generating apparatuses comprise the acoustic apparatus of claim 1.

28. The vehicular apparatus of claim 27, wherein the interior material comprises at least one or more of a dash board, a pillar interior material, a roof interior material, a door interior material, a seat interior material, a handle interior material, a floor interior material, or a rear package interior material.

29. The vehicular apparatus of claim 27, wherein the exterior material comprises at least one or more of a hood panel, a front fender panel, a door frame, a roof panel, a pillar panel, a trunk panel, a front bumper, a rear bumper, a spoiler, a headlight, a taillight, a fog light, or a vehicle body bottom.

30. A vehicular apparatus, comprising:
   a vehicle body bottom frame; and
   one or more virtual engine sound apparatuses mounted at the vehicle body bottom frame,
   wherein the one or more virtual engine sound apparatuses comprise the acoustic apparatus of claim 1.

31. The vehicular apparatus of claim 30, wherein the vehicle body bottom frame comprises an accommodation part configured to accommodate the one or more virtual engine sound apparatuses.

32. The vehicular apparatus of claim 30, wherein the one or more virtual engine sound apparatuses are disposed at a center of the vehicle body bottom frame.

33. An acoustic apparatus comprising:
   a vibration member;
   a supporting member disposed at a first surface of the vibration member;
   a first vibration apparatus configured to vibrate the vibration member;
   a second vibration apparatus disposed at a second surface of the vibration member opposite to the first surface of the vibration member; and
   a driving circuit part electrically connected to the first and second vibration apparatuses and configured to drive the first and second vibration apparatuses,
   wherein the driving circuit part is disposed at an internal space between the vibration member and the supporting member,
   wherein each of the first vibration apparatus and the second vibration apparatus includes a vibration part including a piezoelectric material,
   wherein the second vibration apparatus overlaps the first vibration apparatus, and
   wherein the vibration part of the second vibration apparatus is configured to be displaced in a same direction as the vibration part of the first vibration apparatus.

34. A vehicular apparatus, comprising: an exterior material:
   an interior material covering the exterior material; and
   one or more sound generating apparatuses configured at the exterior material,
   wherein the one or more sound generating apparatuses comprises:
      a vibration member;
      a supporting member disposed at a first surface of the vibration member;
      a first vibration apparatus configured to vibrate the vibration member; and a driving circuit part electrically connected to the first
vibration apparatus and configured to drive the first
vibration apparatus,
wherein the driving circuit part is disposed at an internal
space between the vibration member and the supporting
member,
wherein the exterior material comprises:
a battery module disposed at the exterior material; and
a vehicle body floor covering the battery module,
wherein the one or more sound generating apparatuses are
disposed between the battery module and the vehicle
body floor, and
wherein the one or more sound generating apparatuses
output a sound or a virtual engine sound.

* * * * *